United States Patent
Strugnell et al.

(10) Patent No.: US 12,521,430 B2
(45) Date of Patent: Jan. 13, 2026

(54) METHODS OF GENERATING BROADLY PROTECTIVE VACCINE COMPOSITIONS COMPRISING NEURAMINIDASE

(71) Applicants: SANOFI PASTEUR INC., Swiftwater, PA (US); VIB VZW, Ghent (BE); UNIVERSITEIT GENT, Ghent (BE)

(72) Inventors: Tod Strugnell, Carlisle, MA (US); Eliud Oloo, Arlington, MA (US); Raymond Oomen, Cambridge, MA (US); Thorsten Vogel, Cambridge, MA (US); Xavier Saelens, Teper (BE); Emma Job, Mechelen (BE)

(73) Assignees: Sanofi Pasteur Inc., Swiftwater, PA (US); VIR VZW, Ghent (BE); Universiteit Gent, Ghent (BE)

( * ) Notice: Subject to any disclaimer, the term of this patent is extended or adjusted under 35 U.S.C. 154(b) by 0 days.

(21) Appl. No.: 17/041,792

(22) PCT Filed: Mar. 27, 2019

(86) PCT No.: PCT/US2019/024327
§ 371 (c)(1),
(2) Date: Sep. 25, 2020

(87) PCT Pub. No.: WO2019/191261
PCT Pub. Date: Oct. 3, 2019

(65) Prior Publication Data
US 2021/0046176 A1  Feb. 18, 2021

Related U.S. Application Data

(60) Provisional application No. 62/718,527, filed on Aug. 14, 2018, provisional application No. 62/649,002, filed on Mar. 28, 2018.

(51) Int. Cl.

| | | |
|---|---|---|
| *A61K 39/145* | (2006.01) | |
| *C12N 7/00* | (2006.01) | |
| *C12N 9/24* | (2006.01) | |
| *G16B 15/20* | (2019.01) | |
| *G16B 30/10* | (2019.01) | |
| *A61K 39/00* | (2006.01) | |

(52) U.S. Cl.
CPC .............. *A61K 39/145* (2013.01); *C12N 7/00* (2013.01); *C12N 9/2402* (2013.01); *C12Y 302/01018* (2013.01); *G16B 15/20* (2019.02); *G16B 30/10* (2019.02); *A61K 2039/575* (2013.01); *C12N 2760/16022* (2013.01); *C12N 2760/16023* (2013.01); *C12N 2760/16034* (2013.01)

(58) Field of Classification Search
None
See application file for complete search history.

(56) References Cited

U.S. PATENT DOCUMENTS

| | | | |
|---|---|---|---|
| 11,576,964 B2 * | 2/2023 | Strugnell | A61K 39/12 |
| 2009/0175909 A1 | 7/2009 | Yang et al. | |
| 2011/0229518 A1 | 9/2011 | Fomsgaard et al. | |
| 2015/0017196 A1 * | 1/2015 | Ross | C07K 14/005 |
| | | | 435/325 |

FOREIGN PATENT DOCUMENTS

| | | | |
|---|---|---|---|
| JP | 2015513902 A | 5/2015 | |
| JP | 2018501258 A | 1/2018 | |
| WO | 2013148164 A1 | 10/2013 | |
| WO | 2016100922 A1 | 6/2016 | |
| WO | 2016196846 A2 | 12/2016 | |

OTHER PUBLICATIONS

Carter et al., Design and Characterization of a Computationally Optimized Broadly Reactive Hemagglutinin Vaccine for H1N1 Influenza Viruses, 2016, Journal of Virology, vol. 90, No. 9, pp. 4720-4734.*

Giles et al., A computationally optimized broadly reactive antigen (COBRA) based H5N1 VLP vaccine elicits broadly reactive antibodies in mice and ferrets, 2011, Vaccine, vol. 29, No. 16, pp. 3043-3054.*

Notification of Transmittal of the International Search Report and The Written Opinion of the International Search Authority, International Search Report and Written Opinion in International Application No. PCT/US2019/024327, mailed Jun. 25, 2019 (10 pages).

Alonso-Padilla et al., "Computer-Aided Design of an Epitope-Based Vaccine against Epstein-Barr Virus", Journal of Immunology Research, 2017, pp. 1-15 (Jan. 1, 2017).

* cited by examiner

Primary Examiner — Benjamin P Blumel
(74) Attorney, Agent, or Firm — McNeill PLLC

(57) ABSTRACT

The present disclosure relates to a cluster-based consensus approach for generating recombinant neuraminidase (NA) polypeptides. The disclosure further relates to influenza vaccine compositions comprising the recombinant NA polypeptides.

Figure 1A:
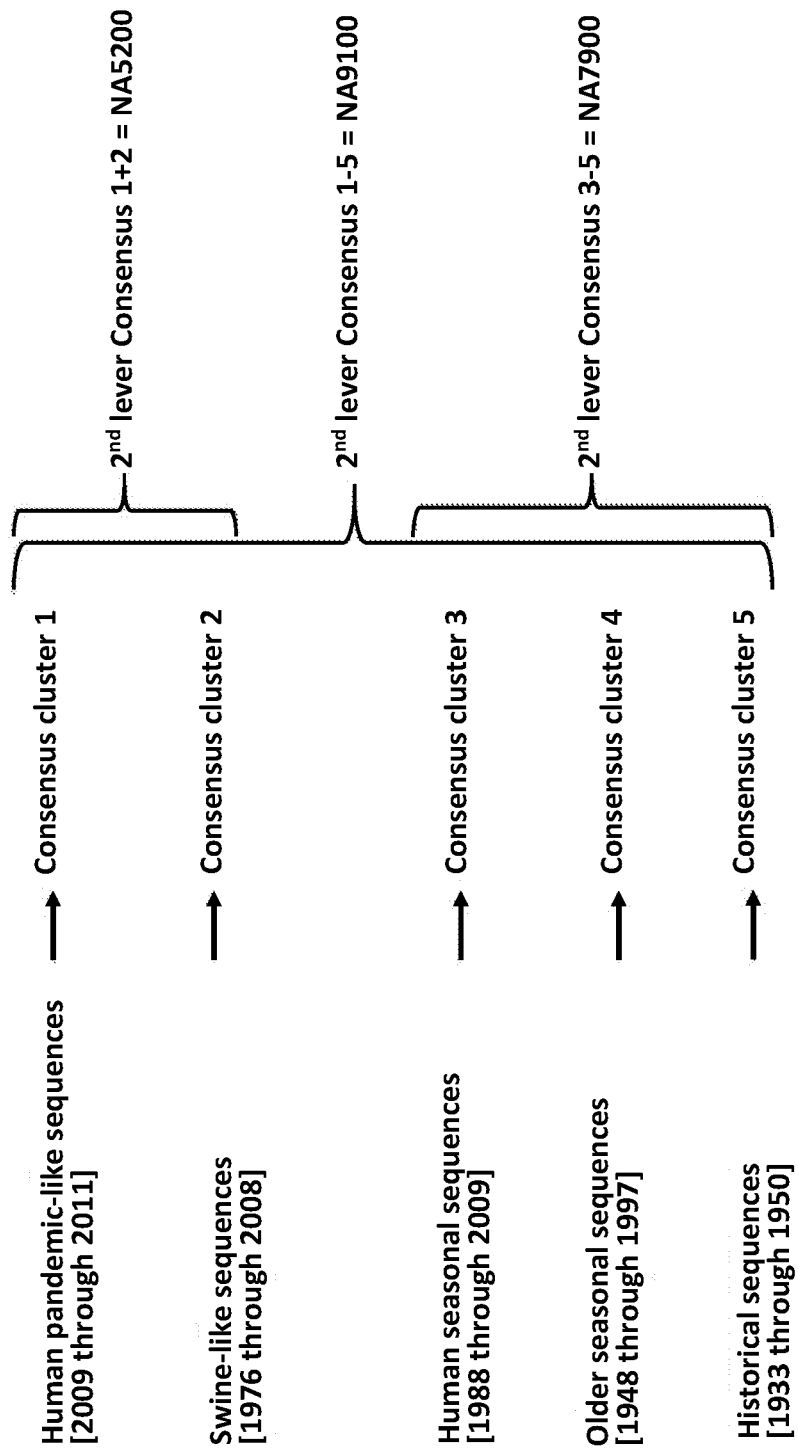

9 Claims, 47 Drawing Sheets
Specification includes a Sequence Listing.

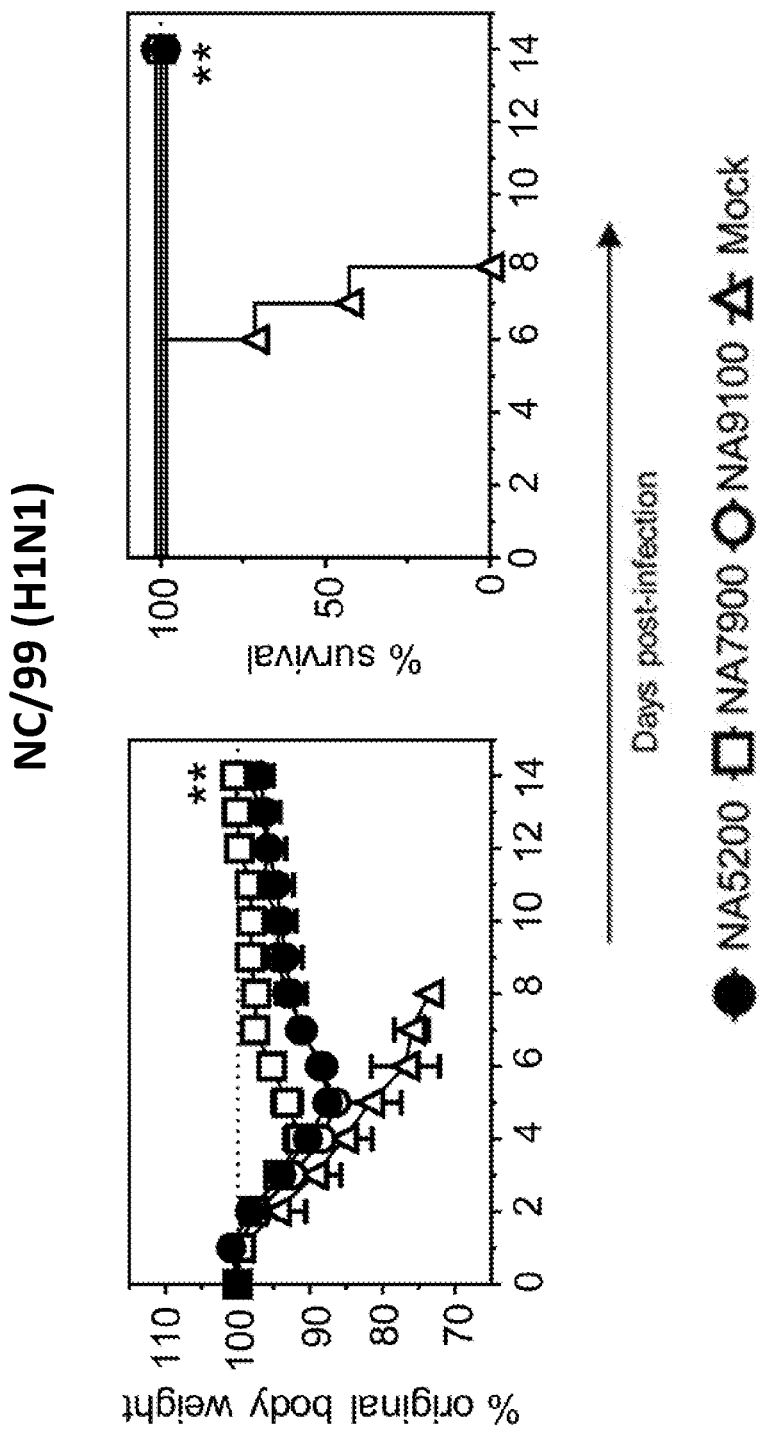

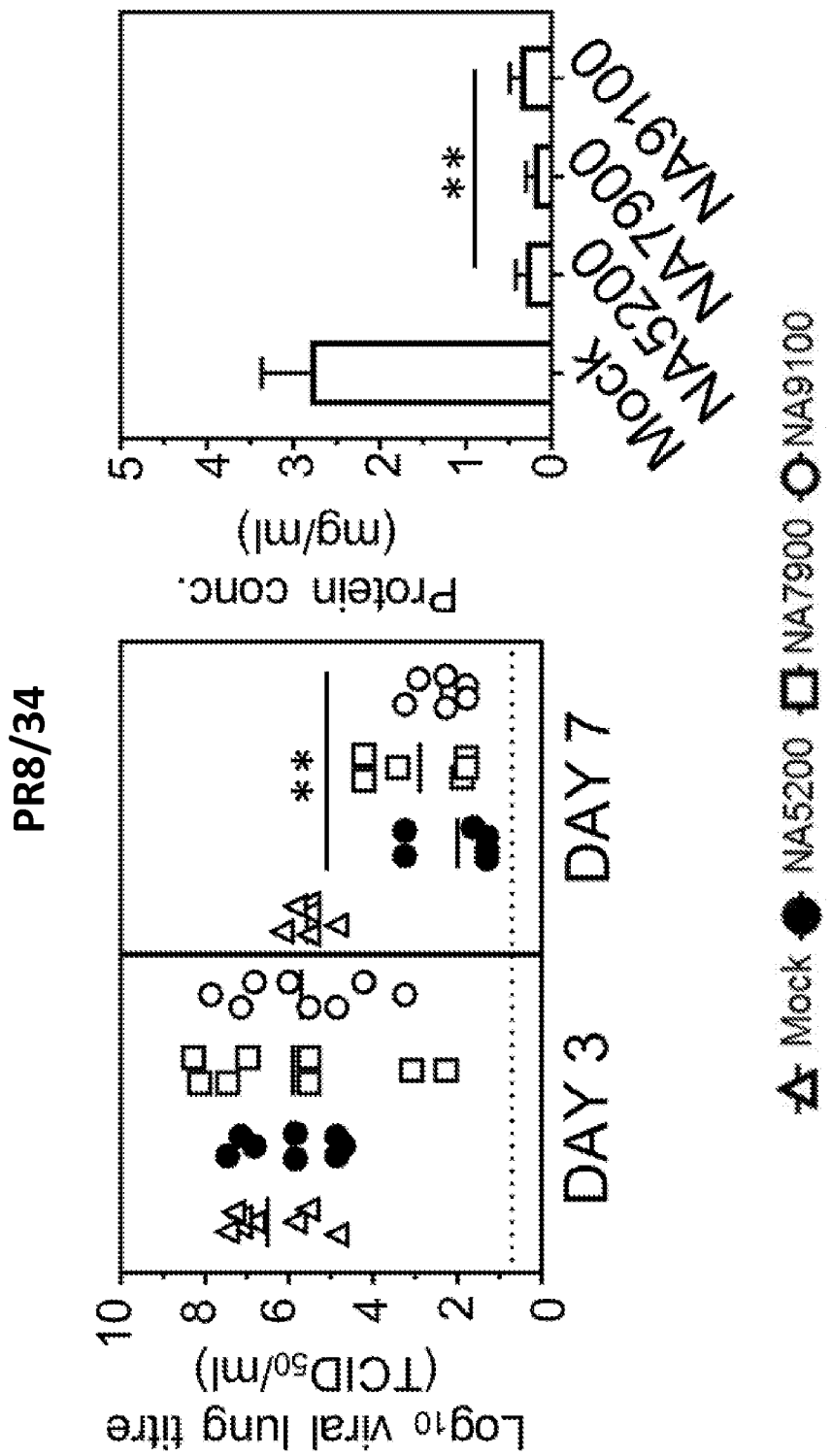

Cluster 1+2 (pandemic/swine – like)
(2009 pandemic – present)

Cluster 3+4+5 (1930s through seasonal 2009)

Cluster 1+2 (pandemic/swine – like)
(2009 pandemic – present)

Cluster 3+4+5 (1930s through seasonal 2009)

Cluster 1+2+3+4+5 (1918 – present)

Cluster 1+2+3+4+5 (1918 – present)

Fig. 13G

Fig. 13H

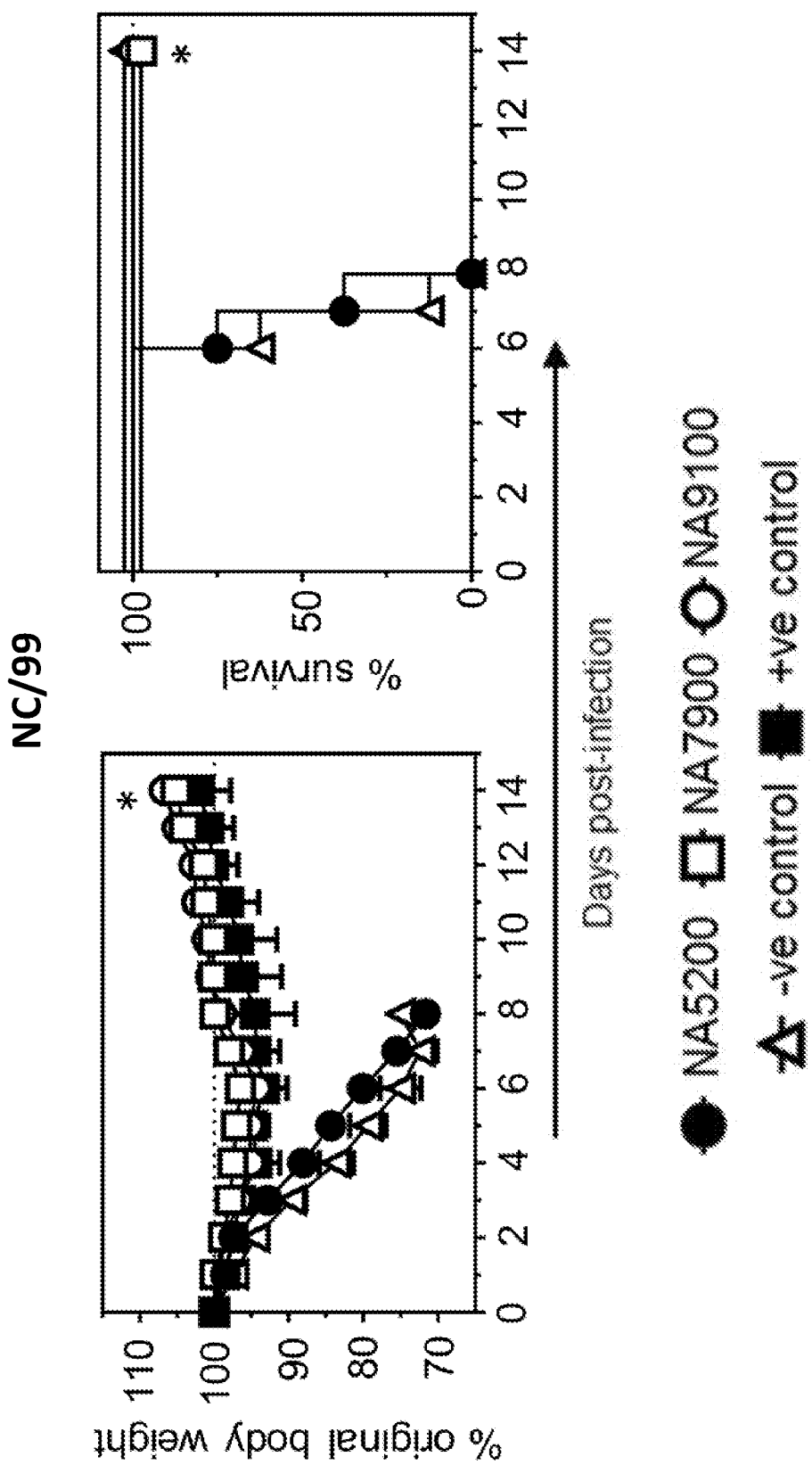

% identity shared by CBC designs and pdm09 NAs

| Virus strain | rNA anti-sera | | | |
|---|---|---|---|---|
| | NA5200 | NA7900 | NA9100 | Bel/09 |
| Sing/16 | 91% | 87% | 89% | 97% |
| Bel/09 | 92% | 85% | 88% | 100% |

Fig. 17C

METHODS OF GENERATING BROADLY PROTECTIVE VACCINE COMPOSITIONS COMPRISING NEURAMINIDASE

CROSS-REFERENCE TO RELATED APPLICATIONS

This application is a national phase entry pursuant to 35 U.S.C. § 371 of International Application No. PCT/US2019/024327 filed Mar. 27, 2019, which claims the benefit of priority to U.S. Provisional Application No. 62/649,002, filed Mar. 28, 2018, and U.S. Provisional Application No. 62/718,527, filed Aug. 14, 2018, the contents of each of which are incorporated by reference in their entirety.

The present application contains a Sequence Listing which has been submitted electronically in ASCII format and is hereby incorporated by reference in its entirety. Said ASCII copy, created on Mar. 27, 2019, is named 01121-0037-00PCT_SL.txt and is 69,015 bytes in size.

Influenza is a highly contagious respiratory illness caused by one or more influenza viruses. Currently, vaccines provide the most effective defense against influenza. Vaccine compositions are updated annually by the World Health Organization to accommodate variations in circulating influenza strains. However, vaccine mismatches resulting from inaccurate predictions can result in significant morbidity and mortality even in vaccinated populations.

The influenza virus contains two structural glycoproteins on the surface of the viral membrane, i.e., hemagglutinin (HA) and neuraminidase (NA). HA binds sialic acid and is responsible for viral entry, while NA is responsible for release of the virus from infected cells by the removal of sialic acid. Current influenza vaccines are generally based on inducing immune responses to HA. However, variability in HA can result in such vaccines being effective only against a small subset of related circulating strains. NA is often included in influenza vaccine compositions as well. However, the content and activity of NA is not standardized in current vaccine formulations.

There remains a need for effective influenza vaccines that can provide broad, long-lasting (e.g., multi-season) protection against influenza viruses including mismatched strains.

SUMMARY

The present invention provides, inter alia, a cluster-based consensus (CBC) approach for generating NA polypeptides capable of eliciting a broadly reactive and protective immune response against multiple influenza strains. In various embodiments, the method comprises:
  selecting more than one influenza NA polypeptide sequence and aligning the sequences;
  calculating pairwise similarity/dissimilarity matrices;
  identifying and creating clusters of similar sequences from the pairwise similarity/dissimilarity matrices;
  within each cluster, determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid;
  generating a first sequence comprising consensus amino acids and variable amino acids for each cluster;
  optionally, if more than one cluster is analyzed, comparing the first sequence generated from a cluster with a sequence generated in another cluster or multiple clusters by:
    aligning the sequences generated for each cluster;
    determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid; and
    generating a second sequence comprising consensus amino acids and variable amino acids;
  within the first sequence or the second sequence generated, determining a consensus amino acid for each variable amino acid position, by:
    generating a set of test sequences based on the first or second sequence, wherein test amino acids are placed at the variable amino acid positions;
    performing molecular modeling for each of the test sequences;
    determining a consensus amino acid for each variable amino acid position by selecting amino acid(s) that result in a polypeptide having a negative total energy value; and
  generating an influenza NA polypeptide comprising the consensus amino acids.

In various embodiments, the present invention provides NA polypeptides generated using methods of the invention. In exemplary embodiments, the NA polypeptides comprise the amino acid sequence of any one of SEQ ID NOs: 1-3, or a fragment thereof. In some embodiments, the present invention further relates to tetrameric NA proteins comprising one or more NA polypeptides described herein.

In various embodiments, the NA polypeptides and/or the tetrameric NA proteins of the invention are utilized as vaccine antigens. In some embodiments, the NA polypeptides and tetrameric NA proteins provide a broadly protective immune response against multiple influenza strains, types, or subtypes. Without wishing to be bound by theory, it is believed that the NA polypeptides and tetrameric NA proteins can elicit neutralizing antibody responses against multiple epitopes (e.g., conserved epitopes) within influenza viruses.

Further embodiments of the present application are as follows:

Embodiment A 1

A method for generating a recombinant influenza neuraminidase (NA) polypeptide comprising consensus amino acids, wherein the method comprises:
  a. selecting more than one influenza NA polypeptide sequence and aligning the sequences;
  b. calculating pairwise similarity/dissimilarity matrices;
  c. identifying and creating clusters of similar sequences from the pairwise similarity/dissimilarity matrices;
  d. within each cluster, determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid;

e. generating a first sequence comprising consensus amino acids and variable amino acids for each cluster;
f. optionally, if a plurality of clusters is analyzed, comparing the first sequence generated in step (e) of a cluster with a first sequence generated in another cluster or multiple clusters by:
   i. aligning the sequences generated in step (e) for each cluster;
   ii. determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid; and
   iii. generating a second sequence comprising consensus amino acids and variable amino acids;
g. within the first sequence generated in step (e) or the second sequence generated in step (f)(iii), determining a consensus amino acid for each variable amino acid position, by:
   iv. generating a set of test sequences based on the first or second sequence, wherein test amino acids are placed at the variable amino acid positions;
   v. performing molecular modeling for each of the test sequences;
   vi. determining a consensus amino acid for each variable amino acid position by selecting amino acid(s) that result in a polypeptide having a negative total energy value; and
h. generating the recombinant influenza NA polypeptide comprising the consensus amino acids.

Embodiment A 2

The method of embodiment A 1, wherein aligning the sequences comprises using MAFFT, MUSCLE, CLUSTAL OMEGA, FASTA, a combination thereof, or any other multiple sequence alignment software packages.

Embodiment A 3

The method of embodiment A 1 or A 2, wherein calculating the pairwise similarity/dissimilarity matrices comprises using BLOSUM, PAM, IDENTITY substitution matrices, or a combination thereof.

Embodiment A 4

The method of any one of embodiments A 1-3, wherein identifying and creating clusters of similar sequences from the pairwise similarity/dissimilarity matrices comprise using K-means clustering, minimax clustering, principle component analysis (PCA), multidimensional scaling (MDS), or a combination thereof.

Embodiment A 5

The method of any one of embodiments A 1-4, wherein molecular modeling comprises comparing to a crystal structure of an influenza NA polypeptide or protein.

Embodiment A 6

The method of any one of embodiments A 1-5, wherein molecular modeling comprises use of Rosetta or any other molecular modeling software.

Embodiment A 7

The method of any one of embodiments A 1-6, wherein the test amino acids comprise any natural or non-natural amino acid found in proteins.

Embodiment A 8

A recombinant influenza NA polypeptide generated using the method of any one of embodiments A 1-7.

Embodiment A 9

The recombinant influenza NA polypeptide of embodiment A 8, where in the polypeptide comprises an amino acid sequence selected from SEQ ID NOs: 1, 2, or 3, or a fragment thereof, or an amino acid sequence having at least 85%, 90%, 95%, 96%, 97%, 98%, or 99% identity to SEQ ID NOs: 1, 2, or 3, or a fragment thereof.

Embodiment A 10

The recombinant NA polypeptide of embodiment A 9, wherein the polypeptide comprises an amino acids 75-469 of SEQ ID NOs: 1, 2, or 3.

Embodiment A 11

A recombinant tetrameric NA protein comprising one or more of the recombinant NA polypeptides of any one of embodiments A 8-10.

Embodiment A 12

An isolated nucleic acid encoding the recombinant HA polypeptide of any one of embodiments A 8-10 or the recombinant tetrameric NA protein of embodiment A 11.

Embodiment A 13

A vector comprising the nucleic acid of embodiment A 12.

Embodiment A 14

An isolated cell comprising the vector of embodiment A 13.

Embodiment A 15

The isolated cell of embodiment A 14, wherein the cell is a mammalian cell.

Embodiment A 16

The isolated cell of embodiment A 15, wherein the isolated cell is a HEK293T cell or a CHO cell.

Embodiment A 17

The isolated cell of embodiment A 14, wherein the isolated cell is an insect cell.

Embodiment A 18

A fusion protein comprising the recombinant NA polypeptide of any one of embodiments A 8-10 or the recombinant tetrameric NA protein of embodiment A 11.

Embodiment A 19

An influenza virus-like particle (VLP) comprising the recombinant NA polypeptide of any one of embodiments A 8-10 or the recombinant tetrameric NA protein of embodiment A 11.

Embodiment A 20

The influenza VLP of embodiment A 19, further comprising one or more of an influenza hemagglutinin (HA) protein, an influenza matrix (M1) protein, a human immunodeficiency virus (HIV) gag protein, or a combination thereof.

Embodiment A 21

A pharmaceutical composition comprising the recombinant NA polypeptide of any one of embodiments A 8-10, the recombinant tetrameric NA protein of embodiment A 11, the fusion protein of embodiment A 18, or the influenza VLP of embodiment A 19 or A 20, and a pharmaceutically acceptable carrier, excipient, or adjuvant.

Embodiment A 22

The pharmaceutical composition of embodiment A 21, wherein the composition elicits an immune response against one or more influenza strains, types, and/or subtypes.

Embodiment A 23

A method of immunizing a subject against influenza virus, comprising administering to the subject an effective amount of the recombinant NA polypeptide of any one of embodiments A 8-10, the recombinant tetrameric NA protein of embodiment A 11, the fusion protein of embodiment A 18, the influenza VLP of embodiment A 19 or A 20, or the pharmaceutical composition of embodiment A 21 or A 22.

Embodiment A 24

A method of inducing an immune response to influenza virus in a subject, comprising administering to the subject an effective amount of the recombinant NA polypeptide of any one of embodiments A 8-10, the recombinant tetrameric NA protein of embodiment A 11, the fusion protein of embodiment A 18, the influenza VLP of embodiment A 19 or A 20, or the pharmaceutical composition of embodiment A 21 or A 22.

Embodiment A 25

The method of embodiment A 23 or A 24, wherein the influenza virus is a seasonal or pandemic influenza virus.

Embodiment A 26

The method of embodiment A 24 or A 25, wherein the immune response comprises production of antibodies against one or more influenza virus strains, types, or subtypes.

Embodiment A 27

The method of any one of embodiments A 23-26, wherein the subject is a mammal.

Embodiment A 28

The method of embodiment A 27, wherein the subject is a human.

Embodiment A 29

The method of any one of embodiments A 23-28, wherein the administering is performed via intramuscular, intranasal, intradermal, subcutaneous, oral, or intravenous routes.

Additional objects and advantages will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

The accompanying drawings, which are incorporated in and constitute a part of this specification, illustrate one (several) embodiment(s) and together with the description, serve to explain the principles described herein.

FIGURE LEGENDS

Figure 1B:
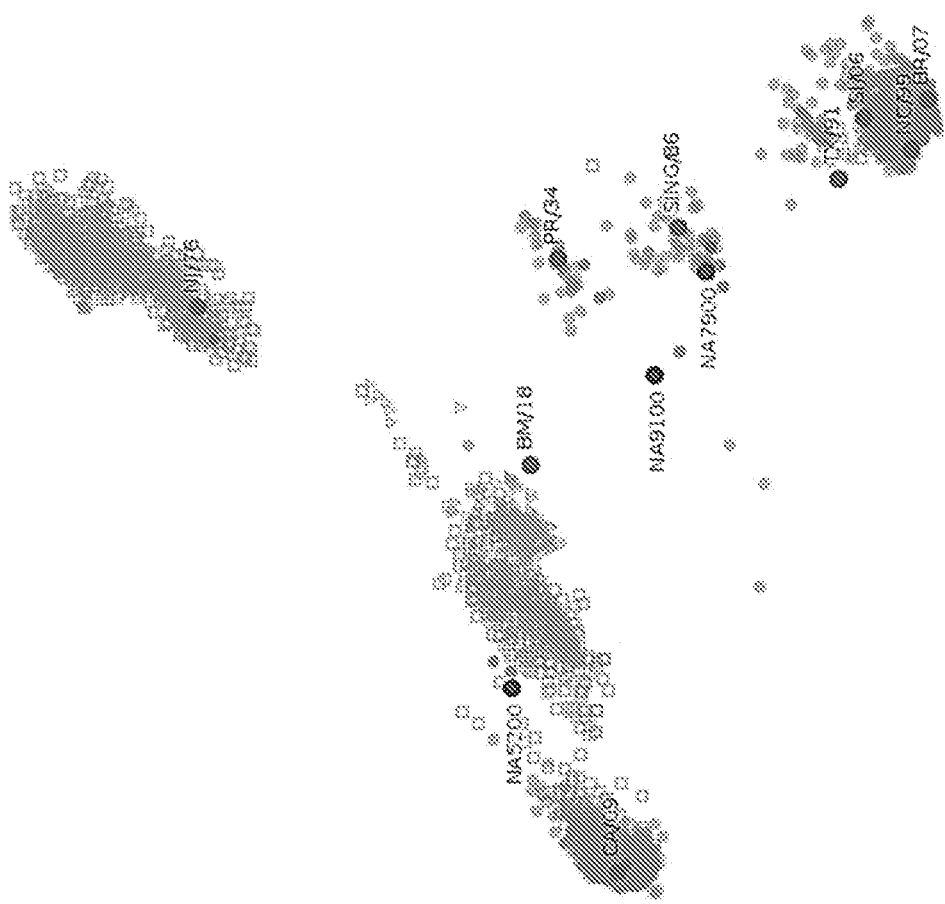

FIGS. 1A-1B show an exemplary cluster-based consensus (CBC) method used to design NA polypeptides. FIG. 1A shows three NA polypeptide candidates NA5200, NA7900, and NA9100 generated using the methods described herein. FIG. 1B shows the position of the three NA polypeptides in sequence space relative to other known H1N1 subtype sequences, as determined by multidimensional scaling.

Figure 2A:
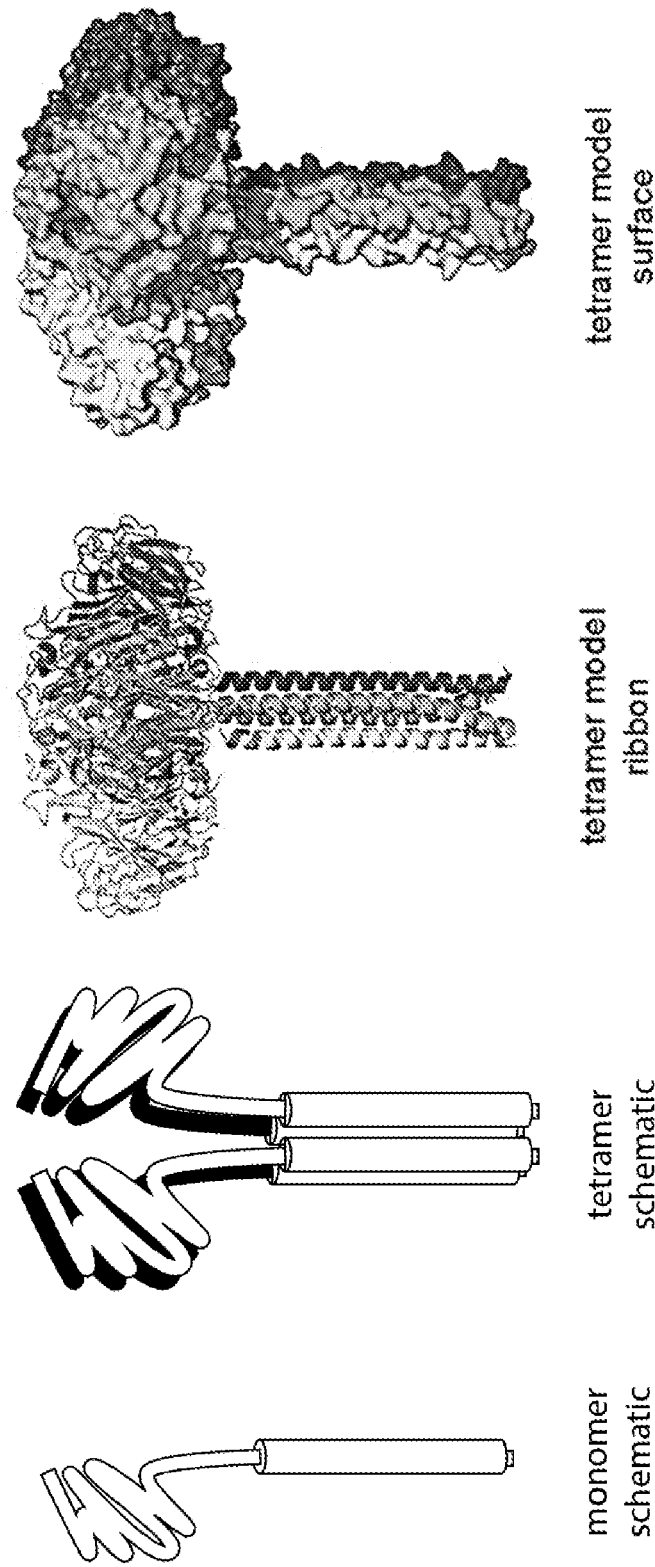
Figure 2B:
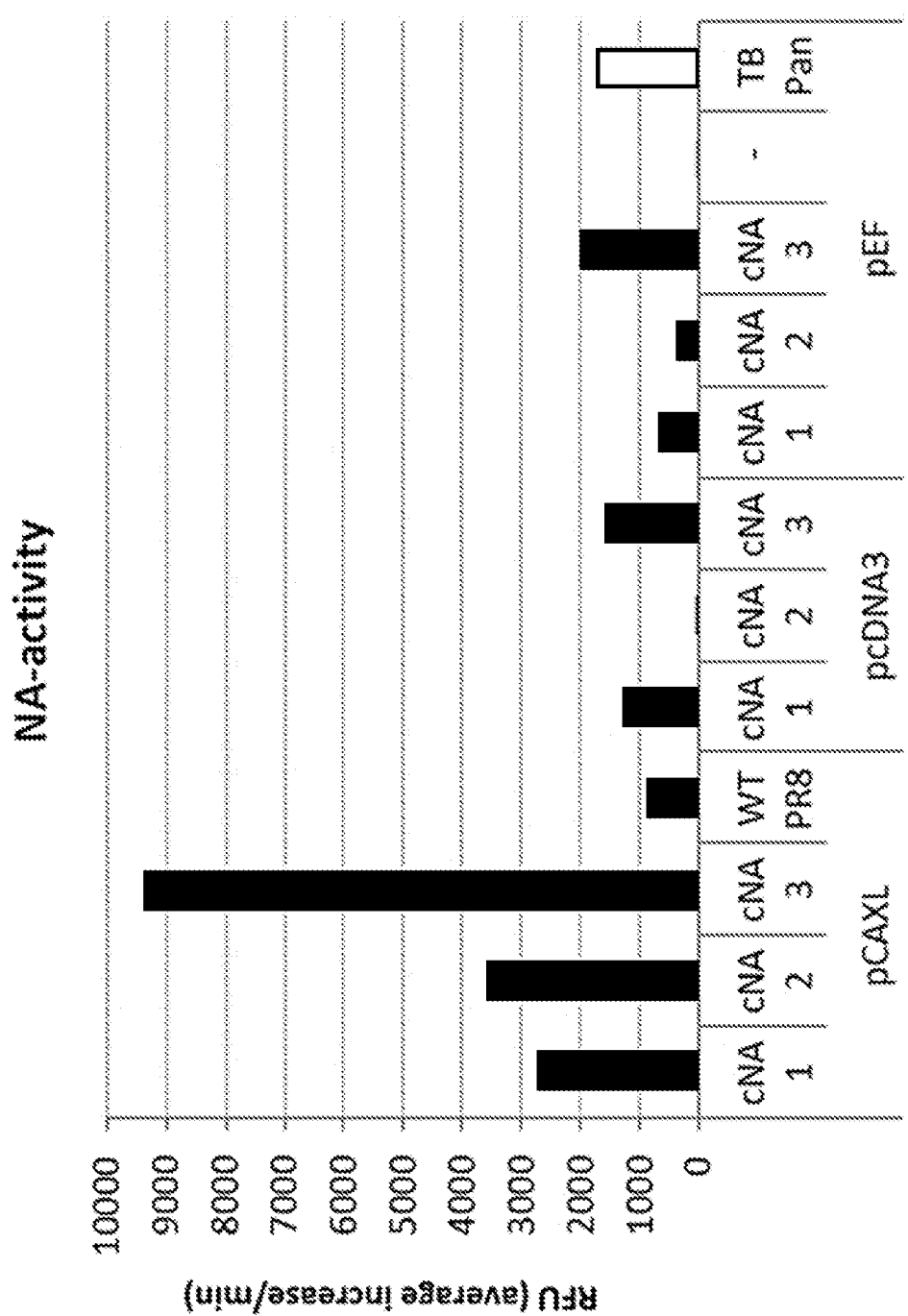

FIGS. 2A-2B show schematics and activity of NA constructs. FIG. 2A provides illustrations of monomeric and tetrameric NA constructs. FIG. 2B shows the relative fluorescence unit (RFU, average increase/min) of various NA constructs when expressed by different expression plasmids (i.e., pCAXL, pcDNA3, or pEF) in HEK293T cells. TB Pan represents a soluble tetrabrachion-pandemic A/Belgium/1/2009 (=A/California/07/2009) construct. cNA1 represents NA5200, cNA2 represents NA7900, and cNA3 represents NA9100.

Figure 3A:
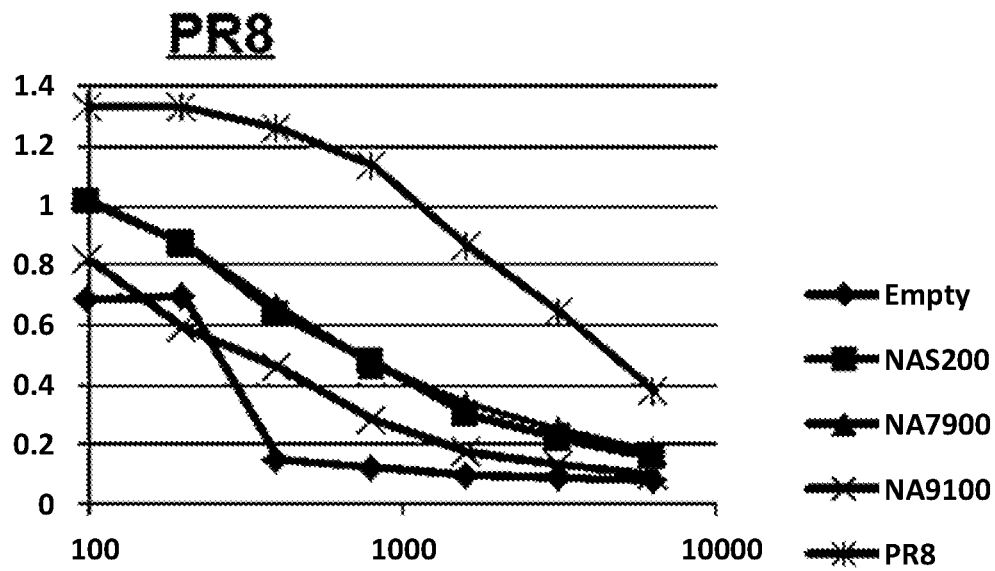
Figure 3B:
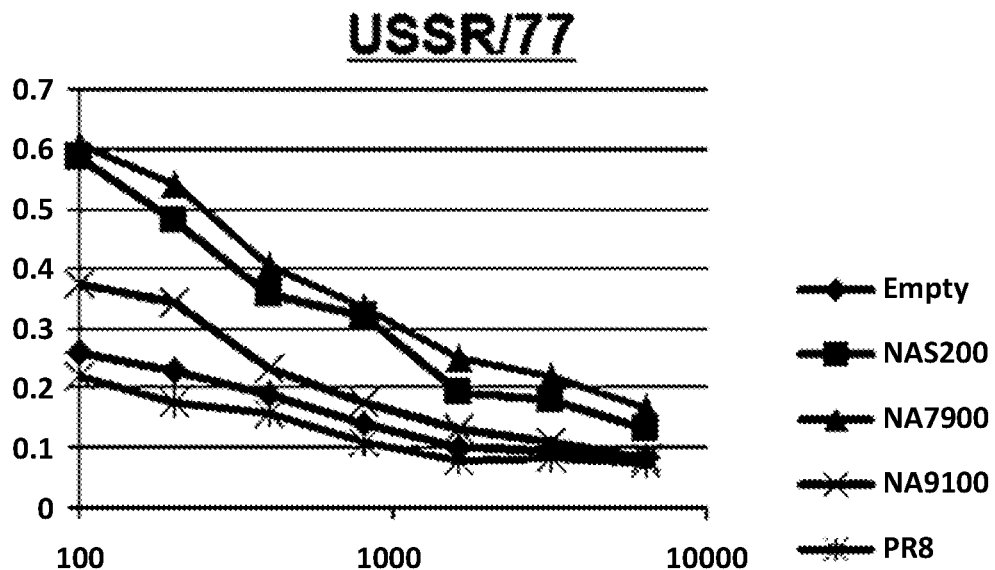
Figure 3C:
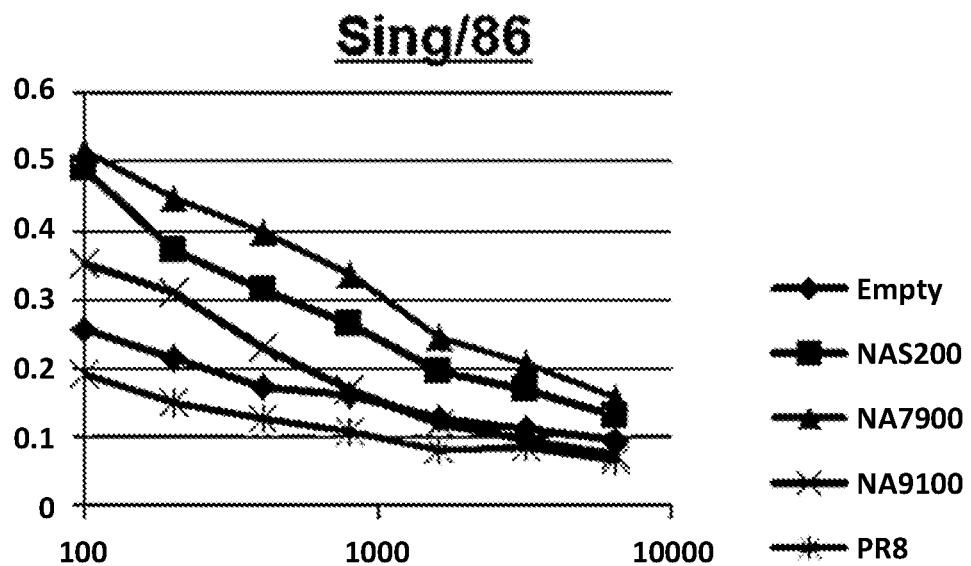
Figure 3D:
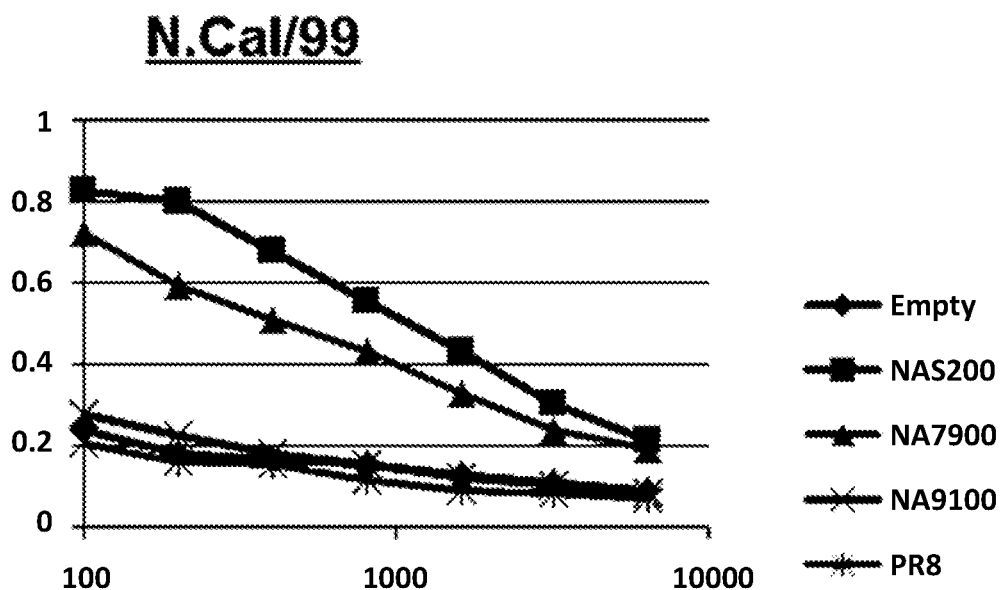
Figure 3E:
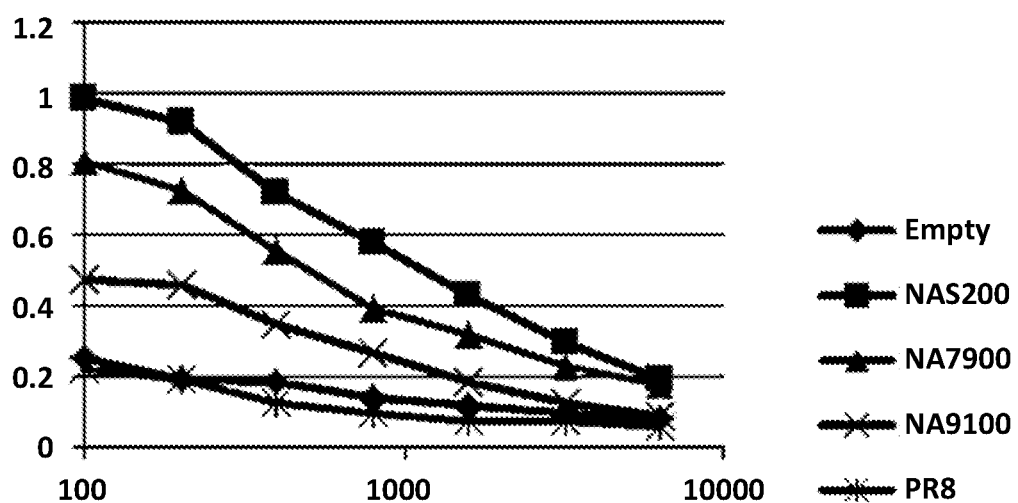
Figure 3F:
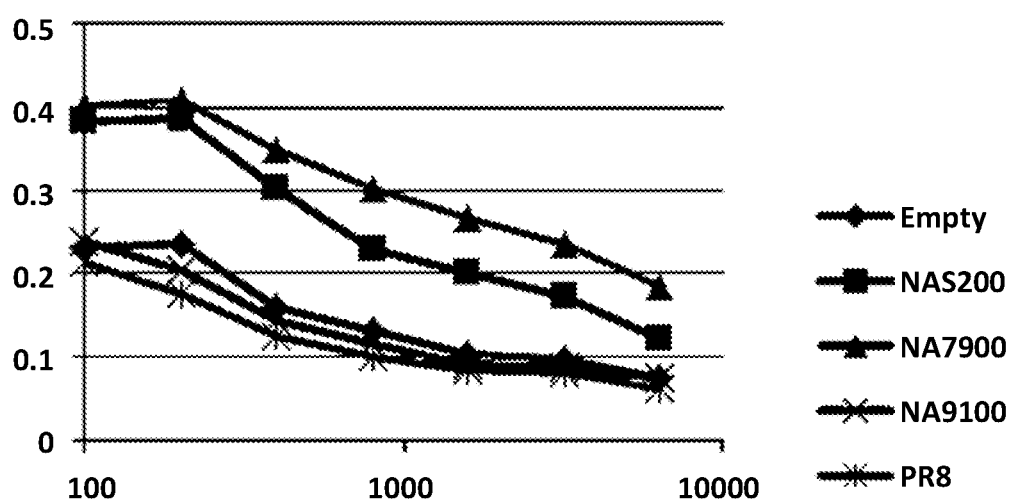

FIGS. 3A-3F provide the results from ELISA assays which measure the binding activity of sera from mice immunized with DNA encoding different NA constructs. The binding activity to different influenza viruses are depicted as: A/Puerto Rico/8/1934 (PR8; FIG. 3A); A/USSR/90/1977 (USSR/77; FIG. 3B); A/Singapore/6/1986 (Sing/86; FIG. 3C); A/New Caledonia/20/1999 (N.Cal/99; FIG. 3D); A/Brisbane/59/2007 (Bris/07; FIG. 3E); and A/Belgium/1/2009 (Pdm/09; FIG. 3F). In the graphs, X-axis represents serum dilution, and Y-axis represents OD.

Figure 4A:
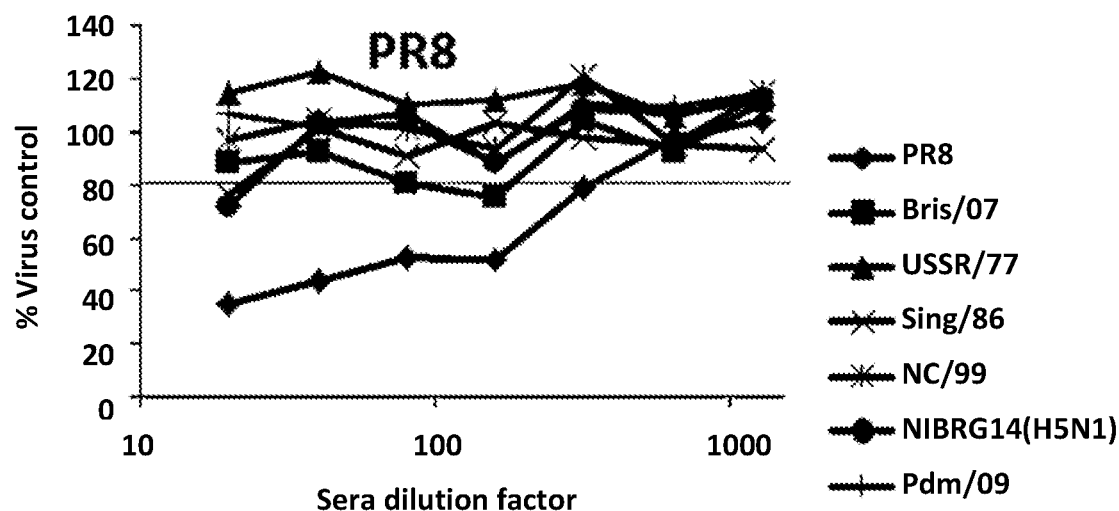
Figure 4B:
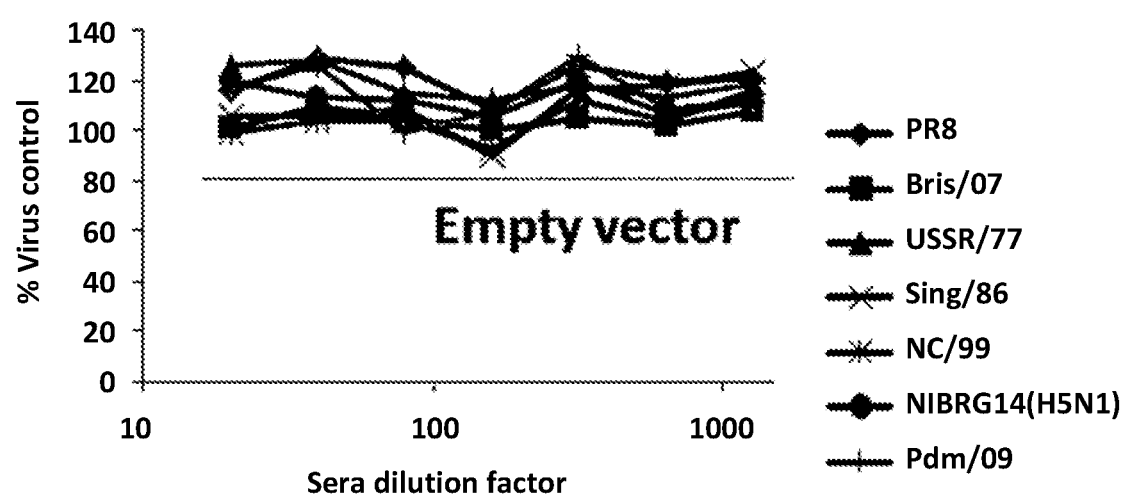
Figure 4C:
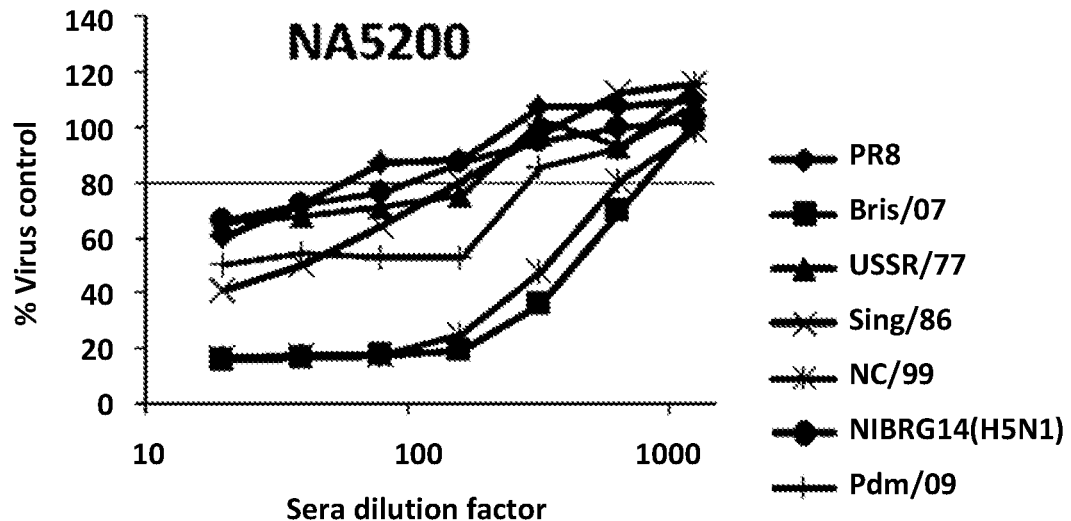
Figure 4D:
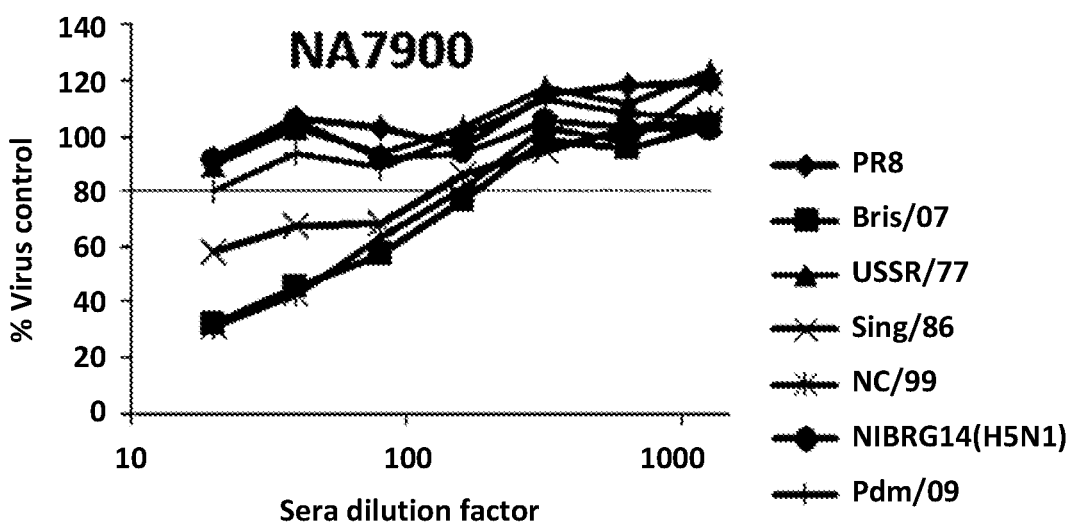
Figure 4E:
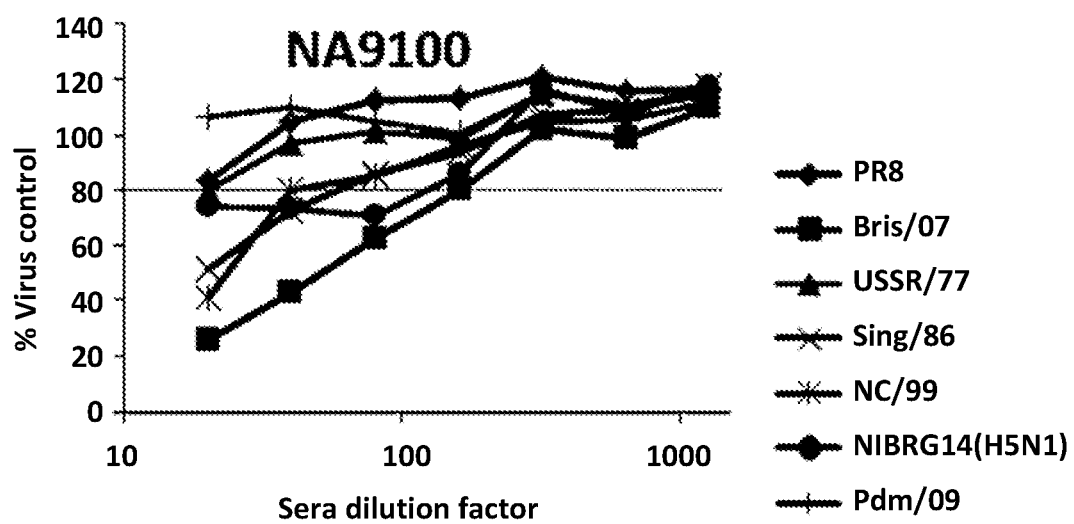

FIGS. 4A-4E provide the results from enzyme-linked lectin (ELLA) assays which measure the NA inhibition (NAI) activities of sera from mice immunized with DNA encoding different NA constructs. The NAI activities are depicted as: A/Puerto Rico/8/1934 (PR8; FIG. 4A); empty vector (FIG. 4B); NA5200 (FIG. 4C); NA7900 (FIG. 4D); and NA9100 (FIG. 4E).

Figure 5A:
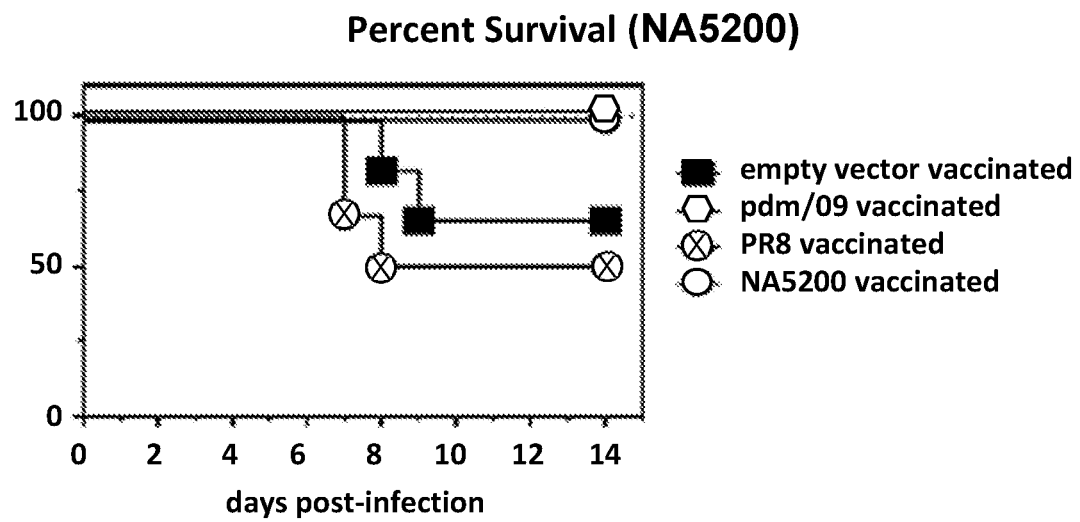
Figure 5B:
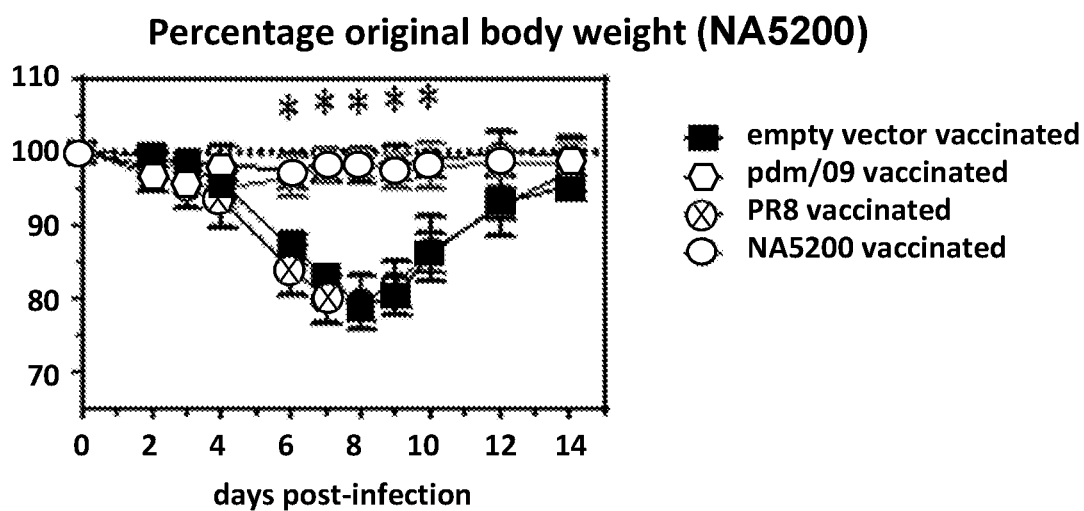
Figure 5C:
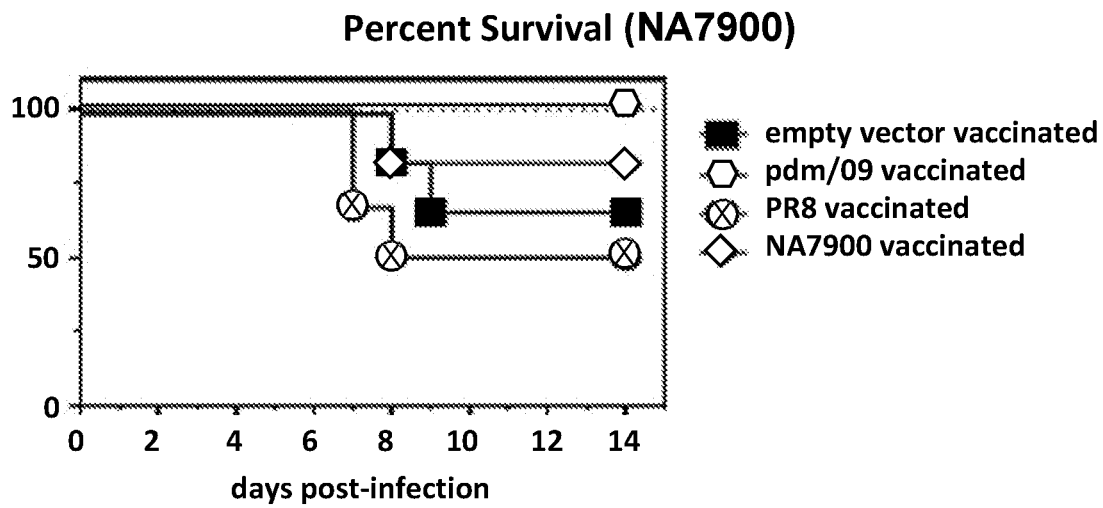
Figure 5D:
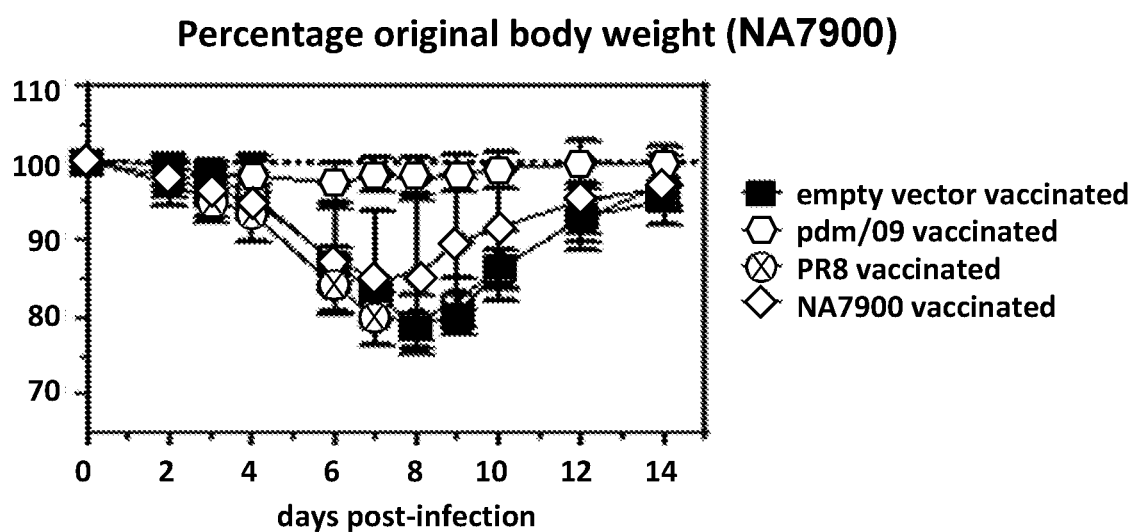
Figure 5E:
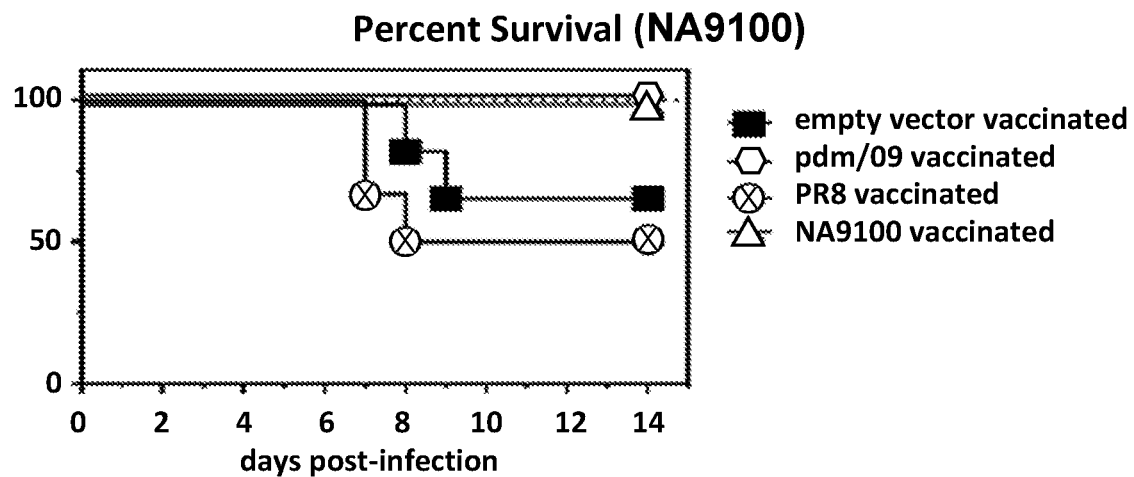
Figure 5F:
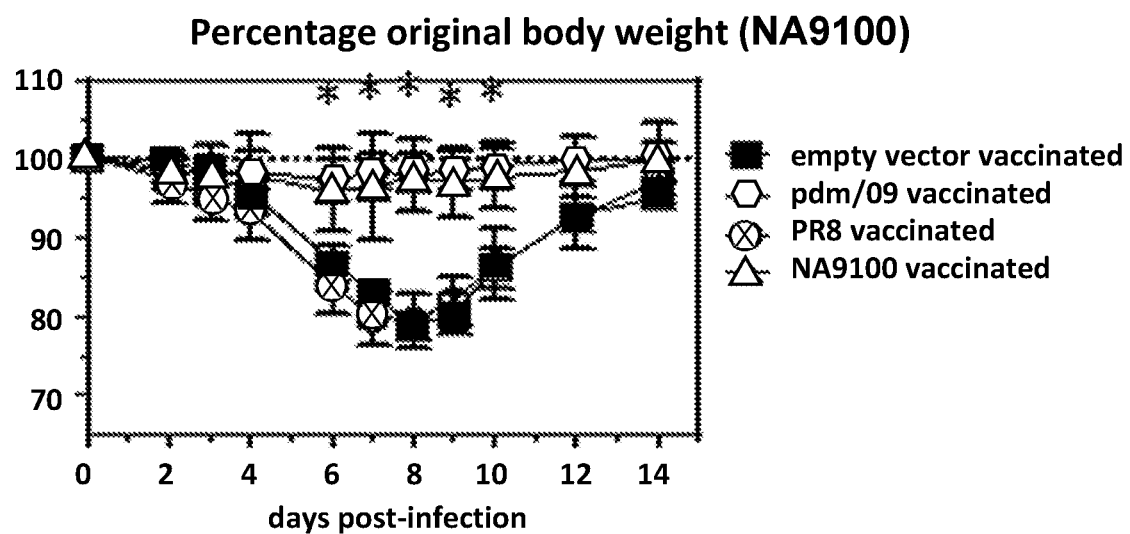

FIGS. 5A-5F show the percentage of survival and body weight loss of mice that were vaccinated twice with DNA encoding different NA constructs and subsequently challenged with one LD50 of pandemic 2009 virus. FIGS. 5A, 5C, and 5E show percentage of survival. FIGS. 5B, 5D, and 5F show percentage of body weight loss. FIGS. 5A-5B provide results associated with NA5200. FIGS. 5C-5D provide results associated with NA7900. FIGS. 5E-5F provide results associated with NA9100. As shown, * indicates statistical significance versus empty vector.

Figure 6A:
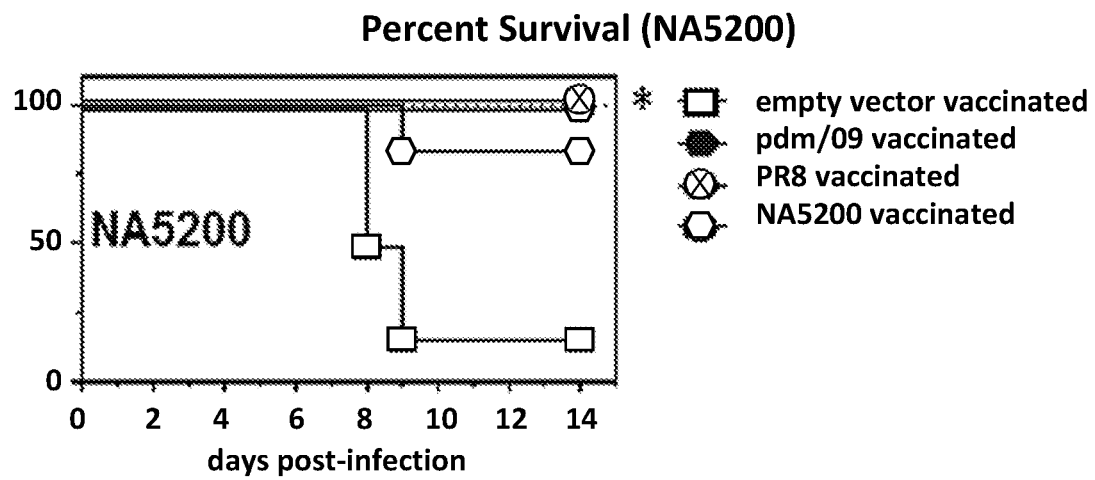
Figure 6B:
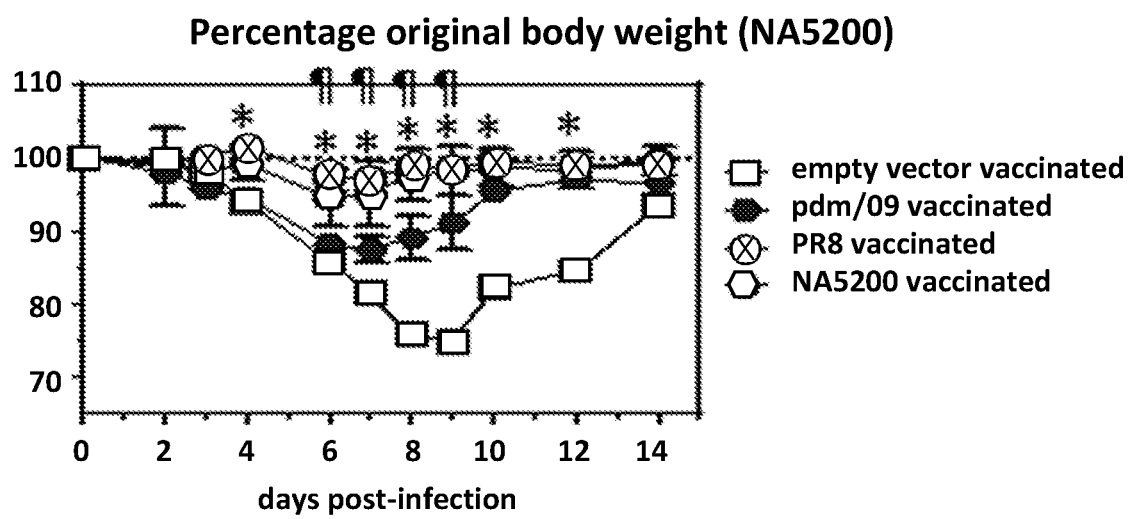
Figure 6C:
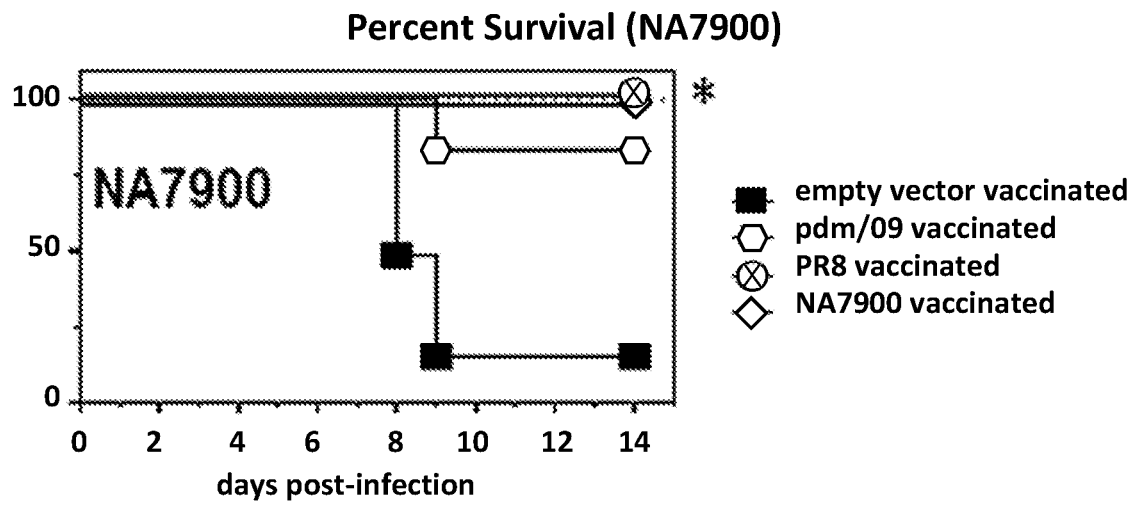
Figure 6D:
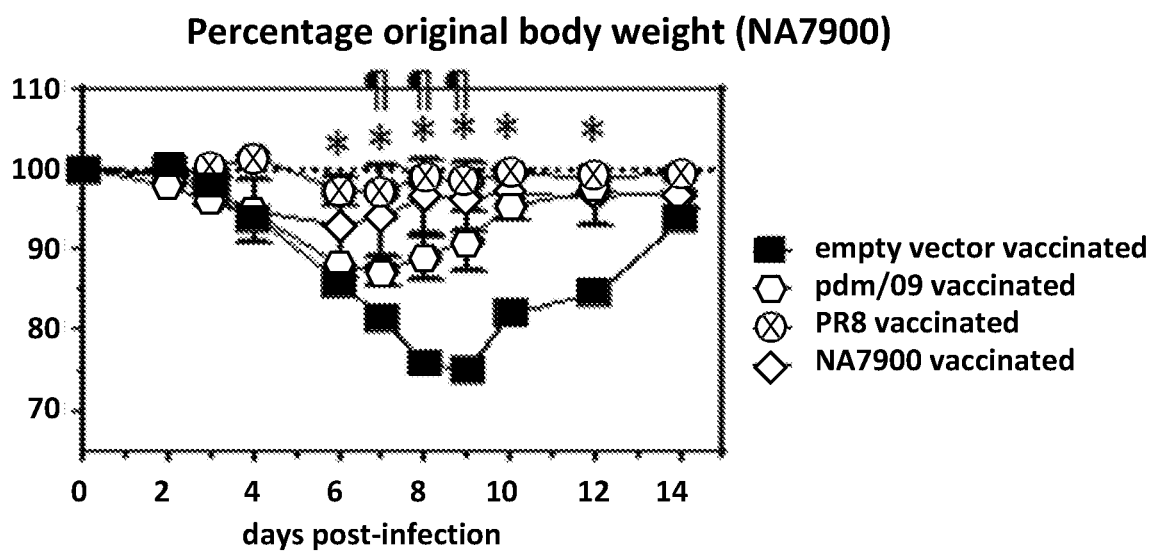
Figure 6E:
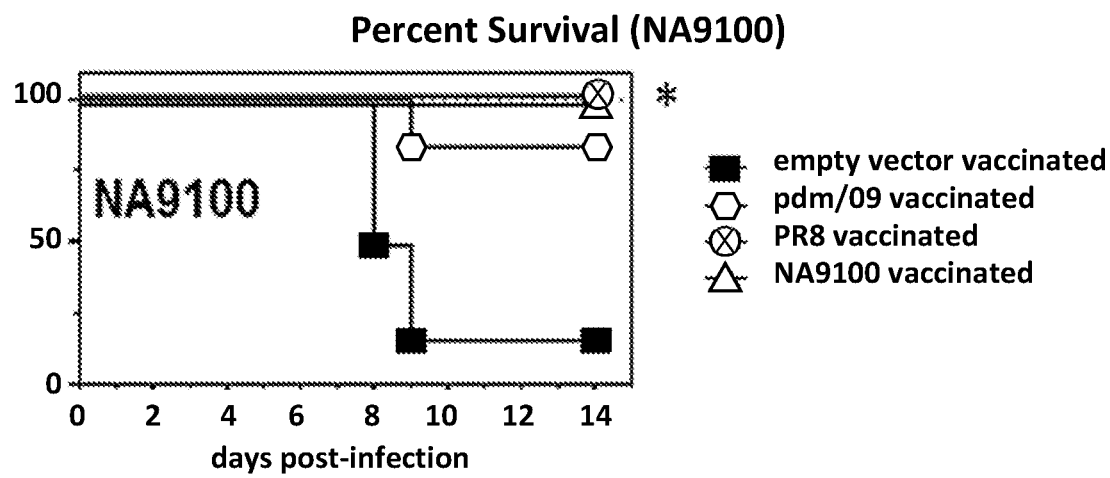
Figure 6F:
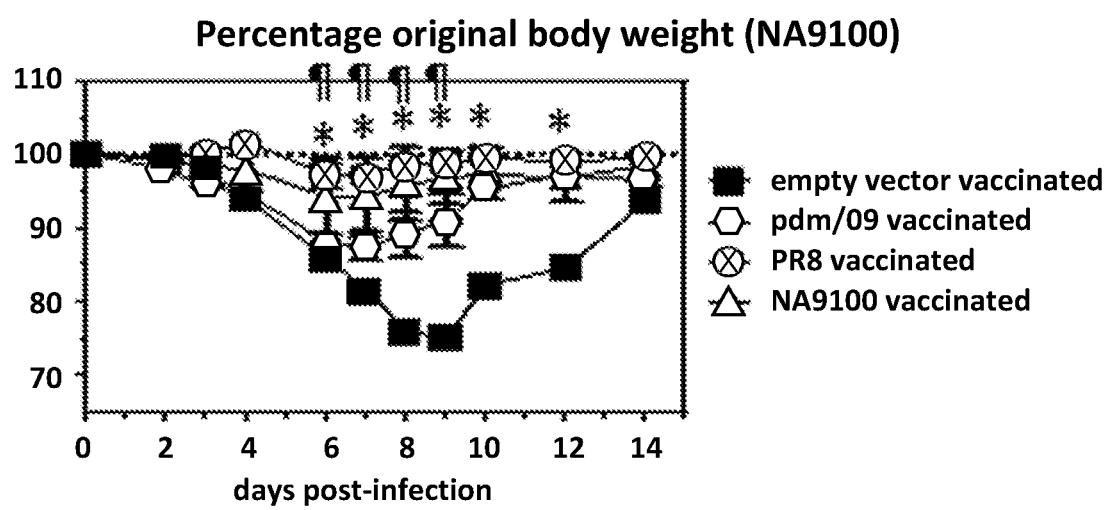

FIGS. 6A-6F show percentage of survival and body weight loss of mice that were vaccinated twice with DNA encoding different NA constructs and subsequently challenged with one LD50 of PR8 virus. FIGS. 6A, 6C, and 6E show percentage of survival. FIGS. 6B, 6D, and 6F show percentage of body weight loss. FIGS. 6A-6B provide results associated with NA5200. FIGS. 6C-6D provide results associated with NA7900. FIGS. 6E-6F provide results associated with NA9100. As shown, * indicates statistical significance versus empty vector group, and ¶ indicates statistical significance versus pdm09 group.

Figure 7A:
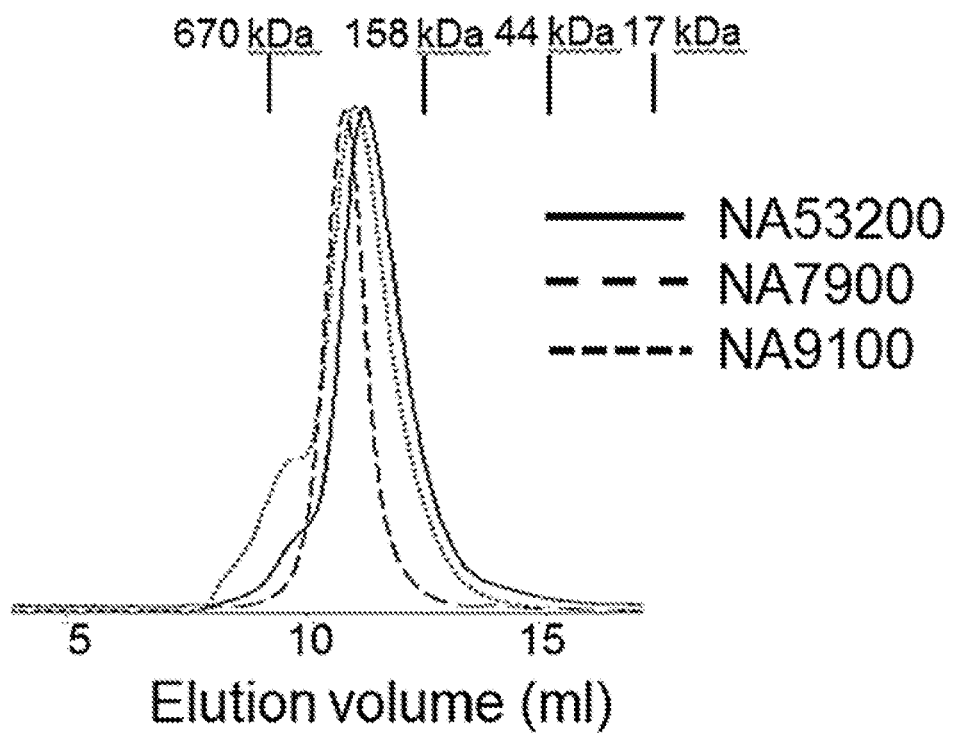
Figure 7B:
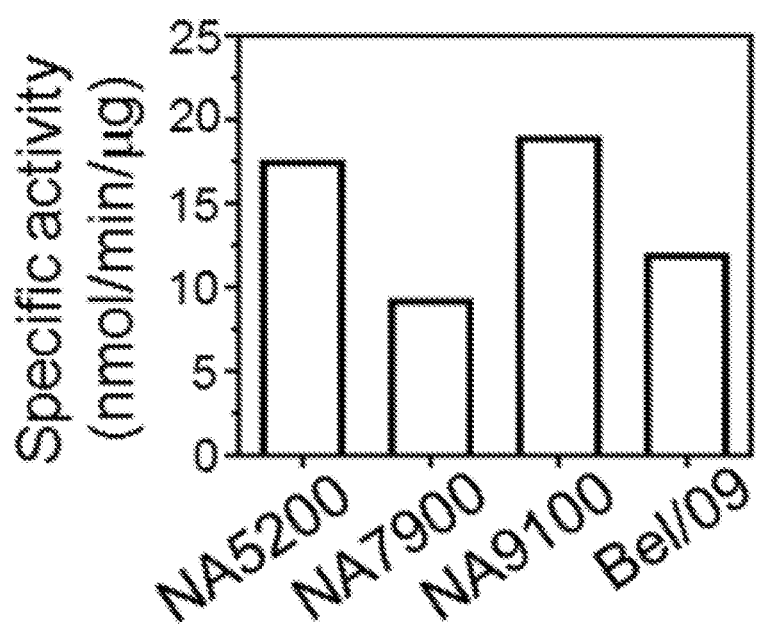

FIGS. 7A-7B provide the purification profile and specific enzymatic activity of recombinant tetrameric NA proteins. Specifically, soluble tetrameric proteins comprising NA5200, NA7900, or NA9100 NA polypeptides were produced in HEK 293T cells. Supernatant was collected and purified by affinity chromatography followed by size exclusion chromatography. FIG. 7A shows UV absorption profile after size exclusion chromatography for tetrameric soluble NA proteins. Vertical lines on top of the graph represent standards of known protein sizes. FIG. 7B shows results from MUNANA assays which measure the enzymatic activity of the recombinant tetrameric NA proteins, along with wild type A/Belgium/2009 (Bel/09) NA. Specific activity was calculated from a standard curve of 4-methylumbelliferone.

Figure 8A:
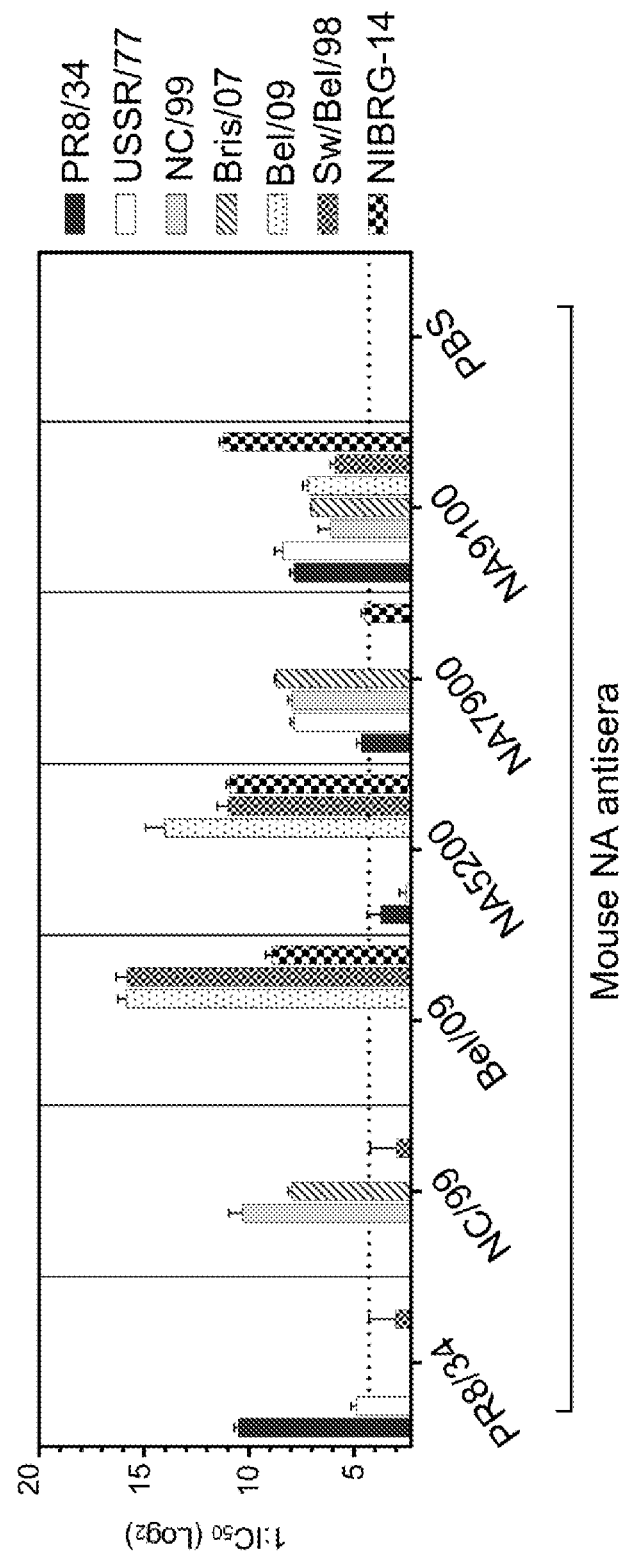
Figure 8B:
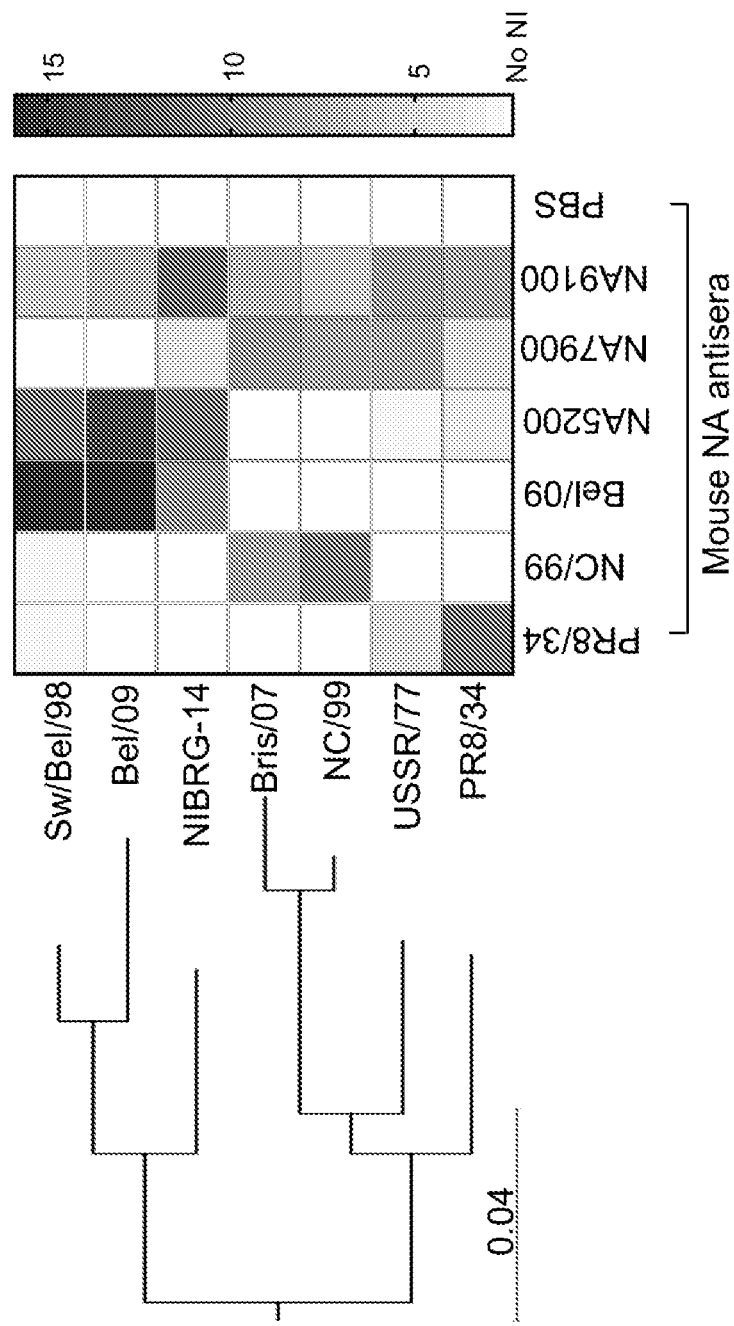

FIGS. 8A and 8B show that anti-sera raised against tetrameric NA proteins comprising NA5200, NA7900, or NA9100 exhibited NA inhibition (NAI) against a broader range of Type A influenza viruses (IAVs) than WT NA anti-sera. Mice were primed and boosted (with three weeks interval) subcutaneously with 1 μg of tetrameric NA proteins comprising A/Puerto Rico/8/1934 (PR8/34) NA, A/New Caledonia/1999 (NC/99) NA, A/Belgium/1/2009 (Bel/09; as described in www.ncbi.nlm.nih.gov/nuccore/?term=txid1502382) NA, NA5200, NA7900, NA9100, or PBS alone in the presence of Sigma Adjuvant System (SAS). After three weeks following the boost, anti-sera was collected and tested for their ability to inhibit the NA activity of a panel of N1 viruses. Increasing serial dilutions of heat-inactivated sera raised against the tetrameric NA proteins were mixed with a panel of H1N1 viruses. NA activity was determined at 18 hours post-infection on fetuin-coated plates by enzyme-linked lectin (ELLA) assay. Data show 1:$IC_{50}$ values as determined by non-linear regression analysis and plotted as $\log_2$ values. In FIG. 8A, data are reported as the mean (±1 SD) of the experiment performed in triplicate. The dotted line on the y axis represents the highest concentration of the sera tested, 4.3 (i.e. 1:20). Values below this line were extrapolated from the titration curve using a non-linear regression analysis, where a 2.3 (i.e., 1:5) was set as a truly positive titre. In FIG. 8B, data are shown as a heat map of 1:$IC_{50}$ values next to a phylogeny tree of NAs clustered by amino acid sequence of the head domain of the NAs.

FIGS. 9A-9L show that vaccination with tetrameric NA proteins comprising NA5200, NA7900, or NA9100 protected mice against lethal infections with Type A influenza viruses (IAVs). Mice were subcutaneously primed and boosted (after 3 weeks) with 1 μg of tetrameric protein comprising NA5200 (black circles), NA7900 (white squares) or NA9100 (white circles) in Sigma Adjuvant System (SAS), or mock-vaccinated with PBS in SAS (white triangles). Following vaccination, mice were infected intranasally with 5 LD50 of either A/Puerto Rico/8/1934 (PR8/34; FIGS. 9A-9B), A/USSR/90/1977 (USSR/77; FIGS. 9C-9D), A/New Caledonia/20/1999 (NC/99; FIGS. 9E-9F), A/Belgium/1/2009 (Bel/09; FIGS. 9G-9H), A/Swine/Belgium/1/1998 (Sw/Bel/98; FIGS. 9I-9J), or the H5N1 strain NIBRG-14 (H5N1) (FIGS. 9K-9L) and monitored for weight loss (left panels) or mortality (right panels). When a mouse had lost ≥25% of its original body mass the animal was culled. Weight loss data are reported as the mean percentage (±SEM) of original body weight over time (FIGS. 9A, 9C, 9E, 9G, 9I, and 9K, n=8-10). Survival data is shown as the percentage of survival over time (FIGS. 9B, 9D, 9F, 9H, 9J, and 9L, n=8-10). Weight loss over time was analysed by two-way ANOVA, assessing main column effects. Survival proportions were assessed using a two-tailed, log-rank (Mantel Cox) test. *$p<0.05$, **$p<0.01$, in comparison to mock-vaccinated mice.

FIGS. 10A-10F show that protection mediated by tetrameric NA proteins comprising NA5200, NA7900, or NA9100 resulted in a decrease of lung viral titers and inflammation within the lung milieu. Mice were subcutaneously primed and boosted (after 3 weeks) with 1 μg of tetrameric protein comprising NA5200, NA7900, or NA9100 in Sigma Adjuvant System (SAS) or mock-vaccinated with PBS in SAS. Following vaccination, mice were infected intranasally with 5 $LD_{50}$ of either A/Puerto Rico/8/1934 (PR8/34; FIGS. 10A-10B), A/New Caledonia/20/1999 (NC/99; FIGS. 10C-10D), or A/Belgium/1/2009 (Bel/09; FIGS. 10E-10F). On day 3 or day 7 post-infection BAL fluids and lungs were taken and lung homogenates were assessed for viral titers by $TCID_{50}$ (FIGS. 10A, 10C, and 10E). Cell-free BAL fluids were investigated for total levels of protein at day 7 (FIGS. 10B, 10D, and 10F). The dashed line, in viral titer graphs, indicates the cut-off limit of the $TCID_{50}$ assay (0.7). For protein levels; bars represent the mean viral titer±SD. Data are pooled from two independent experiments. Significance was assessed using the one-way ANOVA. *$p<0.05$, **$p<0.01$ in comparison to mock-vaccinated mice.

FIGS. 11A-11D show the broad NAI activity induced by Pdm09 (FIG. 11A) NA5200 (FIG. 11B), NA7900 (FIG. 11C), or NA9100 (FIG. 11D) after three rounds of DNA immunizations. The anti-sera were used for the passive transfer experiments shown in FIGS. 12-14F.

FIG. 12 shows the experimental schedule of the passive transfer experiments described in Example 6. Mice were treated intraperitoneally with 100 μl of heat-inactivated anti-sera raised against NA5200, NA7900, NA9100, pre-immune sera (negative; −ve control), or respective positive (+ve) control (immunization with tetNA+SAS; Bel09 or NewCa199). The mice were challenged 24 hours later.

Figures 13G, 13H:
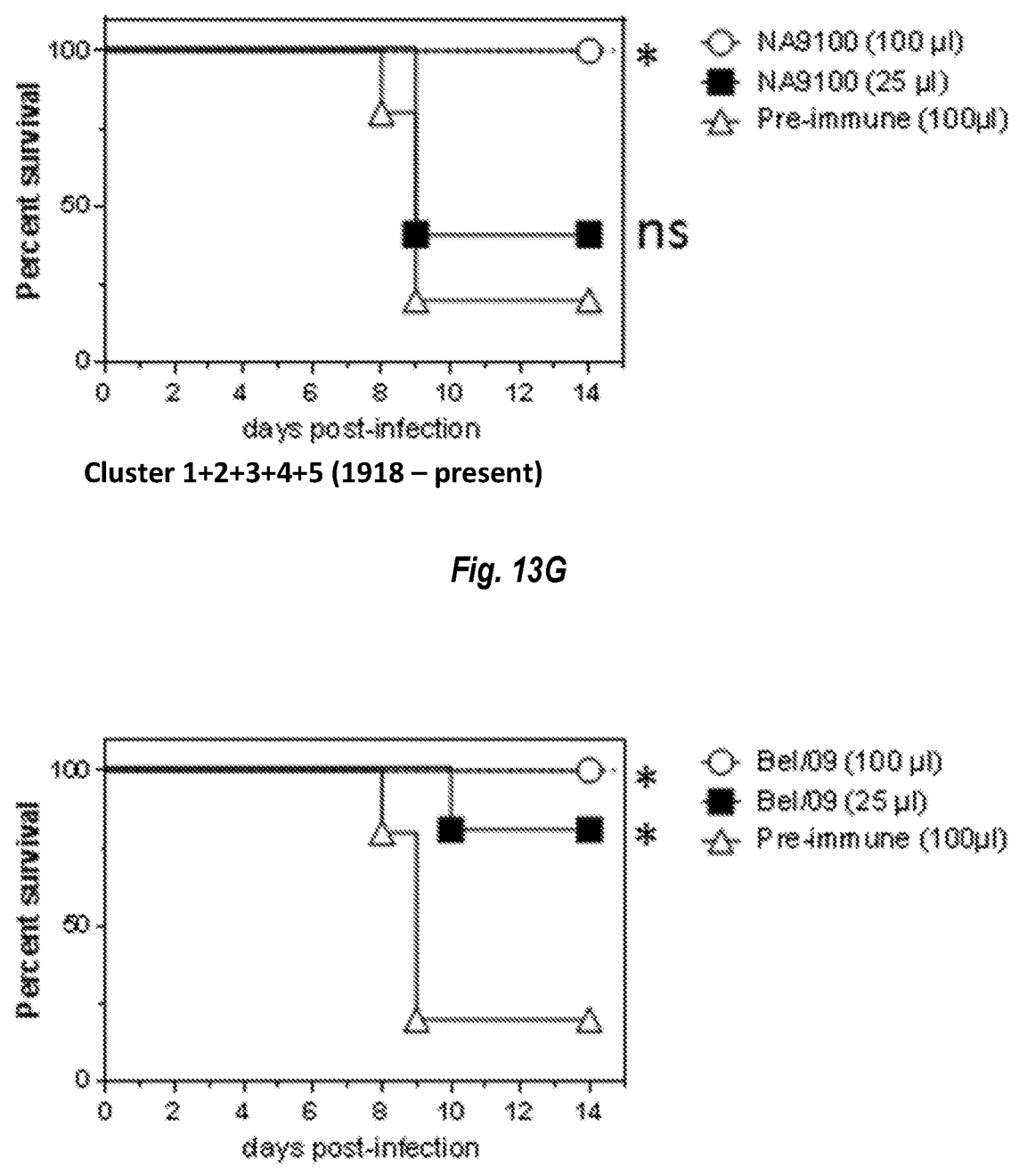

FIGS. 13A-13H show weight loss protection and survival of mice (5 animals per group) after 1 LD50 A/Belgium/1/2009 (Bel09) challenge. Mice were passively immunized 24 hours prior to the challenge with anti-sera raised against NA5200 (FIGS. 13A and 13C), NA7900 (FIGS. 13B and 13D), NA9100 (FIGS. 13E and 13G), or Bel/09 (FIGS. 13F and 13H) by DNA immunization. FIGS. 13A, 13B, 13E, and 13F show body weight data. FIGS. 13C, 13D, 13G, and 13H show percent survival data.

Figure 14A:
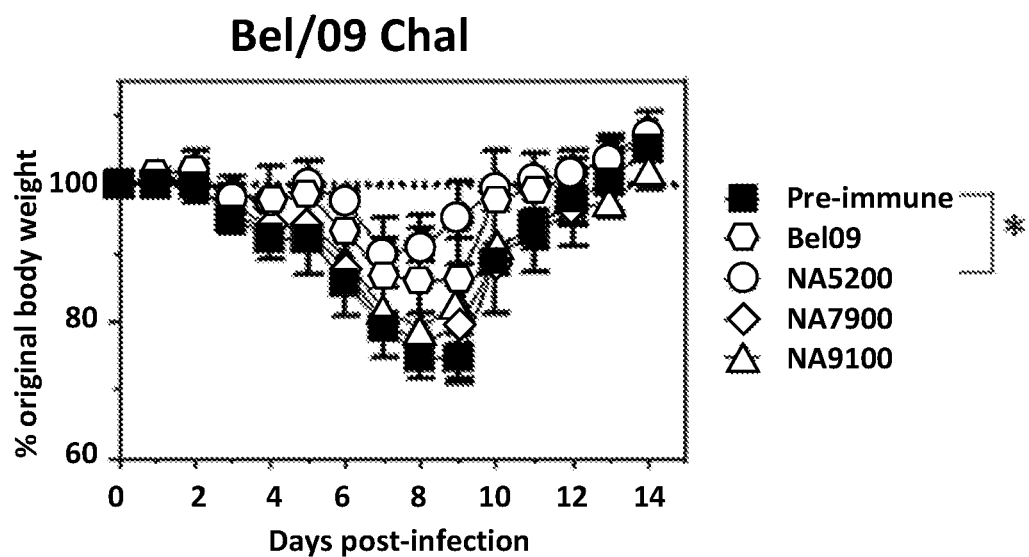
Figure 14B:
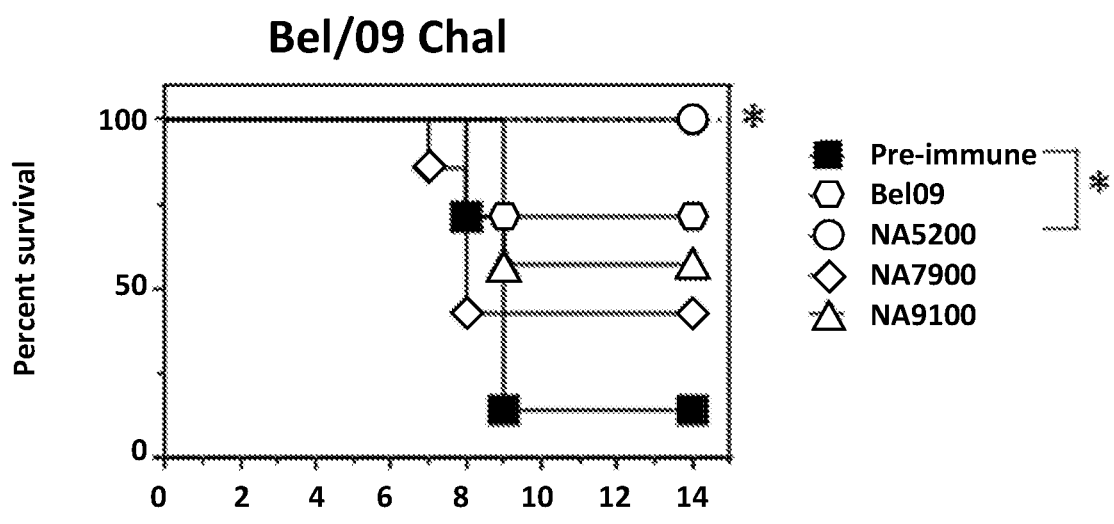
Figure 14C:
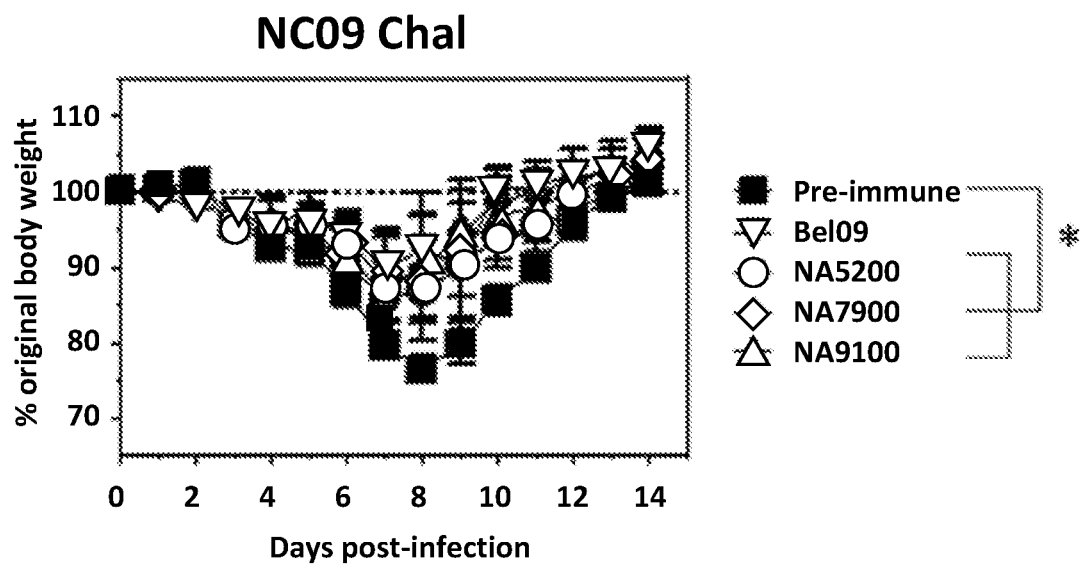
Figure 14D:
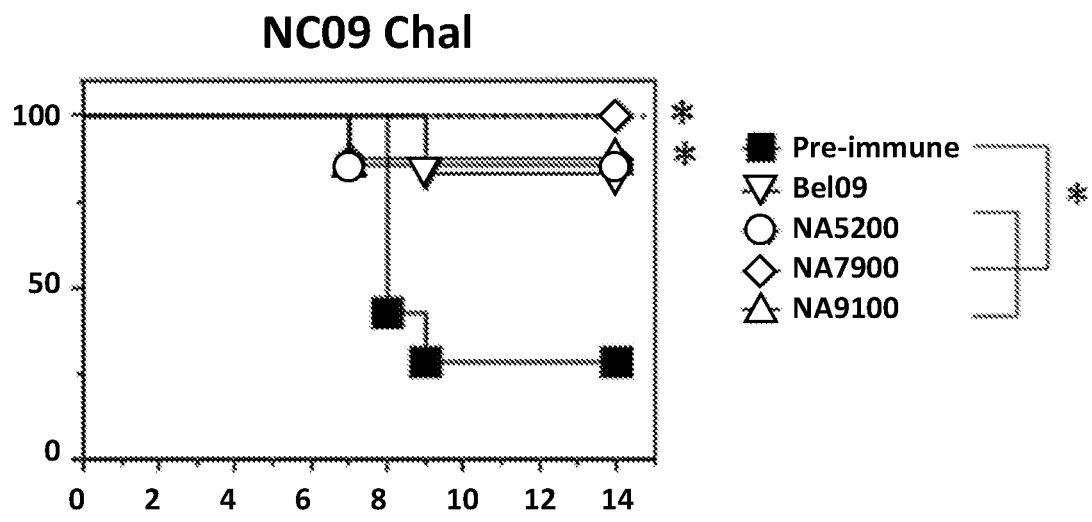
Figure 14E:
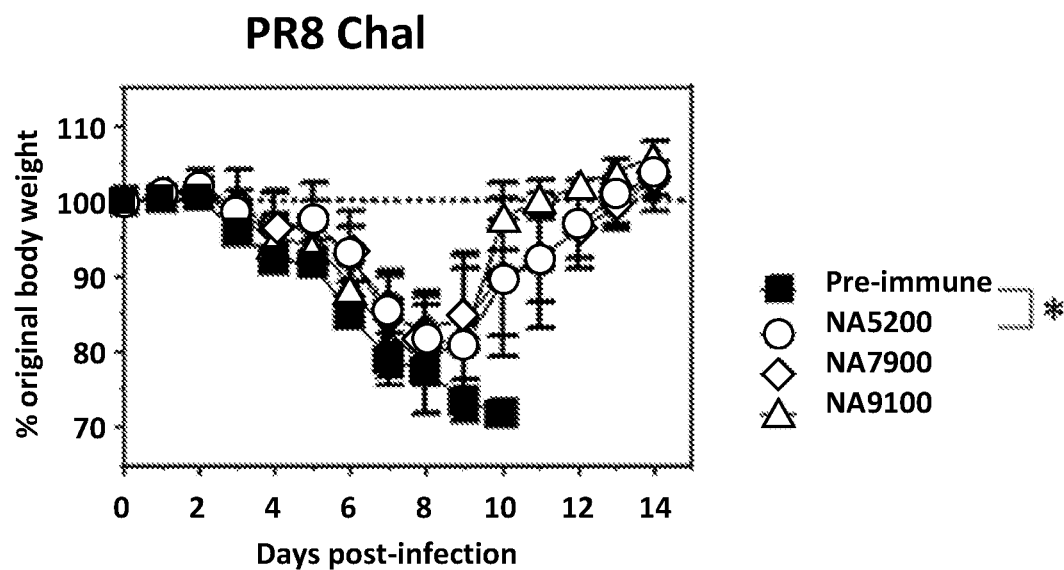
Figure 14F:
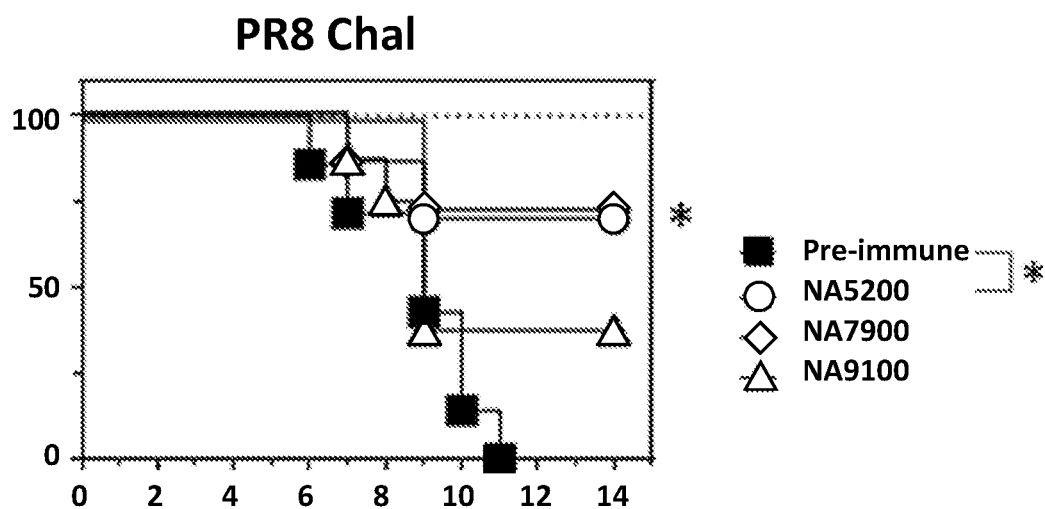

FIGS. 14A-14F show weight loss protection and survival of mice (7-8 animals per group) after 1 LD50 of A/Belgium/1/2009 (Bel09, FIGS. 14A and 14B), A/New Caledonia/20/1999 (NewCa199, FIGS. 14C and 14D) or A/Puerto Rico/8/1934 (PR8, FIGS. 14E and 14F) challenge. FIGS. 14A, 14C, and 14E present body weight data. FIGS. 14B, 14D, and 14F present survival data. Mice were passively immunized 24 hours prior to the challenge with anti-sera raised against NA5200, NA7900, or NA9100 by DNA immunization.

Figures 15A, 15B:
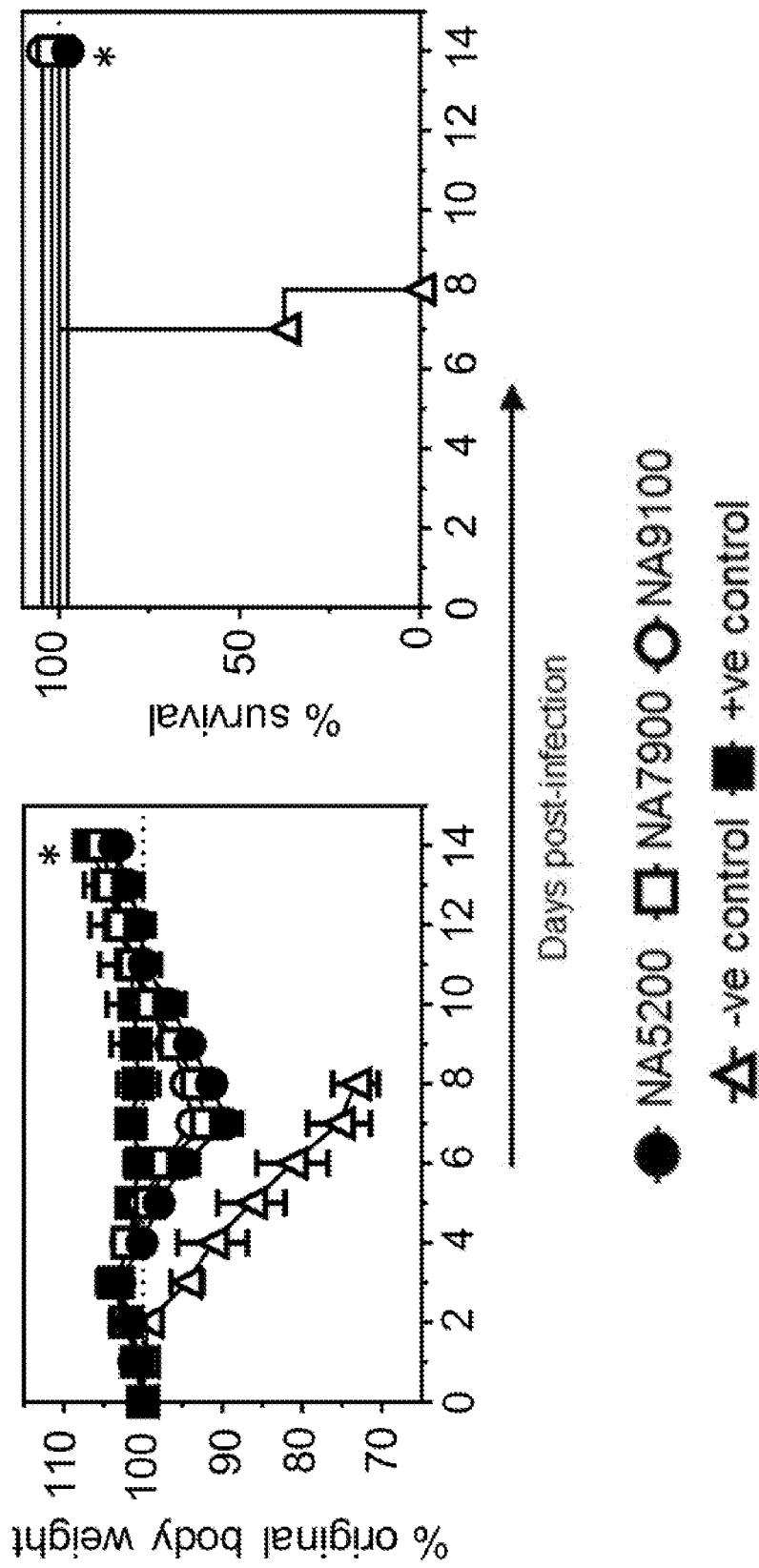
Figures 15E, 15F:
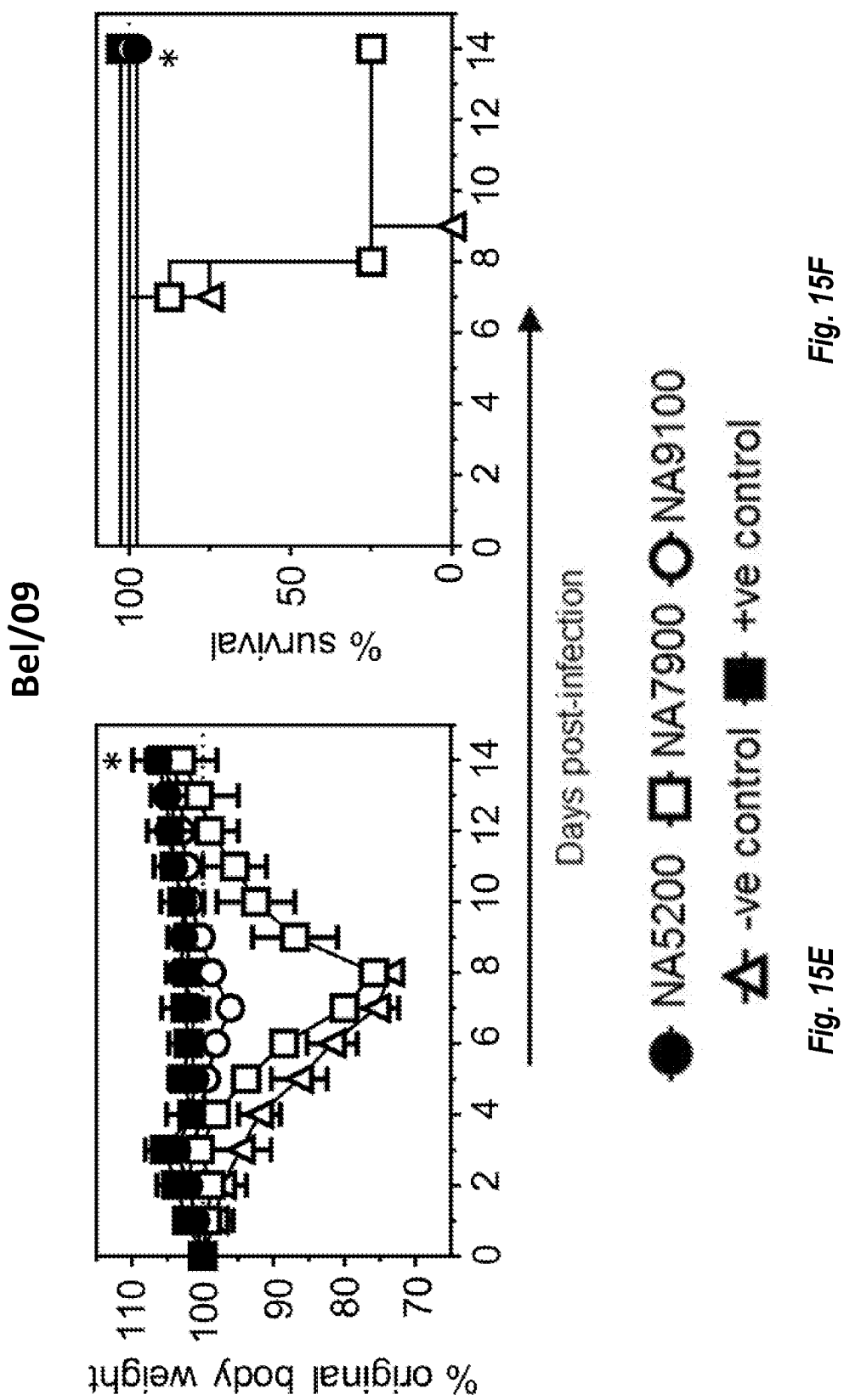

FIGS. 15A-15F demonstrate that antibodies played a major role in the protection provided by protein vaccination with tetrameric NA proteins comprising NA5200, NA7900, or NA9100. Anti-sera raised to the CBC NAs, wild type PR8/34 rNA, wild type NC/99 rNA, or wild type Bel/09 rNA (the same as used in FIGS. 8A-8B) were assessed for their ability to control influenza virus infection via passive transfer. Mice were treated intranasally with 20 µl of heat-inactivated anti-sera raised against tetrameric NA proteins comprising NA5200, NA7900, NA9100, PBS (negative; –ve control), or respective homologous rNA positive (+ve) control. The mice were challenged 24 hours later with 2 LD50 of A/Puerto Rico/8/1934 (PR8/34; FIGS. 15A-15B), A/New Caledonia/20/1999 (NC/99; FIGS. 15C-15D), or A/Belgium/1/2009 (Bel/09; FIGS. 15E-15F) intranasally and monitored over 14 days for weight loss (FIGS. 15A, 15C, and 15E) and survival (FIGS. 15B, 15D, and 15F). Weight loss data are reported as the mean percentage (±SEM) of original body weight over time (n=8) and survival data is shown as the percentage of survival over time (n=8). The data are pooled from two independent experiments. A two-way ANOVA was used to analyse weight loss over time assessing main column effects, while a two-tailed, log-rank (Mantel Cox) test was used to assess survival proportions. $*p<0.05$ in comparison to negative control mice.

FIGS. 16A-16L show that CBC NAs provide broader protection than wild type NAs and provide increased breadth when added to monovalent inactivated vaccine. Mice were primed and boosted at a 3 week interval via the subcutaneous route, in the presence of SAS adjuvant, with either 1 µg of wild type Bel/09 rNA, wild type NC/99 rNA, CBC NAs NA5200, or NA9100 (FIGS. 16A-16C and 16G-16I) or with 0.1 µs of monovalent pdm09 vaccine alone or in combination with 1 µg of wild type Bel/09 rNA, wild type NC/99 rNA, CBC NAs NA5200 or NA9100 (FIGS. 16D-16F and 16J-16L). A group of mice was also mock vaccinated. Three weeks following the final boost, the mice were challenged with 5 $LD_{50}$ of Bel/09 or NC/99 intranasally. Mice were monitored for weight loss (FIGS. 16A, 16D, 16G) and survival (FIGS. 16B, 16E, 16F) over 14 days. Mice were sacrificed if they lost ≥25% of their original body mass. On day 7 for Bel/09 infections and day 6 for NC/99 infections lungs homogenates were obtained and assessed for viral load via $TCID_{50}$. Weight loss data are shown as the mean percentage (±SEM) of original body weight over time and survival data are shown as the percentage of survival over time (n=9-10 pooled from 2 independent experiments for homologous rNA vaccinated mice (FIGS. 16A-16C and 16G-16I); and n=5 from one experiment for monovalent alone-vaccinated mice (FIGS. 16D-16F and 16J-16L)). Weight loss over time was analysed by two-way ANOVA, examining main column effects, and survival proportions were assessed using a two-tailed, log-rank (Mantel Cox) test. Significance was assessed using the one-way ANOVA for viral titres. $*p<0.05$, $p<0.01$ in comparison to homologous rNA vaccinated mice (FIGS. 16A-16C and 16G-16I); or in comparison to monovalent alone-vaccinated mice (FIGS. 16D-16F and 16J-16L**)).

Figure 17A:
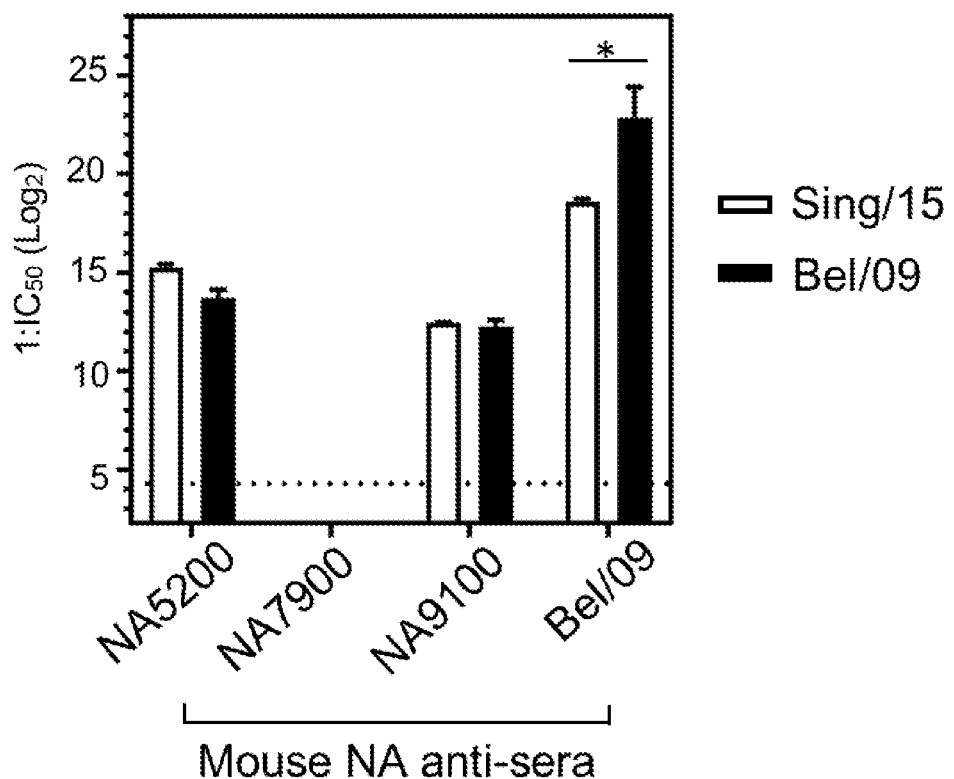
Figure 17B:
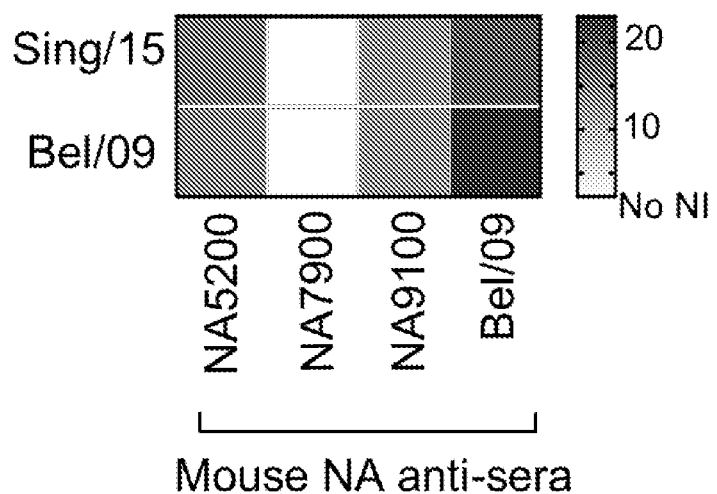

FIGS. 17A-17C show that anti-sera raised against tetrameric NA proteins comprising NA5200 and NA9100 mediated NAI against A(H1N1)pdm09 HA drift strain (HA drift as determined by CDC because of increased infection rates in middle aged adults) (FIGS. 17A-17B) and percent identity shared by CBC NAs and A(H1N1)pdm09 viruses (FIG. 17C). Mice were primed and boosted (with a three weeks' interval) with the tetrameric NA proteins comprising NA5200 or NA9100, in the presence of SAS. Dilutions of heat-inactivated sera raised to A/Belgium/1/2009 (Bel/09) rNA and recombinant consensus NAs were tested for their ability to mediate NAI against A/Belgium/1/2009 (Bel/09) and A/Singapore/GP1908/2015 (Sing/15) in an ELLA assay. In FIG. 17A, the dotted line at 1:4.3 represents the highest concentration of the sera tested. Values that fall below this line were extrapolated from the curve determined by a non-linear regression equation, where a 1:2.3 was set as a truly positive signal. Data are reported as the mean (±1 SD) of the experiment performed in triplicate. $*\ p<0.05$, one-way ANOVA. FIG. 17C shows percent identity shared by CBC NAs and A(H1N1)pdm09 viruses determined using the BlastP suite-2 sequences software. Numbers in bold identify where an $1:IC_{50}$ of >2.3 (i.e., 1:5) in the NAI assay is observed.

DESCRIPTION OF THE SEQUENCES

TABLE 1

Table of Sequences

| Description | Sequences | SEQ ID NO |
|---|---|---|
| Cluster-based consensus (CBC) neuraminidase (NA) sequences generated by the combination of swine-like and pandemic-like sequence clusters (NA5200) | MNPNQKIITIGSVCMTIGMANLILQI TABLE 1 -continued Table of Sequences

| Description | Sequences | SEQ ID NO |
|---|---|---|
| CBC NA sequences generated by the combination of seasonal-like sequence clusters (NA7900) | MNPNQKIITIGSICMAIGIISLILQIGNIISIWVSHSIQTGSQNHIGICNQRIITYENSTWVNQTYVNINNINVVA GKDITSVILAGNSSLCPIRGWAIYSKDNSIRIGSKGDVFVIREPFISCSHLECRIFFLIQGALLNDKHSNGTVKDR SPYRALMSCPVGEAPSPYNSRFESVAWSASACHDGMGWLTIGISGPDNGAVAVLKYNGIITETIKSWRKNILRIQE SECVCVNGSCFTIMIDGPSDGLASYKIFKIEKGKVIKSIELDAPNSHYEECSCYPDTGKVMCVCRDNWHGSNRPWV SFNQNLDYQIGYICSGVFGDNPRPKDGIGSCGPVTVDGANGVKGFSYRYGNGVWIGRIKSNSSRKGFEMIWDPNGW TETDSSFLVKQDVVAITDWSGYSGSFVQHPELTGLDCMRPCFWVELIRGLPREDTIWTSGSSISFCGVNSDIVNWS WPDGAELPFTIDK | 2 |
| CBC NA sequences generated by the combination of all five sequences clusters (NA9100) | MNPNQKIITIGSICMAIGIISLILQIGNIISIWVSHSIQTGSQNHIGICNQRIITYENSTWVNQTYVNINNINVVA GKDITSVILAGNSSLCPIRGWAIYSKDNSIRIGSKGDVFVIREPFISCSHLECRIFFLIQGALLNDKHSNGTVKDR SPYRILMSCPVGEAPSPYNSRFESVAWSASACHDGMGWLTIGISGPDNGAVAVLKYNGIIDTIKSWRNNILRIQE SECVCINGSCFTIMIDGPSDGQASYKIFKIEKGKVIKSIELDAPNSHYEECSCYPDTGKVVCVCRDNWHGSNRPWV SFDQNLDYQIGYICSGVFGDNPRPNDGIGSCGPVISNGANGVKGFSFRYGNGVWIGRIKSNSSRKGFEMIWDPNGW TETDSSFSVKQDIVAITDWSGYSGSFVQHPELTGLDCMRPCFWVELIRGLPKENTIWTSGSSISFCGVNSDTVGWS WPDGAELPFTIDK | 3 |
| Helical peptide derived from Tetrabrachion | IINETADDIVYRLIVIIDDRYESLKNLITLRADRLEMIINDNVSTILASI | 4 |
| N-terminal CD5-derived secretion signal | MPMGSLQPLATLYLLGMLVASVL | 5 |
| Strep-tag | WSHPQFEK | 6 |
| NAcbc1 | MNPNQKIITI GSVCMTIGMA NLILQIGNII SIWISHSIQL GNQNQIETCN QSVITYENNT WVNQTYVNIS NTNFAAGQSV VSVKLAGNSS LCPVSGWAIY SKDNSIRIGS KGDVFVIREP FISCSPLECR TFFLTQGALL NDKHSNGTIK DRSPYRTLMS CPIGEVPSPY NSRFESVAWS ASACHDGINW LTIGISGPDN GAVAVLKYNG IITDTIKSWR NNILRTQESE CACVNGSCFT VMTDGPSDGQ ASYKIFRIEK GKIVKSVEMN APNYHYEECS CYPDSSEITC VCRDNWHGSN RPWVSFNQNL EYQIGYICSG IFGDNPRPND KTGSCGPVSS NGANGVKGFS FKYGNGVWIG RTKSISSRNG FEMIWDPNGW TGIDNNFSIK QDIVGINEWS GYSGSFVQHP ELTGLDCIRP CFWVELIRGR PKENTIWTSG SSISFCGVNS DTVGWSWPDG AELPFTIDK | 7 |
| NAcbc2 | MNINQRIITI GTVCLIVGII SLLLQIGNIV SLWISHSIQT GEKNHPEICN QSVITYENNT WVNQTYVNIS NTNIAAGQGV TSIILAGNSS LCPISGWAIY SKDNSIRIGS KGDIFVIREP FISCSHLECR TFFLTQGALL NDKRHSNGTVK DRSPYRTLMS CPIGEAPSPY NSRFESVAWS ASACHDGMGW LTIGISGPDN GAVAVLKYNG IITDTIKSWR NKILRTQESE CVCINGSCFT IMTDGPSNGQ ASYKIFKMEK GKIIKSIELD APNYHYEECS CYPDTGKVVC VCRDNWHASN RPWVSFDQNL DYQIGYICSG VFGDNPRSND GKGNCGPVLS NGANGVKGFS FRYGNGVWIG RTKSISSRSG FEMIWDPNGW TETDSSFSMK QDIIALTDWS GYSGSFVQHP ELTGMNCIRP CFWVELIRGQ PKESTIWTSG SSISFCGVDS ETASWSWPDG ADLPFTIDK | 8 |
| NAcbc3 | MNPNQKIITI GSISIAIGII SLMLQIGNII SIWASHSIQT GSQNHTGICN QRIITYENST WVNHTYVNIN NTNVVAGKDK TSVTLAGNSS LCSISGWAIY TKDNSIRIGS KGDVFVIREP FISCSHLECR TFFLTQGALL NDKHSNGTVK DRSPYRALMS CPLGEAPSPY NSKFESVAWS ASACHDGMGW LTIGISGPDN GAVAVLKYNG IITGTIKSWK KQILRTQESE CVCMNGSCFT IMTDGPSNGA ASYKIFKIEK GKVTKSIELN APNFHYEECS CYPDTGKVVC VCRDNWHGSN RPWVSFNQNL DYQIGYICSG VFGDNPRPED GEGSCNPVTV DGANGVKGFS YKYGNGVWIG RTKSNRLRKG FEMIWDPNGW TNTDSDFSVK QDVVAITDWS GYSGSFVQHP ELTGLDCIRP CFWVELVRGL PRENTIWTSG SSISFCGVNS DTANWSWPDG AELPFTIDK | 9 |
| NAcbc4 | MNPNQKIITI GSICMAIGII SLILQIGNII SIWVSHSIQT GSQNHTGICN QRIITYENST WVNQTYVNIN NTNVVAGKDT TSMTLAGNSS LCPIRGWAIY SKDNSIRIGS KGDVFVIREP FISCSHLECR TFFLTQGALL NDKHSNGTVK DRSPYRALMS CPIGEAPSPY NSRFESVAWS ASACHDGMGW LTIGISGPDD GAVAVLKYNG IITETIKSWR KRILRTQESE CVCVNGSCFT IMTDGPSDGP ASYRIFKIEK GKITKSIELD APNSHYEECS CYPDTGTVMC VCRDNWHGSN RPWVSFNQNL DYQIGYICSG VFGDNPRPKD GKGSCDPVTV DGADGVKGFS YRYGNGVWIG RTKSNSSRKG FEMIWDPNGW TDTDSNFLVK QDVVAMTDWS GYSGSFVQHP ELTGLDCMRP CFWVELIRGR PREKTIWTSG SSISFCGVNS DTVNWSWPDG AELPFTIDK | 10 |
| NAcbc5_01 | MNPNQKIITI GSICMVVGII SLILQIGNII SIWISHSIQT GSQNHTGICN QSIITYKNST WVNQTYVNIS NTNVVAGKDT TSVILIGNSS LCPIRGWAIY SKDNSIRIGS KGDVFVIREP FISCSHLECR TFFLTQGALL NDKHSNGTVK DRSPYRALMS CPVGEAPSPY NSRFESVAWS ASACHDGMGW LTIGISGPDD GAVAVLKYNG IITETIKSWR KNILRTQESE CACVNGSCFT IMTDGPSDGL ASYKIFKIEK GKVTKSIELD APNSHYEECS CYPDTGKVMC VCRDNWHGSN RPWVSFDQNL DYQIGYICSG VFGDNPRPKD GTGSCGPVYV DGANGVKGFS YRYGNGVWIG RTKSQSSRKG FEMIWDPNGW TETDSSFSVK QDVVAMTDWS GYSGSFVQHP ELTGLDCMRP CFWVELIRGR PKEDTIWTSG SSISFCGVNS DTVDWSWPDG AELPFTIDK | 11 |
| NAcbc5_02 | MNPNQKIITI GSICMVVGII SLILQIGNII SIWISHSIQT GSQNHTGICN QSIITYKNST WVNQTYVNIS NTNVVAGKDT TSVILIGNSS LCPIRGWAIY SKDNSIRIGS KGDVFVIREP FISCSHLECR TFFLTQGALL NDKHSNGTVK DRSPYRALMS CPVGEAPSPY NSRFESVAWS ASACHDGMGW LTIGISGPDD GAVAVLKYNG IITETIKSWR KKILRTQESE CACVNGSCFT IMTDGPSDGL ASYKIFKIEK GKVTKSIELD APNSHYEECS CYPDTGKVMC VCRDNWHGSN RPWVSFDQNL DYQIGYICSG VFGDNPRPKD GTGSCGPVYV DGANGVKGFS YRYGNGVWIG RTKSDSSRKG FEMIWDPNGW TETDSSFLVK QDVVAMTDWS GYSGSFVQHP ELTGLDCMRP CFWVELIRGR PKEDTIWTSG SSISFCGVNS DTVDWSWPDG AELPFTIDK | 12 |

TABLE 1 -continued

Table of Sequences

| Description | Sequences | SEQ ID NO |
|---|---|---|
| NAcbc12 02 | MNPNQKIITI GSVCMTIGMA NLILQIGNII SIWISHSIQL GNQNQIETCN QSVITYENNT WVNQTYVNIS<br>NTNFAAGQSV VSVILAGNSS LCPISGWAIY SKDNSIRIGS KGDVFVIREP FISCSHLECR TFFLTQGALL<br>NDKHSNGTVK DRSPYRTLMS CPIGEAPSPY NSRFESVAWS ASACHDGMGW LTIGISGPDN GAVAVLKYNG<br>IITDTIKSWR NNILRTQESE CACVNGSCFT VMTDGPSDGQ ASYKIFKIEK GKIVKSVEMD APNYHYEECS<br>CYPDSGKVVC VCRDNWHGSN RPWVSFDQNL DYQIGYICSG VFGDNPRSND GTGSCGPVSS NGANGVKGFS<br>FRYGNGVWIG RTKSISSRKG FEMIWDPNGW TETDNSFSIK QDIVAINEWS GYSGSFVQHP ELTGMNCIRP<br>CFWVELIRGR PKENTIWTSG SSISFCGVNS DTVGWSWPDG ADLPFTIDK | 13 |
| NAcbc12 03 | MNPNQKIITI GSVCMTIGMA NLILQIGNII SIWISHSIQL GNQNQIETCN QSVITYENNT WVNQTYVNIS<br>NTNFAAGQSV VSIILAGNSS LCPISGWAIY SKDNSIRIGS KGDVFVIREP FISCSHLECR TFFLTQGALL<br>NDKHSNGTVK DRSPYRTLMS CPIGEAPSPY NSRFESVAWS ASACHDGMGW LTIGISGPDN GAVAVLKYNG<br>IITDTIKSWR NNILRTQESE CACINGSCFT VMTDGPSDGQ ASYKIFKIEK GKIVKSVEMD APNYHYEECS<br>CYPDSGKVVC VCRDNWHGSN RPWVSFDQNL DYQIGYICSG VFGDNPRSND GTGSCGPVSS NGANGVKGFS<br>FRYGNGVWIG RTKSISSRRG FEMIWDPNGW TETDNSFSIK QDIVAITEWS GYSGSFVQHP ELTGMNCIRP<br>CFWVELIRGQ PKENTIWTSG SSISFCGVNS DTVGWSWPDG ADLPFTIDK | 14 |
| NAcbc3-5 01 | MNPNQKIITI GSICMAIGII SLILQIGNII SIWVSHSIQT GSQNHTGICN QRIITYENST WVNQTYVNIN<br>NTNVVAGKDT TSVILAGNSS LCPIRGWAIY SKDNSIRIGS KGDVFVIREP FISCSHLECR TFFLTQGALL<br>NDKHSNGTVK DRSPYRALMS CPVGEAPSPY NSRFESVAWS ASACHDGMGW LTIGISGPDN GAVAVLKYNG<br>IITETIKSWR KNILRTQESE CVCVNGSCFT IMTDGPSDGL ASYKIFKIEK GKVTKSIELD APNSHYEECS<br>CYPDTGKVMC VCRDNWHGSN RPWVSFNQNL DYQIGYICSG VFGDNPRPKD GTGSCGPVTV DGANGVKGFS<br>YRYGNGVWIG RTKSNSSRKG FEMIWDPNGW TETDSSFSVK QDVVAITDWS GYSGSFVQHP ELTGLDCMRP<br>CFWVELIRGL PRENTIWTSG SSISFCGVNS DTVNWSWPDG AELPFTIDK | 15 |
| NAcbc3-5 03 | MNPNQKIITI GSICMAIGII SLILQIGNII SIWVSHSIQT GSQNHTGICN QRIITYENST WVNQTYVNIN<br>NTNVVAGKDT TSVTLAGNSS LCPIRGWAIY SKDNSIRIGS KGDVFVIREP FISCSHLECR TFFLTQGALL<br>NDKHSNGTVK DRSPYRALMS CPVGEAPSPY NSRFESVAWS ASACHDGMGW LTIGISGPDN GAVAVLKYNG<br>IITETIKSWR KRILRTQESE CVCVNGSCFT IMTDGPSDGL ASYKIFKIEK GKVTKSIELD APNSHYEECS<br>CYPDTGKVMC VCRDNWHGSN RPWVSFNQNL DYQIGYICSG VFGDNPRPKD GTGSCGPVTV DGANGVKGFS<br>YRYGNGVWIG RTKSNSSRKG FEMIWDPNGW TETDSSFLVK QDVVAITDWS GYSGSFVQHP ELTGLDCMRP<br>CFWVELIRGL PREDTIWTSG SSISFCGVNS DTVNWSWPDG AELPFTIDK | 16 |
| NAcbc1-5 01 | MNPNQKIITI GSICMAIGII SLILQIGNII SIWVSHSIQT GSQNHTGICN QRIITYENST WVNQTYVNIN<br>NTNVVAGKDT TSVILAGNSS LCPIRGWAIY SKDNSIRIGS KGDVFVIREP FISCSHLECR TFFLTQGALL<br>NDKHSNGTVK DRSPYRTLMS CPVGEAPSPY NSRFESVAWS ASACHDGMGW LTIGISGPDN GAVAVLKYNG<br>IITDTIKSWR NNILRTQESE CVCVNGSCFT IMTDGPSDGQ ASYKIFKIEK GKVTKSIELD APNSHYEECS<br>CYPDTGKVVC VCRDNWHGSN RPWVSFDQNL DYQIGYICSG VFGDNPRPND GTGSCGPVTS NGANGVKGFS<br>FRYGNGVWIG RTKSDSSRKG FEMIWDPNGW TETDSSFSVK QDIVAITDWS GYSGSFVQHP ELTGLDCMRP<br>CFWVELIRGL PKENTIWTSG SSISFCGVNS DTVGWSWPDG AELPFTIDK | 17 |
| NAcbc1-5 03 | MNPNQKIITI GSICMAIGII SLILQIGNII SIWVSHSIQT GSQNHTGICN QRIITYENST WVNQTYVNIN<br>NTNVVAGKDT TSVTLAGNSS LCPIRGWAIY SKDNSIRIGS KGDVFVIREP FISCSHLECR TFFLTQGALL<br>NDKHSNGTVK DRSPYRALMS CPVGEAPSPY NSRFESVAWS ASACHDGMGW LTIGISGPDN GAVAVLKYNG<br>IITDTIKSWR NRILRTQESE CVCVNGSCFT IMTDGPSDGQ ASYKIFKIEK GKVTKSIELD APNSHYEECS<br>CYPDTGKVMC VCRDNWHGSN RPWVSFDQNL DYQIGYICSG VFGDNPRPND GTGSCGPVTS NGANGVKGFS<br>FRYGNGVWIG RTKSDSSRKG FEMIWDPNGW TETDSSFSVK QDIVAITDWS GYSGSFVQHP ELTGLDCMRP<br>CFWVELIRGL PKENTIWTSG SSISFCGVNS DTVGWSWPDG AELPFTIDK | 18 |
| Linker sequence (between CD5 and His-tag) | SA | 19 |
| Thrombin cleavage site (including linkers before tetrabrachion domain) | GSGSLVPRGSPSRS | 20 |

DETAILED DESCRIPTION

Definitions

Adjuvant: As used herein, an adjuvant refers to a substance or vehicle that non-specifically enhances the immune response to an antigen. Adjuvants can include, without limitation, a suspension of minerals (e.g., alum, aluminum hydroxide, or phosphate) on which antigen is adsorbed; a water-in-oil or oil-in-water emulsion in which antigen solution is emulsified in mineral oil or in water (e.g., Freund's incomplete adjuvant). Sometimes killed mycobacteria is included (e.g., Freund's complete adjuvant) to further enhance antigenicity. Immuno-stimulatory oligonucleotides (e.g., a CpG motif) can also be used as adjuvants (for example, see U.S. Pat. Nos. 6,194,388; 6,207,646; 6,214, 806; 6,218,371; 6,239,116; 6,339,068; 6,406,705; and 6,429, 199). Adjuvants can also include biological molecules, such as Toll-Like Receptor (TLR) agonists and costimulatory molecules. Exemplary biological adjuvants include, but are not limited to, IL-2, RANTES, GM-CSF, TNF-α, IFN-γ, G-CSF, LFA-3, CD72, B7-1, B7-2, OX-40L, 41 BBL, or combinations thereof.

Antibody: As used herein, an antibody refers to a protein or a polypeptide that includes canonical immunoglobulin sequence elements sufficient to confer specific binding to a particular antigen. In some embodiments, the antibody is a classic antibody comprising two heavy chains and two light chains. Each heavy chain includes one variable region (e.g., $V_H$) and at least three constant regions (e.g., $CH_1$, $CH_2$ and $CH_3$), and each light chain includes one variable region ($V_L$) and one constant region (CO. The variable regions determine the specificity of the antibody. Each variable region comprises three hypervariable regions also known as complementarity determining regions (CDRs) flanked by four relatively conserved framework regions (FRs). The three CDRs, referred to as CDR1, CDR2, and CDR3, contribute to the antibody binding specificity. In some embodiments, antibody also refers to an "antibody fragment" or "antibody fragments," which include a portion of an intact antibody, such as, for example, the antigen-binding or variable region of an antibody. Examples of "antibody fragments" include Fab, Fab', F(ab')2, Fv fragments, triabodies, tetrabodies, linear antibodies, single-chain antibody molecules, and CDR-containing moieties included in multispecific antibodies. In certain embodiments, any polypeptide or complex of polypeptides that includes sufficient immunoglobulin domain sequences as found in natural antibodies can be referred to and/or used as an "antibody", whether such polypeptide is naturally produced (e.g., generated by an organism reacting to an antigen), or produced by recombinant engineering, chemical synthesis, or other artificial system or methodology. In some embodiments, an antibody is monoclonal; in some embodiments, an antibody is polyclonal. In some embodiments, the antibody is a chimeric antibody. In some embodiments, the antibody is humanized.

Antigen: As used herein, an antigen refers to an agent that elicits an immune response, and/or an agent that is bound by a T cell receptor (e.g., when presented by an MHC molecule) or to an antibody (e.g., produced by a B cell) when exposed or administered to an organism. In some embodiments, an antigen elicits a humoral response (e.g., including production of antigen-specific antibodies) in an organism. Alternatively or additionally, in some embodiments, an antigen elicits a cellular response (e.g., involving T-cells whose receptors specifically interact with the antigen) in an organism. It will be appreciated by those skilled in the art that a particular antigen may elicit an immune response in one or several members of a target organism (e.g., mice, rabbits, primates, humans), but not in all members of the target organism species. In some embodiments, an antigen elicits an immune response in at least about 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% of the members of a target organism species. In some embodiments, an antigen binds to an antibody and/or T cell receptor, and may or may not induce a particular physiological response in an organism. In some embodiments, for example, an antigen may bind to an antibody and/or to a T cell receptor in vitro, whether or not such an interaction occurs in vivo. In some embodiments, an antigen reacts with the products of specific humoral or cellular immunity, including those induced by heterologous immunogens. In some embodiments, an influenza NA polypeptide or immunogenic fragment thereof is an antigen.

Antigenic drift: As used herein, antigenic drift refers to mutations in HA or NA antigens that occur relatively often. Antigenic drift can enable the influenza virus to evade immune recognition and may decrease vaccine efficacy.

Antigenic shift: As used herein, antigenic shift refers to major changes in HA or NA antigens caused by reassortment of genetic material between different influenza strains.

Approximately: As used herein, the term "approximately" or "about," as applied to one or more values of interest, refers to a value that is similar to a stated reference value. In certain embodiments, the term "approximately" or "about" refers to a range of values that fall within about 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Epitope: As used herein, refers to any moiety that is specifically recognized by an immunoglobulin (e.g., antibody or receptor) binding component in whole or in part. In some embodiments, an epitope is comprised of a plurality of chemical atoms or groups on an antigen. In some embodiments, such chemical atoms or groups are surface-exposed when the antigen adopts a relevant three-dimensional conformation. In some embodiments, such chemical atoms or groups are physically near to each other in space when the antigen adopts such a conformation. In some embodiments, at least some of the chemical atoms or groups are physically separated from one another when the antigen adopts an alternative conformation (e.g., is linearized)

Host: As used herein, the term "host" refers to a system (e.g., a cell, an organism, etc.) in which a polypeptide of interest is present. In some embodiments, a host is a system that is susceptible to infection with a particular infectious agent. In some embodiments, a host is a system that expresses a particular polypeptide or protein of interest.

Host cell: As used herein, "host cell" refers to a cell into which exogenous DNA (recombinant or otherwise) has been introduced. For example, host cells may be used to produce the influenza NA polypeptides described herein by standard recombinant techniques. Persons skilled in the art understand that such terms refer not only to the particular subject cell, but, to the progeny of such a cell. Because certain modifications may occur in succeeding generations due to either mutation or environmental influences, such progeny may not, in fact, be identical to the parent cell, but are still included within the scope of the term "host cell" as used herein. In some embodiments, host cells include any prokaryotic and eukaryotic cells suitable for expressing an exogenous DNA (e.g., a recombinant nucleic acid sequence). Exemplary cells include prokaryotic or eukaryotic cells (single-cell or multiple-cell), bacterial cells (e.g., strains of *E. coli, Bacillus* spp., *Streptomyces* spp., etc.), mycobacteria cells, fungal cells, yeast cells (e.g., *S. cerevisiae, S. pombe, P. pastoris, P. methanolica*, etc.), plant cells, insect cells (e.g., SF-9, SF-21, baculovirus-infected insect cells, *Trichoplusia ni*, etc.), non-human animal cells, human cells, or cell fusions (e.g., hybridomas or quadromas). In some embodiments, the cell is a human, monkey, ape, hamster, rat, or mouse cell. In some embodiments, the cell is eukaryotic and is selected from, but not limited to, CHO (e.g., CHO K1, DXB-11 CHO, Veggie-CHO), COS (e.g., COS-7), retinal cell, Vero, CV1, kidney cell (e.g., HEK293, 293 EBNA, MSR 293, MDCK, HaK, BHK), HeLa, HepG2, WI38, MRC 5, Colo205, HB 8065, HL-60, (e.g., BHK21), Jurkat, Daudi, A431 (epidermal), CV-1, U937, 3T3, L cell, C127 cell, SP2/0, NS-0, MMT 060562, Sertoli cell, BRL 3A cell, HT1080 cell, myeloma cell, tumor cell, and a cell line derived from an aforementioned cell. In some embodiments, the cell comprises one or more viral genes, e.g., a retinal cell that expresses a viral gene (e.g., a PER. C6™ cell).

Immune response: As used herein, the term "immune response" refers to a response of a cell of the immune system, such as a B cell, T cell, dendritic cell, macrophage or polymorphonucleocyte, to a stimulus such as an antigen or vaccine. An immune response can include any cell of the body involved in a host defense response, including for example, an epithelial cell that secretes an interferon or a cytokine. An immune response includes, but is not limited to, an innate and/or adaptive immune response. As used herein, a protective immune response refers to an immune response that protects a subject from infection (e.g., prevents infection or prevents the development of disease associated with infection). Methods of measuring immune responses are well known in the art and include, for example, by measuring proliferation and/or activity of lymphocytes (such as B or T cells), secretion of cytokines or chemokines, inflammation, antibody production and the like.

Immunogen: As used herein, the term "immunogen" refers to a compound, composition, or substance which is capable of, under appropriate conditions, stimulating an immune response, such as the production of antibodies or a T cell response in an animal, including compositions that are injected or absorbed into an animal. As used herein, an "immunogenic composition" is a composition comprising an immunogen (such as an NA polypeptide or a tetrameric NA protein). As used herein, "immunize" means to render a subject protected from an infectious disease, such as by vaccination.

Influenza virus: As used herein, refers to a segmented negative-strand RNA virus that belongs to the Orthomyxoviridae family.

Influenza vaccine: As used herein, refers to an immunogenic composition capable of stimulating an immune response, administered for the prevention, amelioration, or treatment of influenza virus infection. An influenza vaccine may include, for example, attenuated or killed (e.g., split) influenza virus, virus-like particles (VLPs) and/or antigenic polypeptides or proteins (e.g., the NA polypeptides or tetrameric NA proteins described herein) or DNA derived from them, or any recombinant versions of such immunogenic materials. Influenza vaccines also include DNA and viral vector based vaccines. Vaccines contemplated herein may optionally include one or more adjuvants.

Isolated: As used herein, refers to an agent or entity that has either (i) been separated from at least some of the components with which it was associated when initially produced (whether in nature or in an experimental setting); or (ii) produced by the hand of man. Isolated agents or entities may be separated from at least about 10%, at least about 20%, at least about 30%, at least about 40%, at least about 50%, at least about 60%, at least about 70%, at least about 80%, at least about 90%, or more of the other components with which they were initially associated. In some embodiments, isolated agents are more than 90%, 91%, 92%, 93%, 94%, 95%, 96%, 97%, 98%, 99% pure. As used herein, a substance is "pure" if it is substantially free of other components. In some embodiments, as will be understood by those skilled in the art, a substance may still be considered "isolated" or even "pure", after having been combined with certain other components such as, for example, one or more carriers or excipients (e.g., buffer, solvent, water, etc.); in such embodiments, percent isolation or purity of the substance is calculated without including such carriers or excipients. In exemplary embodiments, a biological polymer such as a polypeptide or polynucleotide that occurs in nature is considered to be "isolated" when, a) by virtue of its origin or source of derivation is not associated with some or all of the components that accompany it in its native state in nature; b) it is substantially free of other polypeptides or nucleic acids of the same species from the species that produces it in nature; c) is expressed by or is otherwise in association with components from a cell or other expression system that is not of the species that produces it in nature. Thus, for instance, in some embodiments, a polypeptide that is chemically synthesized or is synthesized in a cellular system different from that which produces it in nature is considered to be an "isolated" polypeptide. Alternatively or additionally, in some embodiments, a polypeptide that has been subjected to one or more purification techniques may be considered to be an "isolated" polypeptide to the extent that it has been separated from other components a) with which it is associated in nature; and/or b) with which it was associated when initially produced.

Neuraminidase or NA protein: As used herein, neuraminidase of NA protein refers to a structural glycoprotein on the surface of the influenza viral membrane. NA is responsible for the release of influenza virus from infected cells by the removal of sialic acid from cell surface proteins. Currently, there are 11 known NA subtypes (i.e., N1, N2, N3, N4, N5, N6, N7, N8, N9, N10, and N11), which are defined by their interaction with antibodies. All variants of a given NA subtype can be neutralized by a similar set of antibodies. NA inhibition (NAI) assays can be used to identify the NA glycoprotein subtype in a particular influenza virus and thus classify the virus. Humans are generally infected by viruses of the N1 or N2 subtypes. In some embodiments, the NA protein may be monomeric and comprises a single NA polypeptide. In other embodiments, the NA protein is tetrameric and comprises four NA polypeptides. FIG. 2A illustrates embodiments of monomeric and tetrameric NA proteins as described herein. As used herein, "neuraminidase polypeptide" or "NA polypeptide" refers to a polypeptide whose amino acid sequence includes at least one characteristic sequence of NA. NA polypeptides can include full length influenza NA polypeptide sequences and fragments thereof. Those of ordinary skill in the art can readily identify sequences that are characteristic of NA polypeptides generally, and/or of particular NA polypeptides (e.g., N1 or N2 polypeptides), or of NAs that mediate infection of particular hosts (e.g., avian, camel, canine, cat, civet, equine, human, leopard, mink, mouse, seal, stone martin, swine, tiger, whale, etc.). The National Center for Biotechnology Information (NCBI) maintains a database of NA polypeptide sequences.

Outbreak: As used herein, an influenza virus "outbreak" refers to a collection of virus isolates from within a single country in a given year.

Pandemic, seasonal, swine strains: As used herein, a "pandemic" influenza strain is one that has caused or has capacity to cause pandemic infection of human populations. In some embodiments, a pandemic strain has caused pandemic infection. In some embodiments, such pandemic infection involves epidemic infection across multiple territories. In some embodiments, pandemic infection involves infection across territories that are separated from one another (e.g., by mountains, bodies of water, as part of distinct continents, etc.) such that infections ordinarily do not pass between them. In some embodiments, pandemic influenza strains include those arising from reassortment (antigenic shift occurring approximately every 20-30 years) between human and avian or swine influenza viruses that result in a virus with a novel HA or NA of avian or swine origin, against which humans lack immunity. In other words, the human population is considered to be naive, having no or little resistance either as a result of prior vaccination or prior exposure. Pandemic and seasonal strains are antigenically distinct and by sequence quite different. In general, seasonal influenza strains may be defined as circulating strains from a particular season or a particular year, for example, 1986 through to 2009 (including 2009 sequences that are not pandemic) and other strains that have substantially similar genetic sequences encoding antigenic regions (i.e., similar in antigenic sequence space). Swine influenza strains refer to any influenza strain that is related to viruses endemic in pigs. Exemplary pandemic strains include, without limitation, A/California/07/2009, A/California/04/2009, A/Belgium/145/2009, A/South Carolina/01/1918, and A/New Jersey/1976. Pandemic subtypes include, in particular, the H5N1, H2N2, H9N2, H7N7, H7N3, H7N9 and H10N7 subtypes. Exemplary seasonal strains include, without limitation, A/Puerto Rico/8/1934, A/Fort Monmouth/1/1947, A/Chile/1/1983, A/Texas/36/1991, A/Singapore/6/1986, A/Beijing/32/1992, A/New Caledonia/20/1999, A/Solomon Islands/03/2006, and A/Brisbane/59/2007. Exemplary swine strains include, without limitation, A/New Jersey/1976 isolates and A/California/07/2009. Additional influenza pandemic, seasonal, and/or swine strains are known in the art.

Prevention: As used herein, refers to prophylaxis, avoidance of disease manifestation, a delay of onset, and/or reduction in frequency and/or severity of one or more symptoms of a particular disease, disorder or condition (e.g., infection for example with influenza virus). In some embodiments, prevention is assessed on a population basis such that an agent is considered to "prevent" a particular disease, disorder or condition if a statistically significant decrease in the development, frequency, and/or intensity of one or more symptoms of the disease, disorder or condition is observed in a population susceptible to the disease, disorder, or condition.

Recombinant: As used herein, the term "recombinant" is intended to refer to polypeptides or proteins (e.g., NA polypeptides or tetrameric NA proteins as described herein) that are designed, engineered, prepared, expressed, created, or isolated by recombinant means, such as polypeptides expressed using a recombinant expression vector transfected into a host cell, polypeptides isolated from a recombinant, combinatorial polypeptide library, or polypeptides prepared, expressed, created or isolated by any other means that involves splicing selected sequence elements to one another. In some embodiments, one or more of such selected sequence elements is found in nature. In some embodiments, one or more of such selected sequence elements is designed in silico. In some embodiments, one or more such selected sequence elements results from mutagenesis (e.g., in vivo or in vitro) of a known sequence element, e.g., from a natural or synthetic source. In some embodiments, one or more such selected sequence elements results from the combination of multiple (e.g., two or more) known sequence elements that are not naturally present in the same polypeptide (e.g., two epitopes from two separate NA polypeptides).

Signal sequence, secretion signal, or secretion signal peptide: the terms as used herein, refers to a peptide sequence that signals for secretion from a cell. A secretion signal can lead to secretion of a polypeptide or protein that would otherwise not be secreted.

Tetramerization domain: the term as used herein refers to an amino acid sequence encoding a domain that causes the tetrameric assembly of a polypeptide or protein. A tetramerization domain that is not native to a particular protein may be termed an artificial or a heterologous tetramerization domain. Exemplary tetramerization domains include, but are not limited to, sequences from Tetrabrachion, GCN4 leucine zippers, or vasodilator-stimulated phosphoprotein (VASP).

Sequence identity: The similarity between amino acid sequences or nucleic acid sequences is expressed in terms of the similarity and/or identity between the sequences. Sequence similarity may include elements of sequence identity and sequences that are closely related by homology. Sequence similarity is frequently measured in terms of percentage similarity (or identity or homology); the higher the percentage, the more similar the two sequences are. Homologs or variants of a given gene or protein will possess a relatively high degree of sequence identity when aligned using standard methods. Methods of alignment of sequences for comparison are well known in the art. Various programs and alignment algorithms are described in the art: Smith and Waterman, Adv. Appl. Math. 2:482, 1981; Needleman and Wunsch, J. Mol. Biol. 48:443, 1970; Pearson and Lipman, Proc. Natl. Acad. Sci. U.S.A. 85:2444, 1988; Higgins and Sharp, Gene 73:237-244, 1988; Higgins and Sharp, CABIOS 5:151-153, 1989; Corpet et al., Nucleic Acids Research 16:10881-10890, 1988; and Pearson and Lipman, Proc. Natl. Acad. Sci. U.S.A. 85:2444, 1988. Altschul et al., Nature Genet. 6:119-129, 1994. The NCBI Basic Local Alignment Search Tool (BLAST®) (Altschul et al., J. Mol. Biol. 215:403-410, 1990) is available from several sources, including the National Center for Biotechnology Information (NCBI, Bethesda, Md.) for use in connection with the sequence analysis programs blastp, blastn, blastx, tblastn and tblastx.

Subject: As used herein, refers to any member of the animal kingdom. In some embodiments, "subject" refers to humans. In some embodiments, "subject" refers to non-human animals. In some embodiments, subjects include, but are not limited to, mammals, birds, reptiles, amphibians, fish, insects, and/or worms. In certain embodiments, the non-human subject is a mammal (e.g., a rodent, a mouse, a rat, a rabbit, a monkey, a dog, a cat, a sheep, cattle, a primate, and/or a pig). In some embodiments, a subject may be a transgenic animal, genetically-engineered animal, and/or a clone. In certain embodiments of the present invention the subject is an adult, an adolescent or an infant. In some embodiments, terms "individual" or "patient" are used and are intended to be interchangeable with "subject". Also contemplated by the present invention are the administration of the pharmaceutical compositions and/or performance of the methods of treatment in-utero.

Vaccination: As used herein, the term "vaccination" or "vaccinate" refers to the administration of a composition intended to generate an immune response, for example to a disease-causing agent. Vaccination can be administered before, during, and/or after exposure to a disease-causing agent, and/or to the development of one or more symptoms, and in some embodiments, before, during, and/or shortly after exposure to the agent. In some embodiments, vaccination includes multiple administrations, appropriately spaced in time, of a vaccinating composition.

Virus-like particle (VLP): As used herein, the phrase "virus-like particle" or "VLP" refers to particles that resemble a virus yet lack any viral genetic material and, therefore, are not infectious. A "virus-like particle" or "VLP" may be produced by heterologous expression in a variety of cell culture systems including mammalian cell lines, insect cell lines, yeast, and plant cells. In addition, VLPs can be purified by methods known in the art. In some embodiments, an influenza VLP as described herein comprises HA polypeptides and/or NA polypeptides. In some embodiments, an influenza VLP as described herein comprises HA polypeptides, NA polypeptides and/or structural polypeptides. In some certain embodiments, an influenza VLP as described herein comprises HA polypeptides, NA polypeptides and/or influenza M1 polypeptides. In some embodiments, an influenza VLP as described herein comprises HA polypeptides, NA polypeptides and/or HIV gag polypeptides. Persons skilled in the art are aware that other viral structural proteins may be used as alternatives to those exemplified herein. Influenza VLPs can be produced by transfection of host cells (e.g., mammalian cells) with plasmids encoding HA and NA proteins, and optionally M1 proteins and/or HIV gag proteins. After incubation of the transfected cells for an appropriate time to allow for protein expression, VLPs can be isolated from cell culture supernatants. In some embodiments, influenza VLPs as described herein are produced by transient transfection in mammalian cells (e.g., human cells). In some embodiments, influenza VLPs are analyzed by the use of one or more assays. For example, influenza VLP particle size may be analyzed by dynamic light scattering, and such VLPs may also be analyzed for hemagglutinin activity, and hemagglutinin content quantitation by protein staining.

Wild type (WT): As is understood in the art, the term "wild type" generally refers to a normal form of a protein or nucleic acid, as is found in nature. For example, wild type NA polypeptides are found in natural isolates of influenza virus. A variety of different wild type NA sequences can be found in the NCBI influenza virus sequence database.

Methods for Designing Neuraminidase (NA) Polypeptides

A significant challenge associated with generating a consensus influenza protein sequence relates to temporal and geographic sequence biases. Such biases exist in part because the sequence records provided in public and/or private sequence databases are often heavily skewed to more recent sequences. Further, sequences associated with certain geographical regions such as the United States are often over-represented. In one aspect, the present invention provides novel methods for generating influenza NA polypeptides comprising consensus amino acids using a cluster-based consensus approach that overcomes such temporal and geographic sequence biases. The methods of the invention are independent of phylogenetic information and dependent only upon the information contained in primary amino acid sequences. Accordingly, the present methods are able to generate NA polypeptide sequences that reflect overall sequence diversity and not biased towards temporally or geographically over-represented sequences.

In various embodiments, the methods involve designing NA polypeptide sequences based on in silico analysis of the sequence variations among multiple influenza NA sequences, applying a consensus-based sequence algorithm to generate clusters of similar sequences, and conducting structural analysis of NA polypeptides having consensus amino acid sequences. In some embodiments, the present methods generate pairwise similarity/dissimilarity matrices that could be clustered using tools such as K-means, Minimax clustering, and Farthest-First clustering. Alternatively or additionally, the pairwise similarity/dissimilarity matrices are visualized in a compact representation using ordination techniques such as Multidimensional Scaling (MDS) or Principal Components Analysis (PCA) so as to define appropriate clusters (e.g., to separate and define the number of clusters). Further still, the present methods utilize molecular modeling and comparisons to crystal structures to resolve variable amino acid positions within the consensus sequences and to rank candidates that are likely to fold properly and thus be functional.

Without wishing to be bound by theory, it is believed that methods of the invention generate NA polypeptides comprising conserved epitopes across different influenza strains, types, and/or subtypes. Accordingly, in various embodiments, the present methods generate NA polypeptides capable of inducing an enhanced cross-reactive immune response against a broad range of influenza strains (e.g., one or more seasonal, pandemic, or swine strains), influenza types (e.g., one or more influenza type A, type B, or type C), and/or influenza subtypes (e.g., one or more influenza subtypes such as, without limitation, H1N1, H3N2, or H5N1).

In some embodiments, the present methods comprise selecting various influenza NA polypeptide sequences. A variety of different NA sequences can be found in sequence databases, such as the National Center for Biotechnology Information (NCBI) influenza virus sequence database. In some embodiments, a non-redundant subset of unique sequences is selected for sequence alignment.

In some embodiments, the present methods comprise aligning the influenza NA polypeptide sequences. Any multiple sequence alignment tool known in the art may be used. See, for example, Katoh and Kuma (2002) NAR, 30:3059; Katoh and Standley (2013) Mol BioL Evol 30:772; Edgar, R. C. (2004) NAR, 32:1792; Edgar, R. C. (2004) BMC Bioinf, 113; Sievers et al. (2011) Mol Sys Biol 7:539; and Pearson and Lipman. (1988) PNAS, 85:2444). Exemplary sequence alignment tools that may be utilized for the present invention include, but are not limited to, MAFFT, MUSCLE, CLUSTAL OMEGA, FASTA, or a combination thereof.

In some embodiments, specific sequence regions may be masked from further analysis. For example, any one of NA signal peptide sequences, transmembrane domain sequences, or any other conserved NA domains may be masked from further analysis.

In some embodiments, the present methods comprise calculating pairwise similarity/dissimilarity matrices from the aligned sequences. Any methods for calculating the distances between two or more sequences may be used. Exemplary tools for calculating pairwise similarity/dissimilarity matrices include, but are not limited to, BLOSUM, PAM, IDENTITY substitution matrices, or a combination thereof. In an embodiment, an alternative method for calculating pairwise similarity/dissimilarity matrices such as FastTree may be used (Price, M. N., Dehal, P. S., and Arkin, A. P. (2009) Molecular Biology and Evolution 26:1641-1650).

In some embodiments, the present methods further comprise identifying and creating clusters of similar sequences from the pairwise similarity/dissimilarity matrices. Exemplary tools for identifying the clusters of similar sequences include, but are not limited to, K-means clustering, minimax clustering, Farthest-First clustering, principle component analysis (PCA), multidimensional scaling (MDS), or a combination thereof. In an embodiment, the K-means methods for clustering is utilized (see Hartigan, J. A. et al. (1979) Journal of the Royal Statistical Society, Series C, Applied Statistics, 28(1): 100-108). In another embodiment, minimax clustering (e.g., minimax linkage hierarchical clustering of similarity matrix) is utilized (see, Bien, J. et al., (2011) The Journal of the American Statistical Association). In a further embodiment, farthest-first traversal is used (see Rosenkrantz et al. (1977) SIAM J Comp, 6: 563).

In some embodiments, ordination techniques may be used for identifying and creating clusters of similar sequences from the pairwise similarity/dissimilarity matrices. For example, in some embodiments, PCA is used for dimension reduction of the pairwise similarity/dissimilarity matrix.

PCA can be utilized to transform a high dimensional, pairwise similarity/dissimilarity matrix into a lower dimensional subspace to facilitate visualization and identification of clusters of similar sequences (see Pearson, K. (1901) Philosophical Magazine 2(11): 559-572; and Hotelling, H. (1933) Journal of Educational Psychology, 24, 417-441, and 498-520). In a further embodiment, multidimensional scaling (MDS) is used. MDS refers to a means of calculating and visualizing the level of similarity and dissimilarity of multidimensional datasets and finding a reduced set of dimensions that best reproduce the distances between all pairs of a set of points. In some embodiments, MDS is used to place each object in N-dimensional space such that the between-object distances are preserved. In some embodiments, MDS allows display of information contained in a distance matrix. In some embodiments, MDS places the NA sequences in a reduced dimensional space thereby accurately maintaining the relative distances between pairs of viral sequences. In some embodiments, MDS overcomes shortcomings in phylogenetic methods, as phylogenetic methods may be inconsistent in the presence of reassortment and/or recombination. In some embodiments, MDS filters out neutral substitutions in influenza virus that are random. In various embodiments, ordination techniques such as MDS or PCA helps to transform the high dimensional, pairwise distance matrix into lower dimensional subspace to facilitate visualization and identification of clusters.

In some embodiments, the methods described herein create more than one cluster of similar sequences (for example, seasonal-like, pandemic-like, or swine-like sequences). Exemplary clusters of sequences for use with the methods described herein are presented, but not limited to, those in FIG. 1A.

In some embodiments, within each cluster, a consensus sequence is calculated based on the most frequent amino acid at each position in the multiple sequence alignment. For example, if the frequency of an amino acid at a given position is 50% or greater (or any other user defined threshold), that amino acid is designated a consensus amino acid. Alternatively, if the frequency of an amino acid at a given position is less than 50% (or any other user defined threshold), that amino acid is designated as a variable amino acid. In some embodiments, a first sequence is generated for each cluster which comprises consensus amino acids and variable amino acids. In some embodiments, the first sequence generated for each cluster is designated as a within-cluster consensus sequence.

In some embodiments, a consensus sequence is generated for multiple sequence clusters. In such embodiments, selected within-cluster consensus sequences for multiple clusters are merged based on specified outcome properties so as to derive additional consensus sequences. For example, within-cluster consensus sequences associated with specific geographical regions, hosts, or time periods can be merged to generate an across-cluster consensus sequence (e.g., a second sequence).

In various embodiments, in order to generate across-cluster consensus sequences, a within-cluster consensus sequence (e.g., a first sequence) generated from one cluster is compared with a within-cluster consensus sequence (e.g., a first sequence) generated from another cluster or multiple clusters. In some embodiments, the generated sequences are aligned against one another. In some embodiments, a pairwise alignment method is utilized to determine whether there is a consensus amino acid for each position in the alignment. As described previously, if the frequency of an amino acid at a given position is 50% or greater (or any other user defined threshold), that amino acid is designated a consensus amino acid, and if the frequency of an amino acid at a given position is less than 50% (or any other user defined threshold), that amino acid is designated as a variable amino acid. In some embodiments, an across-cluster consensus sequence (e.g., a second sequence) comprising consensus amino acids and variable amino acids is generated from such multi-cluster analysis. In various embodiments, the process of aligning sequences and determining consensus amino acids at each position can be performed iteratively until all the sequence clusters of interest are considered.

In some embodiments, an additional step is performed to determine a consensus amino acid for each variable amino acid position within a within-cluster consensus sequence and/or an across-cluster consensus sequence (e.g., the first sequence and/or the second sequence) generated. In such embodiments, a set of test sequences are generated based on the consensus sequences (e.g., a first and/or a second sequence), wherein test amino acids are placed at the variable amino acid positions. The test amino acids used in the methods described herein encompass any natural or non-natural (e.g., non-classical) amino acid found in proteins, including essential and non-essential amino acids. Exemplary amino acids include the amino acids provided in the Table 2 below as well as those described elsewhere herein.

TABLE 2

| Essential | Non-Essential |
|---|---|
| Histidine (H) | Alanine (A) |
| Isoleucine (I) | Arginine (R) |
| Leucine (L) | Aspartic acid (D) |
| Lysine (K) | Cysteine (C) |
| Methionine (M) | Glutamic acid (E) |
| Phenylalanine (F) | Glutamine (Q) |
| Threonine (T) | Glycine (G) |
| Tryptophan (W) | Proline (P) |
| Valine (V) | Serine (S) |
|  | Tyrosine (Y) |
|  | Asparagine (N) |
|  | Selenocysteine (U) |
|  | Pyrrolysine (O) |

In various embodiments, the present methods contemplate the use of molecular modeling to analyze the test sequences. In some embodiments, molecular modeling is conducted for each of the test sequences. In some embodiments, molecular modeling comprises a comparison to a crystal structure of the influenza protein (i.e., NA) being analyzed. Such crystal structure information is readily available from, for example, the Protein Data Bank. In an embodiment, the molecular modeling comprises use of Rosetta (https://www.rosettacommons.org/software) or any other similar molecular modeling softwares (see, for example, Leaver-Fay et al. (2011) Meth. Enzymol. 487:545-74). For example, to resolve variable amino acid positions in the consensus sequences, a Metropolis-Monte Carlo simulated annealing protocol within Rosetta can be used to sample substitutions of all possible combinations of amino acid residues present at the identified sites of variation. Possible substitutions are then scored based on energy value.

In some embodiments, a consensus amino acid for each variable amino acid position is determined by selecting amino acid(s) that result in an NA polypeptide having a calculated total energy value similar to, or below a starting value. In some embodiments, a consensus amino acid for each variable amino acid position is determined by selecting amino acid(s) that result in an NA polypeptide having a negative total energy value. Without wishing to be bound by theory, it is believed that NA polypeptides with negative total energy scores are more likely to fold into stable proteins while polypeptides with positive energy scores are less likely to fold properly. In some embodiments, one or more NA polypeptides are generated and ranked according to their negative total energy scores and/or comparisons to a reference structure.

In various embodiments, the present methods generate an NA polypeptide sequence comprising consensus amino acids at various positions. Exemplary NA polypeptides generated using methods of the invention are provided in Table 1. The sequence listing in Table 1 is identical to the sequence listing in Table 1 of U.S. provisional application No. 62/649,002.

Neuraminidase (NA) Polypeptides and Proteins

In another aspect, the present invention provides NA polypeptides generated using the methods described herein. In some embodiments, the NA polypeptides comprise consensus amino acid sequences and are capable of eliciting an immune response against multiple influenza strains (e.g., one or more pandemic, seasonal, and/or swine influenza strains), types (e.g., one or more influenza Type A, Type B, and/or Type C viruses), and/or subtypes (e.g., one or more of H1N1, H3N2, or H5N1). Thus, in some embodiments, the NA polypeptides can be incorporated in vaccine compositions as antigens to provide improved protective immunity against influenza.

In some embodiments, the present invention provides an NA polypeptide comprising an amino acid sequence selected from SEQ ID NOs: 1, 2, or 3, or a fragment thereof. For example, in some embodiments, the NA polypeptide comprises amino acids 75-469 of SEQ ID NOs: 1, 2, or 3. In some embodiments, the NA polypeptide comprises an amino acid sequence having at least about 80%, 85%, 90%, 95%, 96%, 97%, 98%, or 99% sequence identity to SEQ ID NOs 1, 2, or 3, or a fragment thereof (e.g., a fragment comprising amino acids 75-469 of SEQ ID NOs: 1, 2, or 3).

In some embodiments, the present invention provides an NA polypeptide comprising an amino acid sequence selected from SEQ ID NOs: 7-18 or a fragment thereof. In some embodiments, the NA polypeptide comprises an amino acid sequence having at least about 80%, 85%, 90%, 95%, 96%, 97%, 98%, or 99% sequence identity to SEQ ID NOs 7-18, or a fragment thereof.

In some embodiments, the present invention provides an NA polypeptide having one or more amino acid mutations relative to any one of SEQ ID NOs: 1, 2, or 3 or SEQ ID NOs: 7-18, or a fragment thereof. For example, the NA polypeptide may comprise about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, or about 50 amino acid mutations relative to any one of SEQ ID NOs: 1, 2, or 3 or SEQ ID NOs: 7-18, or a fragment thereof.

In some embodiments, the one or more amino acid mutations may be independently selected from substitutions, insertions, deletions, and truncations. In some embodiments, the amino acid mutations are amino acid substitutions, and may include conservative and/or non-conservative substitutions. In some embodiments, the amino acid mutations are amino acid substitutions, and may include conservative and/or non-conservative substitutions.

Conservative substitutions may be made, for instance, on the basis of similarity in polarity, charge, size, solubility, hydrophobicity, hydrophilicity, and/or the amphipathic nature of the amino acid residues involved. For example, the 20 naturally occurring amino acids can be grouped into the following six standard amino acid groups: (1) hydrophobic: Met, Ala, Val, Leu, Ile; (2) neutral hydrophilic: Cys, Ser, Thr; Asn, Gln; (3) acidic: Asp, Glu; (4) basic: His, Lys, Arg; (5) residues that influence chain orientation: Gly, Pro; and (6) aromatic: Trp, Tyr, Phe. As used herein, "conservative substitutions" are defined as exchanges of an amino acid by another amino acid listed within the same group of the six standard amino acid groups shown above. For example, the exchange of Asp by Glu retains one negative charge in the modified polypeptide. In addition, glycine and proline may be substituted for one another based on their ability to disrupt α-helices. As used herein, "non-conservative substitutions" are defined as exchanges of an amino acid by another amino acid listed in a different group of the six standard amino acid groups shown above.

In various embodiments, the substitutions may also include non-classical amino acids (e.g selenocysteine, pyrrolysine, N-formylmethionine β-alanine, GABA and 6-Aminolevulinic acid, 4-aminobenzoic acid (PABA), D-isomers of the common amino acids, 2,4-diaminobutyric acid, α-amino isobutyric acid, 4-aminobutyric acid, Abu, 2-amino butyric acid, γ-Abu, ε-Ahx, 6-amino hexanoic acid, Aib, 2-amino isobutyric acid, 3-amino propionic acid, ornithine, norleucine, norvaline, hydroxyproline, sarcosme, citrulline, homocitrulline, cysteic acid, t-butylglycine, t-butylalanine, phenylglycine, cyclohexylalanine, β-alanine, fluoro-amino acids, designer amino acids such as β methyl amino acids, C α-methyl amino acids, N α-methyl amino acids, and amino acid analogs in general).

In various embodiments, the present invention further provides a tetrameric NA protein comprising four NA polypeptides. In some embodiments, at least 1, at least 2, at least 3, or all 4 NA polypeptides within the tetrameric NA protein comprise an amino acid sequence as described herein. For example, at least 1, at least 2, at least 3, or all 4 NA polypeptides of the tetrameric NA protein may comprise the amino acid sequence of SEQ ID NOs: 1, 2, or 3 or SEQ ID NOs: 7-18, or a fragment thereof. In an exemplary embodiment, the tetrameric NA protein comprises at least 1, at least 2, at least 3, or at least 4 NA polypeptides comprising amino acids 75-469 of SEQ ID Nos: 1, 2, or 3. In some embodiments, the tetrameric NA protein comprises four identical NA polypeptides. In other embodiments, the tetrameric NA protein comprises two or more non-identical NA polypeptides having distinct amino acid sequences.

In various embodiments, the present invention further provides a fusion protein comprising the NA polypeptide of the invention, or a fragment thereof.

In various embodiments, the NA polypeptides of the invention comprise a tetramerization sequence or a tetramerization domain which promotes assembly of monomeric NA polypeptides into a tetrameric NA protein. In some embodiments, the NA polypeptides comprise a tetramerization sequence or tetramerization domain that is present in NA polypeptides found in natural influenza isolates. For example, the NA polypeptides may comprise the stem region sequence of NA polypeptides found in natural influenza isolates, which are known to promote tetramer formation. In other embodiments, the NA polypeptides may comprise an engineered or heterologous tetramerization sequence or tetramerization domain that is not naturally present in wild type NA polypeptides. For example, in an embodiment, the NA polypeptides may be engineered to comprise a tetramerization domain derived from Tetrabrachion or vasodilator-stimulated phosphoprotein (VASP). In another embodiment, the NA polypeptide may include a GCN4 leucine zipper domain. In an exemplary embodiment, the NA polypeptides of the invention are engineered to include a tetramerization domain comprising the amino acid sequence of SEQ ID NO: 4. Any sequence or domain that can promote tetramerization may be utilized for the present invention.

In some embodiments, the NA polypeptides may comprise a secretion signal peptide. In an embodiment, the incorporation of the secretion signal peptide allows for the NA polypeptide or the tetrameric NA protein to be secreted from host cells. In another embodiment, the incorporation of the secretion signal peptide allows for purification of the NA polypeptide or the tetrameric NA protein from host cells (e.g., the supernatant of host cells) used for protein expression and production.

It is contemplated that any secretion signal peptide known in the art may be incorporated into the NA polypeptides of the invention. In some embodiments, the secretion signal peptide is specific for the host cell used for protein expression and production. Exemplary secretion signal peptides include, but are not limited to, the CD33 signal peptide sequence, the human IgG Kappa light chain signal peptide (for expression in human cells), the honey bee melittin signal sequence (for expression in insect cells) and the yeast alpha-factor signal sequence (for expression in yeast cells). In an exemplary embodiment, the secretion signal sequence is a CD5 secretion signal peptide. In an embodiment, the CD5 secretion signal peptide comprises the amino acid sequence of SEQ ID NO: 5.

In some embodiments, the NA polypeptide comprises additional functional sequences such as a linker sequence. In some embodiments, the linker is a polypeptide. In some embodiments, the linker is less than about 100 amino acids long. For example, the linker may be less than about 100, about 90, about 80, about 70, about 60, about 50, about 40, about 30, about 20, about 19, about 18, about 17, about 16, about 15, about 14, about 13, about 12, about 11, about 10, about 9, about 8, about 7, about 6, about 5, about 4, about 3, or about 2 amino acids long.

In various embodiments, the linker is substantially comprised of glycine and/or serine residues (e.g. about 30%, or about 40%, or about 50%, or about 60%, or about 70%, or about 80%, or about 90%, or about 95%, or about 97% glycines and serines). For example, in some embodiments, the linker is $(Gly4Ser)_n$, where n is from about 1 to about 8, e.g., 1, 2, 3, 4, 5, 6, 7, or 8 (SEQ ID NO: 21). In an embodiment, the linker sequence is GGSGGSGGGGSGGGGS (SEQ ID NO: 22). Additional illustrative linkers include, but are not limited to, linkers having the sequence LE, GGGGS (SEQ ID NO: 23), $(GGGGS)_n$ (n=1-4) (SEQ ID NO: 24), $(Gly)_8$ (SEQ ID NO: 25), $(Gly)_6$ (SEQ ID NO: 26), $(EAAAK)_n$ (n=1-3) (SEQ ID NO: 27), $A(EAAAK)_nA$ (n=2-5) (SEQ ID NO: 28), AEAAAKEAAAKA (SEQ ID NO: 29), $A(EAAAK)_4ALEA(EAAAK)_4A$ (SEQ ID NO: 30), PAPAP (SEQ ID NO: 31), KESGSVSSEQLAQFRSLD (SEQ ID NO: 32), EGKSSGSGSESKST (SEQ ID NO: 33), GSAGSAAGSGEF (SEQ ID NO: 34), and $(XP)_n$, with X designating any amino acid, e.g., Ala, Lys, or Glu. In an exemplary embodiment, the linker is GGS or GSG. In another exemplary embodiment, the linker is SA.

In some embodiments, the NA polypeptide further comprises a functional tag sequence (for example, to facilitate protein purification). Without limitation, the NA polypeptide may comprise affinity tags such as glutathione-S-transferase (GST), polyhistidine (e.g., 6×His (SEQ ID NO: 35)), protein A, Streptavidin/Biotin-based tags, as well as any other protein tags known in the art.

In some embodiments, the NA polypeptide further comprises a protease cleavage site such as a thrombin cleavage site, a trypsin cleavage site, an enterokinase cleavage site, or any other protease cleavage sites known in the art.

In various embodiments, the NA polypeptides (or the tetrameric NA proteins) described herein provide for improved protective immunity (e.g., a broadly reactive immune response) against a range of influenza viruses with divergent sequences. In various embodiments, the NA polypeptides (or the tetrameric NA proteins) described herein elicit an enhanced immune response against conserved epitopes among multiple influenza strains. In various embodiments, the NA polypeptides (or the tetrameric NA proteins) described herein induce immune responses against different influenza viruses exhibiting antigenic shift or antigenic drift.

In some embodiments, the NA polypeptides or the tetrameric NA proteins described herein exhibit greater immunogenicity across different influenza strains/types/subtypes as compared to an NA polypeptide or a tetrameric NA protein from wildtype or naturally-occurring influenza virus strains. In some embodiments, the NA polypeptides or the tetrameric NA proteins described herein have greater stability compared to an NA polypeptide or a tetrameric NA protein from wildtype or naturally-occurring influenza virus strains.

Nucleic Acid Construction and Expression

In various embodiments, a method of producing recombinant NA polypeptides is provided. The method comprises generating an NA polypeptide comprising a consensus amino acid sequence using the cluster-based consensus method described herein, and producing the NA polypeptide by transfecting a host cell with a vector encoding the NA polypeptide. In various embodiments, methods for producing recombinant tetrameric NA proteins are also provided.

In some embodiments, the NA polypeptides as described herein may be produced from nucleic acids using molecular biology methods known in the art. For example, nucleic acid molecules are inserted into a vector that is able to express the NA polypeptides when introduced into an appropriate host cell. Appropriate host cells include, but are not limited to, bacterial, yeast, insect, and mammalian cells, as well as any other cell types described elsewhere herein. Any of the methods known to one skilled in the art for the insertion of DNA fragments into a vector may be used to construct expression vectors encoding the NA polypeptides under control of transcriptional/translational control signals. These methods may include in vitro recombinant DNA and synthetic cloning techniques and in vivo recombination techniques (See Sambrook et al. Molecular Cloning, A Laboratory Manual, Cold Spring Harbor Laboratory; Current Protocols in Molecular Biology, Eds. Ausubel, et al., Greene Publ. Assoc., Wiley-Interscience, NY).

In some embodiments, the present invention provides nucleic acids which encode an NA polypeptide or a characteristic or biologically active portion of an NA polypeptide. In some embodiments, the invention provides nucleic acids which are complementary to nucleic acids which encode an NA polypeptide or a characteristic or biologically active portion of an NA polypeptide. In other embodiments, the present invention further provides nucleic acids which encode a tetrameric NA protein.

In some embodiments, the invention provides nucleic acid molecules which hybridize to nucleic acids encoding an NA polypeptide or a characteristic or biologically active portion of an NA polypeptide. Such nucleic acids can be used, for example, as primers or as probes. In exemplary embodiments, such nucleic acids can be used as primers in polymerase chain reaction (PCR), as probes for hybridization (including in situ hybridization), and/or as primers for reverse transcription-PCR (RT-PCR).

In some embodiments, nucleic acids can be DNA or RNA, and can be single stranded or double-stranded. In some embodiments, nucleic acids in accordance with the invention may include one or more non-natural nucleotides. In some embodiments, nucleic acids in accordance with the invention include only natural nucleotides.

Expression of nucleic acid molecules in accordance with the present invention may be regulated by a second nucleic acid sequence so that the molecule is expressed in a host transformed with the recombinant DNA molecule. For example, expression of the nucleic acid molecules of the invention may be controlled by a promoter and/or enhancer element known in the art.

In some embodiments, an expression vector containing a nucleic acid molecule is transformed into a suitable host cell to allow for production of the NA polypeptides or proteins encoded by the nucleic acid constructs. Host cells transformed with an expression vector are then grown under conditions permitting production of an NA polypeptide or a tetrameric NA protein of the present invention followed by recovery of the polypeptide or protein. Exemplary cell types that may be used in the present invention include, but are not limited to, mammalian cells, insect cells, yeast cells, plant cells, and bacterial cells. Insect cells include, but are not limited to: SF cells, caterpillar cells, butterfly cells, moth cells, SF9 cells, SF21 cells, *drosophila* cells, S2 cells, fall armyworm cells, cabbage looper cells, *Spodoptera frugiperda* cells, and Trichoplasia ni cells. Suitable mammalian cells include, but are not limited to: Madin-Darby canine kidney (MDCK) cells, VERO cells, EBx cells, chicken embryo cells, Chinese hamster ovary (CHO) cells, monkey kidney cells, human embryonic kidney cells, HEK293T cells, NSO cells, myeloma cells, hybridoma cells, primary adenoid cell lines, primary bronchial epithelium cells, transformed human cell lines, and Per.C6 cells. Other useful cells or cellular systems include, but are not limited to, plant-based systems (e.g., tobacco plants; see, e.g., Jul-Larsen, A., et al., Hum Vaccin Immunother., 8(5):653-61, 2012), yeast (see, e.g., Athmaram, T. N. et al., Virol J., 8:524, 2011), and fungi (see, e.g., Allgaier, S. et al., Biologicals, 37:128-32, 2009). Bacterial based expression systems are also encompassed by the present invention (see, e.g., Davis, A. R. et al., Gene, 21:273-284, 1983). The present invention further contemplates the use of a baculovirus system.

The NA polypeptides or tetrameric NA proteins of the present invention may be purified by any technique known in the art. For example, the NA polypeptides or tetrameric NA proteins may be recovered from cells either in soluble fractions or as inclusion bodies, from which they may be extracted by, for example, guanidinium hydrochloride and dialysis. In order to further purify the NA polypeptides or tetrameric NA proteins, conventional ion exchange chromatography, hydrophobic interaction chromatography, reverse phase chromatography, size exclusion chromatography, affinity chromatography, gel filtration, or combinations thereof, may be used. In some embodiments, the NA polypeptides or tetrameric NA proteins may also be recovered from conditioned media following secretion from eukaryotic or prokaryotic cells. In such embodiments, a purified recombinant NA polypeptide or tetrameric NA protein is produced by culturing the host cell under conditions sufficient for the cell to secrete the polypeptide or protein into the culture supernatant and purifying the polypeptide or protein from the supernatant.

In some embodiments, the recombinant NA polypeptide is purified from a host cell as a monomer. In other embodiments, the recombinant NA polypeptide is purified from a host cell as a tetramer.

Evaluation of NA Polypeptides and Proteins

In some embodiments, the present invention contemplates evaluating the NA polypeptides or tetrameric NA proteins produced using the methods described herein to determine whether it (i) elicits an immune response to one or more influenza viruses; (ii) provides a protective immune response against one or more influenza viruses, or (iii) produces antibodies directed against one or more influenza viruses after administration to a subject. Various methods for testing such functions are well known in the art, and may be utilized.

In some embodiments, the NA polypeptides or tetrameric NA proteins generated according to methods described herein are assessed for desired expression and conformation. Screening methods are well known to the art and include cell-free, cell-based, and animal assays. In vitro assays include solid state or soluble target molecule detection methods involving the use of detectable labels. In such assays, the NA polypeptides or tetrameric NA proteins may be identified through binding to a target molecule (e.g., an immunoglobulin). In some embodiments, the NA polypeptides or proteins as described herein may be selected based on desired expression and conformational characteristics.

The present invention further provides methods for testing NA polypeptides in an animal host. As used herein, an "animal host" includes any animal model suitable for influenza research. For example, animal hosts include mammalian hosts including, but not limited to, primates, ferrets, cats, dogs, cows, horses, rabbits, and rodents such as, mice, hamsters, and rats. In some embodiments, the animal host is inoculated with, infected with, or otherwise exposed to influenza virus prior to or concurrent with administration of an NA polypeptide or a tetrameric NA protein. Alternatively, the animal host may be administered with a DNA molecule encoding the NA polypeptide or tetrameric NA protein. An animal host can be inoculated with, infected with, or otherwise exposed to influenza virus by any method known in the art including through intranasal routes.

In some embodiments, an animal host is naive to viral exposure or infection prior to administration of the NA polypeptide or tetrameric NA protein (optionally, as a component in a composition). Naive and/or inoculated animals may be used for any of a variety of studies. For example, such animal models may be used for virus transmission studies as in known in the art. For example, air transmission of viral influenza from inoculated animals (e.g., ferrets) to naive animals is known (Tumpey et al., 2007, Science 315; 655-59). In an exemplary viral transmission study, NA polypeptides or tetrameric NA proteins may be administered to a suitable animal host in order to determine the efficacy of said NA polypeptides or proteins in eliciting a broad immune response in the animal host. Using such information gathered from studies in an animal host, one may predict the efficacy of an NA polypeptide or protein to elicit an immune response in a human host.

Influenza Virus-Like Particles (VLPs)

In some embodiments, the present invention provides for influenza virus-like particles (VLPs) comprising the NA polypeptide or the tetrameric NA protein as described herein. The influenza VLPs are, in some embodiments, generally made up of HA, NA and/or virus structural proteins (e.g., HIV gag, influenza M1 proteins). Production of influenza VLPs is known in the art. For example, influenza VLPs may be produced by transfection of host cells with plasmids encoding the HA, NA and/or HIV gag or M1 proteins. In exemplary embodiments, a suitable host cell includes a human cell (e.g., HEK293T). After incubation of the transfected cells for an appropriate time to allow for protein expression (e.g., approximately 72 hours), VLPs may be isolated from cell culture supernatants. In some embodiments, influenza VLPs as disclosed herein may be used as influenza vaccines to elicit a broadly neutralizing immune response against one or more influenza viruses.

Pharmaceutical Compositions and Administration

In various embodiments, the present invention provides for pharmaceutical compositions comprising the NA polypeptide or the tetrameric NA protein as described herein and/or related entities. In some embodiments, the pharmaceutical composition is an immunogenic composition (e.g., a vaccine) capable of eliciting an immune response such as a protective immune response against the influenza virus.

For example, in some embodiments, the pharmaceutical compositions may comprise one or more of the following: (1) live attenuated influenza virus, for example, replication-defective virus, (2) inactivated virus, (3) virus-like particles (VLPs), (4) recombinant NA polypeptide or recombinant tetrameric NA protein of the invention, or characteristic or biologically active portion thereof, (5) nucleic acid encoding the NA polypeptide or the tetrameric NA protein of the invention, or characteristic or biologically active portion thereof, (6) DNA vector that encodes the NA polypeptide or the tetrameric NA protein of the invention, or characteristic or biologically active portion thereof, and/or (7) an expression system, for example, cells expressing the NA polypeptide or the tetrameric NA protein of the invention.

In some embodiments, the present invention provides pharmaceutical compositions comprising antibodies or other agents related to the NA polypeptides or the tetrameric NA proteins of the invention. In an embodiment, the pharmaceutical composition comprises antibodies that bind to and/or compete with the NA polypeptides or tetrameric NA proteins described herein. Alternatively, the antibodies may recognize viral particles comprising the NA polypeptides or tetrameric NA proteins described herein. In another embodiment, the pharmaceutical composition comprises small molecules that interact with or compete with the NA polypeptides or tetrameric NA proteins described herein. In a further embodiment, the pharmaceutical composition comprises nucleic acids, such as nucleic acids having sequences complementary to the NA polypeptide sequences, which can be used for gene silencing.

In some embodiments, the pharmaceutical compositions as described herein are administered alone or in combination with one or more agents to enhance an immune response. For example, in some embodiments, the pharmaceutical compositions are administered in combination with an adjuvant. The present invention contemplates the use of any known adjuvants. Exemplary adjuvants include, but are not limited to, Freund incomplete adjuvant or Freund's complete adjuvant. In some embodiments, one or more cytokines (e.g., IL-2, IL-6, IL-12, RANTES, GM-CSF, TNF-α, or IFN-γ), one or more growth factors (e.g., GM-CSF or G-CSF), one or more molecules such as OX-40L or 41 BBL, or a combination thereof, may be used as biological adjuvants. In some embodiments, the pharmaceutical compositions may include aluminum salts and monophosphoryl lipid A as adjuvants. Alternatively or additionally, adjuvants utilized in human vaccines, such as MF59 (Chiron Corp.), CPG 7909 (Cooper et al., (2004) Vaccine, 22:3136), and saponins, such as QS21 (Ghochikyan et al., (2006) Vaccine, 24:2275) may be used. Further examples of adjuvants include, but are not limited to, poly[di(carboxylatophenoxy)phosphazene] (PCCP; Payne et al., (1998) Vaccine, 16:92), the block copolymer P1205 (CRL1005; Katz et al., (2000) Vaccine, 18:2177), and polymethyl methacrylate (PMMA; Kreuter et al., (1981) J. Pharm. Sci., 70:367). Additional adjuvants are described elsewhere herein.

In some embodiments, the pharmaceutical composition further comprises a pharmaceutically acceptable carrier or excipient. As used herein, the term "carrier" refers to a diluent, adjuvant, excipient, or vehicle with which a pharmaceutical composition is administered. In exemplary embodiments, carriers can include sterile liquids, such as, for example, water and oils, including oils of petroleum, animal, vegetable, or synthetic origin, such as, for example, peanut oil, soybean oil, mineral oil, sesame oil and the like. In some embodiments, carriers are or include one or more solid components. Pharmaceutically acceptable carriers can also include, but are not limited to, saline, buffered saline, dextrose, glycerol, ethanol, and combinations thereof. As used herein, an excipient is any non-therapeutic agent that may be included in a pharmaceutical composition, for example to provide or contribute to a desired consistency or stabilizing effect. Suitable pharmaceutical excipients include, but are not limited to, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. In various embodiments, the pharmaceutical composition is sterile.

In some embodiments, the pharmaceutical composition contains minor amounts of wetting or emulsifying agents, or pH buffering agents. In some embodiments, the pharmaceutical compositions of may include any of a variety of additives, such as stabilizers, buffers, or preservatives. In addition, auxiliary, stabilizing, thickening, lubricating, and coloring agents can be included.

In various embodiments, the pharmaceutical composition may be formulated to suit any desired mode of administration. For example, the pharmaceutical composition can take the form of solutions, suspensions, emulsion, drops, tablets, pills, pellets, capsules, capsules containing liquids, gelatin capsules, powders, sustained-release formulations, suppositories, emulsions, aerosols, sprays, suspensions, lyophilized powder, frozen suspension, dessicated powder, or any other form suitable for use. General considerations in the formulation and manufacture of pharmaceutical agents may be found, for example, in *Remington's Pharmaceutical Sciences*, $19^{th}$ ed., Mack Publishing Co., Easton, PA, 1995; incorporated herein by reference.

The pharmaceutical composition can be administered via any route of administration. Routes of administration include, for example, oral, intradermal, intramuscular, intraperitoneal, intravenous, subcutaneous, intranasal, mucosal, epidural, sublingual, intranasal, intracerebral, intravaginal, transdermal, rectally, by intratracheal instillation, bronchial instillation, inhalation, or topically. Administration can be local or systemic. In some embodiments, administration is carried out orally. In another embodiment, the administration is by parenteral injection. In some instances, administration results in the release of the NA polypeptide or tetrameric NA protein described herein into the bloodstream. The mode of administration can be left to the discretion of the practitioner.

In an embodiment, the pharmaceutical composition is adapted for oral administration. Compositions for oral delivery can be in the form of tablets, lozenges, aqueous or oily suspensions, granules, powders, emulsions, capsules, syrups, or elixirs, for example.

In another embodiment, the pharmaceutical composition is suitable for parenteral administration (e.g., intravenous, intramuscular, intraperitoneal, and subcutaneous). Such compositions can be formulated as, for example, solutions, suspensions, dispersions, emulsions, and the like. They may also be manufactured in the form of sterile solid compositions (e.g., lyophilized composition), which can be dissolved or suspended in sterile injectable medium immediately before use. For example, parenteral administration can be achieved by injection. In such embodiments, injectables are prepared in conventional forms, i.e., either as liquid solutions or suspensions, solid forms suitable for solution or suspension in liquid prior to injection, or as emulsions. In some embodiments, injection solutions and suspensions are prepared from sterile powders, lyophilized powders, or granules.

In a further embodiment, the pharmaceutical composition is formulated for delivery by inhalation (e.g., for direct delivery to the lungs and the respiratory system). For example, the composition may take the form of a nasal spray or any other known aerosol formulation. In some embodiments, preparations for inhaled or aerosol delivery comprise a plurality of particles. In some embodiments, such preparations can have a mean particle size of about 1, about 2, about 3, about 4, about 5, about 6, about 7, about 8, about 9, about 10, about 11, about 12, or about 13 microns. In some embodiments, preparations for inhaled or aerosol delivery are formulated as a dry powder. In some embodiments, preparations for inhaled or aerosol delivery are formulated as a wet powder, for example through inclusion of a wetting agent. In some embodiments, the wetting agent is selected from the group consisting of water, saline, or other liquid of physiological pH.

In some embodiments, the pharmaceutical composition in accordance with the invention are administered as drops to the nasal or buccal cavity. In some embodiments, a dose may comprise a plurality of drops (e.g., 1-100, 1-50, 1-20, 1-10, 1-5, etc.).

In some embodiments, the pharmaceutical composition will include an NA polypeptide or a tetrameric NA protein that is encapsulated, trapped, or bound within a lipid vesicle, a bioavailable and/or biocompatible and/or biodegradable matrix, or other microparticles. In some embodiments, the pharmaceutical composition comprises nanoparticles displaying the NA polypeptides or tetrameric NA proteins. In some embodiments, the nanoparticles are ferritin nanoparticles (see, e.g., U.S. patent publication 2014/0072958).

The present pharmaceutical composition may be administered in any dose appropriate to achieve a desired outcome. In some embodiments, the desired outcome is the induction of a long-lasting adaptive immune response against one or more influenza strains. In some embodiments, the desired outcome is a reduction in the intensity, severity, frequency, and/or delay of onset of one or more symptoms of influenza infection. In some embodiments, the desired outcome is the inhibition or prevention of influenza virus infection. The dose required will vary from subject to subject depending on the species, age, weight, and general condition of the subject, the severity of the infection being prevented or treated, the particular composition being used, and its mode of administration.

In some embodiments, pharmaceutical compositions in accordance with the invention are administered in single or multiple doses. In some embodiments, the pharmaceutical compositions are administered in multiple doses administered on different days (e.g., prime-boost vaccination strategies). In some embodiments, the pharmaceutical compositions are administered according to a continuous dosing regimen, such that the subject does not undergo periods of less than therapeutic dosing interposed between periods of therapeutic dosing. In some embodiments, the pharmaceutical compositions are administered according to an intermittent dosing regimen, such that the subject undergoes at least one period of less than therapeutic dosing interposed between two periods of therapeutic dosing. In some embodiments, the pharmaceutical composition is administered as part of a booster regimen.

In various embodiments, the pharmaceutical composition is co-administered with one or more additional therapeutic agents. Co-administration does not require the therapeutic agents to be administered simultaneously, if the timing of their administration is such that the pharmacological activities of the additional therapeutic agent and the NA polypeptide or the tetrameric NA protein overlap in time, thereby exerting a combined therapeutic effect. In general, each agent will be administered at a dose and on a time schedule determined for that agent.

In some embodiments, the pharmaceutical composition is co-administered with other conventional influenza vaccines. For example, the pharmaceutical composition of the invention may be co-administered with seasonal influenza vaccines. In some embodiments, the seasonal influenza vaccines may be monovalent, divalent, trivalent, or quadrivalent.

In some embodiments, the present invention encompasses the delivery of the pharmaceutical composition in combination with agents that may improve their bioavailability, reduce or modify their metabolism, inhibit their excretion, and/or modify their distribution within the body. In some embodiments, the pharmaceutical composition as described herein is administered in combination with one or more of an anti-viral agent (e.g., Oseltamivir [TAMIFLU] or Zanamavir [RELEZA], etc.).

Antibodies to NA Polypeptides

The present invention provides antibodies to NA polypeptides or tetrameric NA proteins generated in accordance with the invention. These may be monoclonal or polyclonal and may be prepared by any of a variety of techniques known to those of ordinary skill in the art (e.g., see Harlow and Lane, 1988, Antibodies: A Laboratory Manual, Cold Spring Harbor Laboratory; incorporated herein by reference). For example, antibodies can be produced by cell culture techniques, including the generation of monoclonal antibodies, or via transfection of antibody genes into suitable bacterial or mammalian host cells, in order to allow for the production of antibodies.

In some embodiments, the antibodies may be a classic antibody comprised of two heavy chains and two light chains. In other embodiments, the antibody may be an antibody derivative. For example, in some embodiments, the antibody may be a single-domain antibody, a recombinant heavy-chain-only antibody (VHH), a single-chain antibody (scFv), a shark heavy-chain-only antibody (VNAR), a microprotein (cysteine knot protein, knottin), a DARPin, a Tetranectin, an Affibody, a Transbody, an Anticalin, an AdNectin, an Affilin, a Microbody, a peptide aptamer, an alterases, a plastic antibodies, a phylomer, a stradobodies, a maxibodies, an evibody, a fynomer, an armadillo repeat protein, a Kunitz domain, an avimer, an atrimer, a probody, an immunobody, a triomab, a troybody; a pepbody; a vaccibody, a UniBody; affimers, a DuoBody, a Fv, a Fab, a Fab', a F(ab')$_2$, a peptide mimetic molecule, or a synthetic molecule, or any other antibody formats known in the art.

Methods of Immunization and Protection from Influenza Viruses

In another aspect, the present invention provides methods of immunizing a subject against one or more influenza viruses in a subject. The present invention further provides methods of eliciting an immune response against one or more influenza viruses in a subject. In some embodiments, the present methods comprise administering to the subject an effective amount of a pharmaceutical composition described herein to a subject. In some embodiments, the present methods comprise administering to the subject an effective amount of a recombinant NA polypeptide or a tetrameric NA protein described herein to a subject. In some embodiments, the present methods comprise administering to the subject an effective amount of a VLP comprising an NA polypeptide or a tetrameric NA protein described herein to a subject.

In various embodiments, the methods of immunizing provided herein elicit a broadly protective immune response against multiple epitopes within one or more influenza viruses. In various embodiments, the methods of immunizing provided herein elicit a broadly neutralizing immune response against one or more influenza viruses. In some embodiments, the immune response comprises an antibody response. Accordingly, in various embodiments, the pharmaceutical composition described herein can offer broad cross-protection against different types of influenza viruses. In some embodiments, the pharmaceutical composition offers cross-protection against avian, swine, seasonal, and/or pandemic influenza viruses. In some embodiments, the pharmaceutical composition offers cross-protection against one or more influenza A, B, or C subtypes. In some embodiments, the pharmaceutical composition offers cross-protection against multiple strains of influenza A H1-subtype viruses (e.g., H1N1), influenza A H3-subtype viruses (e.g., H3N2), and/or influenza A H5-subtype viruses (e.g., H5N1).

In some embodiments, the methods of the invention are capable of eliciting an improved immune response against one or more seasonal influenza strains. Exemplary seasonal strains include, without limitation, A/Puerto Rico/8/1934, A/Fort Monmouth/1/1947, A/Chile/1/1983, A/Texas/36/1991, A/Singapore/6/1986, A/Beijing/32/1992, A/New Caledonia/20/1999, A/Solomon Islands/03/2006, and A/Brisbane/59/2007. In some embodiments, the methods of the invention are capable of eliciting an improved immune response against one or more pandemic influenza strains. Exemplary pandemic strains include, without limitation, A/California/07/2009, A/California/04/2009, A/Belgium/145/2009, A/South Carolina/01/1918, and A/New Jersey/1976. Pandemic subtypes include, in particular, the H5N1, H2N2, H9N2, H7N7, H7N3, H7N9 and H10N7 subtypes. In some embodiments, the methods of the invention are capable of eliciting an improved immune response against one or more swine influenza strains. Exemplary swine strains include, without limitation, A/New Jersey/1976 isolates and A/California/07/2009. Additional influenza pandemic, seasonal, and/or swine strains are known in the art.

In various embodiments, the present methods may extend immune protection across a range of antigenically distinct influenza strains. For example, the methods of the invention may elicit an immune response against new pandemic strains arising from antigenic shift (i.e., so that they cover antigenically distinct strains that are distantly separated in genetic sequence space across extended timelines). The present methods can also be applied to address genetic changes that occur over relatively shorter time periods so that the pharmaceutical compositions of the invention continue to be effective by eliciting an immune response against antigenically drifted circulating seasonal strains (e.g., an improved seasonal response). Accordingly, in various embodiments, the present methods may be used: (1) to extend coverage (i.e., capability of eliciting a neutralizing immune response) against one or more seasonal strains; (2) to extend coverage against one or more pandemic strains (to address antigenic drift); and (3) to extend coverage against any other antigenically distinct influenza strains. It is contemplated that the present methods can provide broad, long-lasting (e.g., multi-season) protection against influenza viruses including mismatched strains.

In some embodiments, the present invention provides methods of preventing or treating influenza infections by administering the pharmaceutical compositions of the invention to a subject in need thereof. In some embodiments, the subject is suffering from or susceptible to an influenza infection. In some embodiments, a subject is considered to be suffering from an influenza infection if the subject is displaying one or more symptoms commonly associated with influenza infection. In some embodiments, the subject is known or believed to have been exposed to the influenza virus. In some embodiments, a subject is considered to be susceptible to an influenza infection if the subject is known or believed to have been exposed to the influenza virus. In some embodiments, a subject is known or believed to have been exposed to the influenza virus if the subject has been in contact with other individuals known or suspected to have been infected with the influenza virus and/or if the subject is or has been present in a location in which influenza infection is known or thought to be prevalent.

In various embodiments, the pharmaceutical composition as described herein may be administered prior to or after development of one or more symptoms of influenza infection. In some embodiments, the pharmaceutical composition is administered as a prophylactic. In such embodiments, the methods of the invention are effective in preventing or protecting a subject from influenza virus infection. In some embodiments, the pharmaceutical composition of the present invention is used as a component of a seasonal and/or pandemic influenza vaccine or as part of an influenza vaccination regimen intended to confer long-lasting (multi-season) protection. In some embodiments, the pharmaceutical composition of the presenting invention is used to treat the symptoms of influenza infection.

In some embodiments, subjects suffering from or susceptible to influenza infection are tested for antibodies to the NA polypeptides or tetrameric NA proteins of the invention prior to, during, or after administration of pharmaceutical compositions in accordance with the invention. In some embodiments, subjects having such antibodies are not administered the pharmaceutical compositions of the invention. In some embodiments, an appropriate dose of a pharmaceutical composition is selected based on detection (or lack thereof) of such antibodies.

In various embodiments, a subject is any member of the animal kingdom. In some embodiments, the subject is a non-human animal. In some embodiments, the subject is a mammal, an avian (e.g., a chicken or a bird), a reptile, an amphibian, a fish, an insect, and/or a worm. In certain embodiments, the non-human subject is a mammal (e.g., a rodent, a mouse, a rat, a rabbit, a monkey, a dog, a cat, a sheep, cattle, a primate, and/or a pig). In some embodiments, a subject is a transgenic animal, genetically-engineered animal, and/or a clone.

In some embodiments, the subject is a human. In certain embodiments, the subject is an adult, an adolescent, or an infant. In some embodiments, the human subject is younger than 6 months of age. In some embodiments, the human subject is 6 months of age or older, is 6 months through 35 months of age, is 36 months through 8 years of age, or 9 years of age or older. In some embodiments, the human subject is an elderly aged 55 years or older, such as 60 year of age or older, or 65 years of age or older. Also contemplated by the present invention are the administration of the pharmaceutical compositions and/or performance of the methods of treatment in-utero.

This description and exemplary embodiments should not be taken as limiting. For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items The present invention will be more fully understood by reference to the following Examples. All literature citations included herein are incorporated by reference.

EXAMPLES

The following examples are provided to illustrate certain disclosed embodiments and are not to be construed as limiting the scope of this disclosure in any way. As used herein, CBC NA refers to NA polypeptides or proteins designed using the cluster-based consensus (CBC) approach described herein.

Example 1. Cluster-Based Consensus Approach for Designing Recombinant Influenza NA Polypeptides Recombinant influenza NA polypeptides were generated using a cluster-based consensus (CBC) approach. As a first step, influenza A neuraminidase (NA) protein sequences (subtype H1N1) from 1918 through 2011 were downloaded from the Influenza Virus Resource at the National Center for Biotechnology Information (see Bao et al. (2008) *J. Virol.* 82, 596-601). Specifically, a non-redundant set of 1796 full-length, human-host, NA protein sequences was identified for analysis and generation of consensus amino acid sequences. The non-redundant sequences were aligned using MAFFT v7 (Katoh, S. (2013) *Mol. Biol. Evol.* 30, 772-780) to yield a multiple sequence alignment. Subsequently, the all versus all pairwise identity matrix was calculated using python. Classical multidimensional scaling (MDS) was then performed on the pairwise identity matrix for dimension reduction and visualization of similarity between the sequences so as to generate clusters of similar sequences. Retaining only the first two dimensions from MDS allowed the relationship between each individual sequences in the highly dimensional identity matrix to be mapped into a 2-Dimensional scatterplot.

Altogether, five, non-overlapping clusters of similar protein sequences were defined from the 2-Dimensional representation of the pairwise identity matrix (FIG. 1A). The five clusters represented seasonal-like sequences (three clusters: 1933-1950; 1948-1997; 1998-2009), swine-like sequences (one cluster: 1976-2008), and pandemic-like sequences (one cluster: 2009-2011).

To generate consensus sequences between sequence clusters, the consensus sequence within each sequence cluster was first generated by majority vote (i.e., most frequent amino acid at each position). By way of example, if the frequency of the amino acid at a given position was 50% or greater, that amino acid is designated a consensus amino acid, and if the frequency of the amino acid at a given position was less than 50%, that amino acid is designated as a variable amino acid. In cases of amino acid variation at specific positions in the alignment (e.g., where the maximum frequency was <0.5) the decision on the representative amino acid at the position was based on analysis of structural models of the consensus sequences generated by comparative modeling.

Specifically, in cases where a clear majority vote could not define a single amino acid at a specific position in the sequence, multiple consensus sequences (one for each possible amino acid based on the alignment) were generated. Positions that could not be determined unambiguously were coded as 'X', to be resolved by molecular modeling from a unique set of probable amino acids that could occur at any one specific position. Accordingly, an important aspect of the design was refinement by molecular modeling to resolve potential structural problems and select suitable amino acids at variable positions and select sequences based on low calculated energies. For example, the 3D structures of sequences generated by the consensus method were modeled using the Rosetta Molecular Modeling package (Leaver-Fay et al. (2011) *Meth. Enzymol.* 487:545-74). Molecules with negative total energy values were predicted to have a high probability of folding into stable and/or functional proteins while those with positive energy values were considered less likely to fold properly. Thus, where residue positions could not be assigned unambiguously using the consensus generation method, the amino acid resulting in a structure with the lowest, or near to lowest, calculated potential energy was selected since it was presumed to be more stable and therefore likely to be expressed and functional. Using this process, a set of energy minimized designs including multiple candidate sequences was generated. In some instances, a single representative sequence for each of the five clusters (within-cluster archetype sequences) was selected for further evaluation.

To further extend the breadth of antigen coverage, multiple consensus sequences (i.e., within-cluster consensus sequences) were combined to yield across-cluster consensus sequences using the same procedure for defining a consensus sequence and structural modeling as described previously. Accordingly, NA polypeptide sequences comprising consensus amino acids were generated by the combination of (i) swine-like (1976-2008) and pandemic-like (2009-2011) sequences to yield the NA polypeptide—NA5200 (SEQ ID NO: 1), (ii) three seasonal-like (1933-1950, 1948-1997, 1998-2009) sequence clusters to yield NA7900 (SEQ ID NO: 2), and iii) all five sequences clusters to yield NA9100 (SEQ ID NO: 3) (see FIG. 1A). FIG. 1B shows the position of NA5200, NA7900, and NA9100 in sequence space relative to other known H1N1 subtype sequences, as determined by multidimensional scaling. Additional exemplary NA sequences are presented in Table 1 as SEQ ID NOs: 7-18.

Example 2. Functional Characterization of CBC NA Polypeptides

To assess the functional activity of the CBC NA polypeptides, the MUNANA (4-methylumbelliferone) assay was performed. Specifically, HEK293T cells were transfected with 1 µg of endo-free mega-prep NA plasmid (i.e., full length NA containing the NA transmembrane and stem domain) or 100 ng of GFP control plasmid. Results using the pCAXL (derived from pCAGG in which new restriction sites were generated), pcDNA3, and PEF plasmids were compared. Sample was collected at three days post-transfection.

NA activity was determined by cleavage of 4-methylumbelliferone from 2'-(4-methylumbelliferyl)-α-D-N-acetylneuraminic acid (1 mM) by the CBC NAs in 200 mM NaAc (pH 6.5), 2 mM CaCl2 and 1% butanol at 37° C. Release of 4-methylumbelliferone was measured every 2 min for 1 hour (355 nm and 460 nm). One neuraminidase unit is defined as the amount of NA that releases 1 nmol of 4-methylumbelliferone per minute.

As shown in FIG. 2B, the highest NA activity was seen with the pCAXL vector which corresponded with the highest expression level in this plasmid. NA7900 had similar expression levels as NA9100 when expressed in pCAXL but had lower enzymatic activity. NA7900 was not expressed and had no enzymatic activity when expressed in pcDNA3.

Next, the immunogenicity of the CBC NA polypeptides was tested by DNA immunization. In one set of experiments, BALB/C mice were primed and boosted (at 3 weeks apart) with 30 µg of full-length NA5200, NA7900 or NA9100 cloned into the pCAXL vector. An empty plasmid was included as a negative control. Immunization was conducted via intramuscular electroporation. Specifically, electroporation was performed using a 2 pronged needle around the site of injection with 8 electrical pulses of 200V for 20 ms with a 100 ms interval. FIGS. 3A-3F show the results from ELISA assays which measured the binding activity of sera against a panel of influenza H1N1 viral antigens (i.e., PR8, USSR/77, Sing/86, N.Cal/99, Bris/07, or Pdm/09). Results indicated that the sera from mice immunized with the CBC NA constructs exhibited a broad cross reactivity against the panel of H1N1 viral antigens. In fact, the sera from mice immunized with the CBC NA construct showed evidence of broader binding to H1N1 viruses in this ELISA assay than sera generated from mice immunized with wild type PR8 NA.

To further characterize the CBC NA polypeptides, an ELLA assay was used to determine the NA inhibition (NAI) activity of sera from mice immunized with 30 µg of full-length NA5200, NA7900 or NA9100 cloned into the pCAXL vector (FIGS. 4A-4E). The ELLA assay was performed as described in Couzens, L. et al. (2014) J. Virol. Methods 210, 7-14. In brief, sera from mice immunized with NA constructs encoding NA5200, NA7900 or NA9100 was prepared. Serial dilutions of heat-inactivated sera (starting dilution factor 1:20) were incubated with influenza A virus (IAV) at a pre-determined concentration of virus to give 90% maximal NA activity. Incubation was conducted for 30 minutes at 37° C. in PBS supplemented with 10 mg/ml BSA, 1 mM CaCl2, 0.5 mM MgCl2, and 0.5% Tween20. Dilutions were added to wells of plates coated with fetuin (Sigma Aldrich, 5 µg/ml) and incubated for 18 hours at 37° C. HRP-coupled peanut agglutinin (PNA, Sigma Aldrich, 2.5 µg/ml) was used to detect galactose residues exposed after NA-mediated removal of sialic acid from fetuin. The 50% inhibition concentration (IC50) was calculated by non-linear regression analysis (GraphPad Prism). As shown in FIGS. 4A-4E, the sera from mice immunized with CBC NAs exhibited a broad, cross-reactive NAI activity.

The survival rate and body weight of mice immunized with the CBC NA constructs were also analyzed. Specifically, these mice were challenged with 1 $LD_{50}$ of either pdm/09 (A/Belgium/1/2009) or PR8 virus (FIGS. 5A-5F and 6A-6F, respectively). Results indicate that mice vaccinated with DNA constructs encoding NA5200, NA7900, and NA9100 demonstrated a higher survival rate and a lower weight loss against virus challenges compared to mice vaccinated with wildtype NA.

Example 3. Expression and Purification of Tetrameric CBC NA Proteins

As the NA polypeptides were designed according to criteria different from natural evolutionary processes, it was important to confirm correct folding and maintenance of epitope integrity. Thus, NA enzymatic activity was used as a proxy for structural integrity. It has been shown that while NA inhibiting antibodies can be induced by immunization with NA antigen that is enzymatically inhibited by the addition of zanamivir (see Sultana, I., et al. (2011) Vaccine 29, 2601-2606), the NA is still required to be in its native tetrameric form (see Bucher, D. J. and Kilbourne, E. D. (1972) J. Virol. 10, 60-6 and Deroo, T. et al. (1996) Vaccine 14, 561-569). Accordingly, the NA5200, NA7900, and NA9100 polypeptide constructs were modified to allow production and purification as soluble tetrameric proteins in a mammalian expression system. Soluble tetrameric NA derived from 2009 pandemic influenza A (H1N1pdm) was also produced and served as a naturally occurring control (see Schotsaert et al. 2016).

Recombinant tetrameric NA proteins (also referred to as rNA) were produced essentially as described previously for A/Belgium/1/2009 rNA (see Schotsaert et al. 2016). In brief, the stalk region of monomeric NA polypeptides (i.e., NA5200, NA7900, and NA9100) was removed such that the polypeptides comprise amino acids 75-469 of SEQ ID NO: 1, 2, or 3. The stalk region was replaced by a helical peptide derived from Tetrabrachion (SEQ ID NO: 4) which can drive self-assembly into a tetrameric coiled-coil, thereby stabilizing the tertiary and quaternary structure of the NA enzymatic domain. A schematic representation of the tetrameric NA protein structure is provided in FIG. 2A.

Secretion of the NA polypeptide and/or NA protein was facilitated by an N-terminal CD5-derived secretion signal (SEQ ID NO: 5). To facilitate protein purification, either a Strep-tag (SEQ ID NO: 6) or a HIS-tag (e.g., 6×His (SEQ ID NO: 35) was cloned between the secretion signal and the tetramerization sequence (Schmidt, et al. (2011) PLoS One 6, e16284). Further, a linker sequence (SEQ ID No: 19) was also incorporated. It is contemplated that other linker sequences known in the art such as those comprising a thrombin cleavage site (SEQ ID NO:20) may also be used.

For purification of strep-tagged NA proteins, the NA constructs were expressed in Expi293 cells. The media supernatant was clarified first by low-speed centrifugation (1000×g) followed by 0.2 um filtration to remove insoluble cell debris. Cell supernatant was concentrated by ultrafiltration and tangential flow filtration followed by dialysis against PBS supplemented with avidin to remove any biotin present in the expression media. Dialyzed supernatant was loaded on Strep-Trap column (GE Healthcare) that was equilibrated with PBS. Bound proteins were eluted with 2.5 mM desthiobiotin in PBS. Elution fractions were pooled and concentrated for polishing by preparative SEC on HiLoad 16/600 Superdex 200 (GE Healthcare) equilibrated with PBS.

For purification of His-tagged recombinant NA proteins, the NA constructs were also expressed in Expi293 cells. The media supernatant was clarified and concentrated as described previously. Dialyzed supernatant was captured on His Trap Excel (GE Healthcare) resin equilibrated with PBS, pH 7.4. Unbound proteins were washed off with PBS and bound proteins were eluted with a linear gradient of 20-500 mM imidazole in PBS. Eluted protein was then purified on HiLoad XK50/70 Superdex200, prep grade column (GE Healthcare) equilibrated with PBS in size exclusion mode. In some embodiments, dialyzed samples were loaded on a HiTrap Q HP column (GE healthcare) equilibrated with 50 mM Tris, pH 8. Any unbound protein was washed off with 50 mM Tris, pH 8 and bound proteins were eluted with a linear gradient of 0-1M NaCl in 50 mM Tris, pH 8.0. Pooled fractions were filtered through 0.2 um filter, dialyzed against PBS and small aliquots were flash frozen in liquid nitrogen.

Size exclusion chromatography analysis revealed a dominant peak for proteins comprising NA5200, NA7900, and NA9100 with a retention time that corresponded to the predicted molecular weight of a soluble tetrameric NA (FIG. 7A). For the NA5200 and NA9100 tetrameric proteins, minor peaks were observed, which eluted faster from the size exclusion column than the dominant peaks. These fractions likely corresponded to aggregate forms of NA and were discarded.

The NA activity of the tetrameric NA proteins was determined by the MUNANA assay. As shown in FIG. 7B, all three tetrameric CBC NA proteins (comprising NA5200, NA7900, or NA9100 polypeptides) were enzymatically active as determined by the release of 4-methylumbelliferone from a small molecule sialic acid conjugate precursor. The specific activity of the three tetrameric NAs was similar to or slightly higher than that of 2009 H1N1pdm-derived soluble tetrameric NA (FIG. 7B).

Next, prediction of possible N-glycosylation sites in the head domain of the CBC NAs was performed using the NetNGlyc 1.0 server. The potential N-glycosylation sites were compared with those in relevant N1 s. NA5200, NA7900 and NA9100 polypeptides carried 3 potential N-glycosylation sites, namely at positions 88, 146 and 235 (see Table 1), which are in nearly all N1 NAs (Sun et al., PLoS One, 6, e22844, 2011).

Altogether, these data indicate that the tetrameric CBC NA proteins exhibited correct folding and maintenance of epitope integrity.

Example 4. Immunization Studies with Tetrameric CBC NA Protein

Protection by vaccination with NA is known to be dependent on the induction of antibodies that can mediate neuraminidase inhibition (NAI) (see Wohlbold et al. 2015). Therefore, as an initial step to examine the potential breadth of antibody response directed against the tetrameric CBC NA proteins, protein immunization studies were performed. Specifically, six-week old mice were primed and then boosted subcutaneously after a three-week interval with 1 μg of recombinant tetrameric CBC NA proteins or control NAs or 0.1 HA of monovalent inactivated vaccine alone or in combination with NA using the Sigma Adjuvant System (SAS), which contained the immuno-stimulants monophosphoryl Lipid A and synthetic trehalose dicorynmycolate. Sera samples were taken by tail bleeding at three weeks after the prime and boost. In some cases, terminal bleeds were performed three weeks after the boost vaccination by retro-orbital bleeding.

Heat-inactivated sera from mice immunized with the CBC NA proteins was compared to those immunized with three wild-type NA proteins for their capacity to mediate NAI against a panel of human H1N1 viruses. Specifically, the type A influenza viruses (IAVs) used in this study were the mouse adapted H1N1 strains A/USSR/90/1977 (USSR/77), A/New Caledonia/20/1999 (NC/99), A/Brisbane/59/2007 (Bris/07), and A/Belgium/1/2009 (Bel/09; as described in www.ncbi.nlm.nih.gov/nuccore/?term=txid1502382). The A/Swine/Belgium/1/98 strain was mouse-adapted by consecutive passage in mouse lungs (see Neirynck, S. et al. (1999) Nat. Med. 5, 1157-1163). A/Puerto Rico/8/34 (PR8/34) and the H5N1 virus NIBRG-14 were also included in the panel. Particularly, the NIBRG-14 strain was included as it represented potential pandemic-causing viruses. NIBRG-14 is a 6:2 reverse genetics-derived reassortant virus expressing the NA (with the polybasic cleavage site removed) and HA segments of A/Vietnam/1194/2004, an avian virus isolated from an infected human, and the other 6 genes segments from PR8/34. Altogether, these strains were selected to look for cross-reactivity of any induced anti-NA antibodies to the NA from these distantly related viruses.

NAI activity was assessed using the ELLA assay as described previously. As observed with previous studies (Wohlbold et al. 2015), immune sera raised against natural NAs possessed some cross-reactivity (FIGS. 8A and 8B). PR8/34 NA anti-sera mediated NAI against PR8/34, and to a lesser extent against USSR/77 and Sw/Bel/98. Likewise, anti-sera induced by vaccination with purified recombinant tetrameric NA derived from NC/99 reacted with itself and Bris/07. Bel/09 NA anti-sera mediated the strongest NAI titers against itself and Sw/Bel/98, followed by NIBRG-14.

Results indicate that the tetrameric CBC NA proteins clearly elicited enhanced cross-protection against multiple strains (including distantly related strains) (FIGS. 8A and 8B). Anti-NA5200 anti-sera strongly inhibited the NA activity of Bel/09, Sw/Bel/98, and NIBRG-14, and to a lesser extent, PR8/34 and USSR/77. Anti-NA7900 anti-sera mediated NAI against all four seasonal H1N1 viruses tested (PR8/34, USSR/77, NC/99, and Bris/07) and NIBRG-14, thereby displaying a broader NAI span than anti-sera raised against NC/99 tetrameric rNA. Finally, anti-sera raised against NA9100 showed substantial NAI against all H1N1 viruses tested.

In addition, the percent sequence identity shared between the CBC NAs or wild-type (WT) NAs and the H1N1 viruses used in the ELLA assay was determined. For the assessment, only amino acids from 75 onwards (relative to SEQ ID Nos 1, 2, or 3) were considered as the individual NA polypeptides lacked the native NA stalk sequence. Percent identity was determined using the BlastP suite-2 sequences software (see Bao 2008 and Katoh 2013). Numbers in bold identify where an 1:IC50 of >2.3 (i.e., 1:5) in the NAI assay is observed.

TABLE 3

| Percent identity shared by CBC designs and WT NAs | | | | | | |
|---|---|---|---|---|---|---|
| | rNA anti-sera | | | | | |
| Virus strain | NA5200 | NA7900 | NA9100 | PR8/34 | NC/99 | Bel/09 |
| PR8/34 | 87% | 94% | 92% | 100% | 88% | 83% |
| USSR/77 | 87% | 95% | 92% | 91% | 92% | 84% |
| NC/99 | 85% | 93% | 90% | 88% | 100% | 84% |
| Bris/07 | 85% | 92% | 90% | 88% | 97% | 83% |
| Bel/09 | 92% | 85% | 88% | 83% | 84% | 100% |
| NIBRG-14 | 91% | 87% | 90% | 86% | 85% | 90% |
| Sw/Bel/98 | 89% | 88% | 90% | 85% | 85% | 94% |

As shown in Table 3, NA9100 shared the highest percent identity with the H1N1 viruses tested, followed by NA7900, then NA5200. In comparison, the identity of WT NAs to other H1N1 NA varied greatly. In general, a higher degree of sequence identity between the WT viruses and the CBC designed NAs correlated with greater breadth of coverage in the NAI (as shown in bold in Table 3). Although NC/99 NA shared 92% identity with USSR/77 there was no NAI detected, even though the majority of the consensus NAs displayed NAI at a ≥88% identity.

Taken together, these data indicate that while wild type tetrameric NAs induced a degree of cross-reactive antibody response, the tetrameric CBC NA proteins provided significantly enhanced cross-protection against multiple influenza strains. Without wishing to be bound by theory, it is believed that the CBC NAs are capable of eliciting a broadly reactive immune response against multiple conserved epitopes within influenza NA even when natural NAs cannot.

Example 5. Vaccination Challenge Studies with Tetrameric CBC NA Protein

Active vaccination challenge experiments were performed to further study the protective capability of the tetrameric CBC NA proteins. In these experiments, mice were primed and boosted subcutaneously with tetrameric CBC NA proteins comprising NA5200, NA7900, or NA9100 polypeptides along with adjuvant. Mice that had been mock-vaccinated with buffer plus adjuvant only were included as controls. Three weeks following the boost, mice were challenged by intranasal infection with 5 LD50 of either PR8/34, USSR/77, NC/99, Bel/09, Sw/Bel/98, or NIBRG-14. The mice were subsequently assessed over a period of 14 days for changes in body weight as well as survival (FIGS. 9A-9L).

All challenged mice that received adjuvant alone succumbed to the infection by day 9 ("mock" groups in FIGS. 9A-9L). Vaccination with tetrameric CBC NA proteins comprising NA5200 significantly protected mice from challenge by all H1N1 viruses tested, except USSR/77. In contrast, NA5200 only partially protected vaccinated mice from challenged with USSR/77, as these mice exhibited a transient weight loss over time and were only partially protected against mortality (FIG. 9C-9D). Vaccination with tetrameric CBC NA proteins comprising NA7900 significantly protected mice from challenge with PR8/34, USSR/77, NC/99, or NIBRG-14 infection, but not against Bel/09 and Sw/Bel/98, where only partial protection was observed. Vaccination with tetrameric CBC NA proteins comprising NA9100 showed a broad range of protection, and significantly protected mice from challenge by PR8/34, NC/99, Bel/09, Sw/Bel/98, and NIBRG-14 infection. Mice infected with USSR/77 and vaccinated with NA9100 displayed no significant difference compared with mock-vaccinated mice, when considering main columns effects of a two-way ANOVA (p value=0.08). However, on days 6 through 9 there was a significant difference in weight loss for NA9100-vaccinated mice compared to mock-vaccinated mice (p<0.01, two-way ANOVA) and 100% of the mice survived the infection (FIG. 9C). Altogether, these results indicate that tetrameric CBC NA proteins comprising the NA5200 and NA9100 polypeptides provided broad protection against influenza virus infections, potentially spanning a long time-frame and corresponding antigenic space.

Previous studies have shown that viral loads within the lung are decreased when anti-NA immunity is induced (Bosch, B. J. et al. (2010) J. Virol. 84, 10366-74; Schulman, J. L., et al. (1968) J. Virol. 2, 778-86; and Webster, R. G. and Laver, W. G. J., (1967) Immunology 99). Therefore, vaccination with tetrameric CBC NA proteins comprising NA5200, NA7900, or NA9100 polypeptides was also assessed for the ability to reduce viral lung loads. Specifically, mice were primed and boosted with either tetrameric CBC NA proteins comprising NA5200, NA7900, or NA9100 and infected with 5 LD50 of PR8/34, NC/99, or Bel/09, three weeks following the boost. On day 3 and day 7 post-infection lungs were collected and viral loads examined.

Mice were monitored for weight loss and survival and were euthanized if they lost ≥25% of their original body weight. In some experiments, on days 3, 6, or 7, mice were sacrificed by overdose of sodium pentobarbital (final concentration 3 mg/mouse) and bronchoalveolar lavages (BAL) were performed, and lungs were excised. BALs were performed according to Van Hoecke et al. (see Van Hoecke, et al. (2017) J. Vis. Exp. e55398-e55398), and cell free supernatant was assessed in tissue culture infectious dose (TCID50) for viral loads. Total protein levels in cell-free BAL fluids were determined by Bradford protein dye using a standard curve of BSA. Lungs homogenates were prepared and clarified as previously described (see De Baets, S. et al. (2015) PLoS One 10) and viral titer assessed by TCID50 assay.

Standard TCID50 assays were used to assess viral titers in the clarified lung homogenates or BAL fluid (BALF). Confluent monolayers of MDCK cells in 96-well plates, cultured in DMEM plus 10% FCS, and supplemented with non-essential amino acids, 2 mM L-glutamine, 0.4 mM sodium-pyruvate, were washed in serum-free media and incubated with 10-fold dilutions of samples in serum-free DMEM containing 1 μg/ml of TPCK-treated trypsin (Sigma). Virus was detected in the wells by agglutination of chicken red blood cells after 7 days post-infection and values were calculated by the Reed and Muench method (Reed and Muench 1938).

As shown in FIGS. 10A-10F, viral loads did not show any significant reduction in the CBC NA-vaccinated groups compared to mock-treated animals on day 3. However, by day 7 after challenge, all mice that had been vaccinated with the tetrameric CBC NA proteins had significantly lower viral titers in the lungs than mock-vaccinated mice. Since vascular leakage and pulmonary edema are indicative of a severe influenza infection (see Tate, M. D. et al. J. Immunol. (2009) 183 and Job, E. R. et al. J. Immunol. (2014) 192), the possible benefit of NA vaccination was also assessed for these parameters based on the total protein content within cell-free BAL fluids. Mice vaccinated with tetrameric CBC NA proteins and infected with either PR8/34, NC/99, or Bel/09 displayed no significant difference in the protein levels in BAL fluids isolated on day 3 after challenge but had significantly less total protein on day 7 post-infection when compared to controls (FIG. 10A-10F).

Together, these data shows that vaccination with tetrameric CBC NA proteins comprising NA5200, NA7900, or NA9100 showed significant anti-viral efficacy as measured by a variety of different assay platforms.

Example 6. Passive Transfer Experiments

Figure 12:
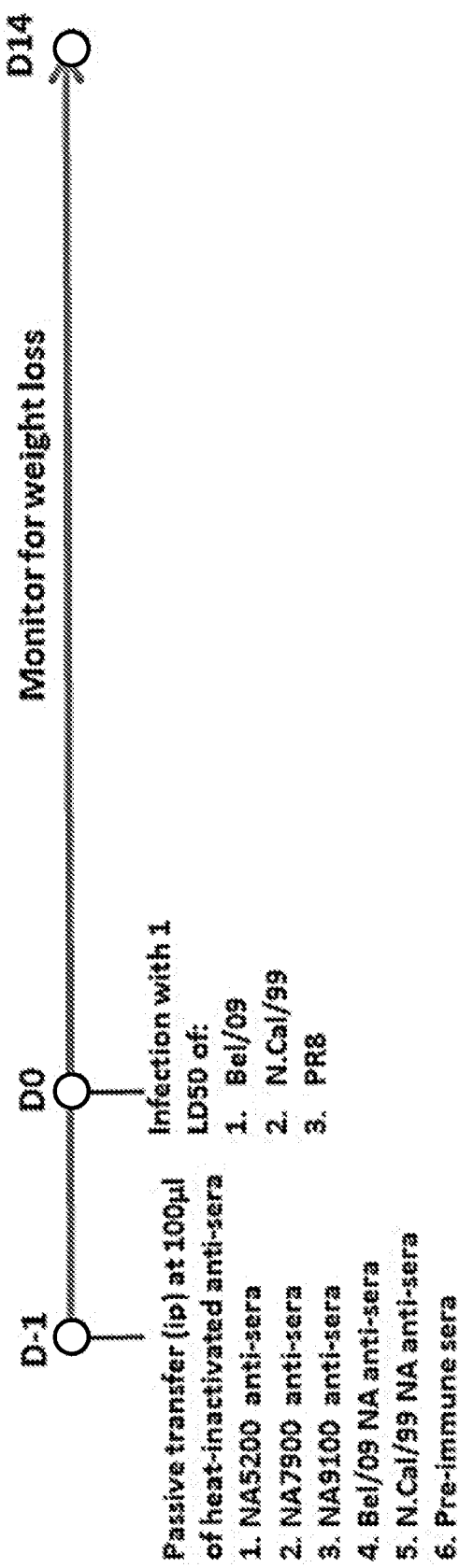
Figure 13A:
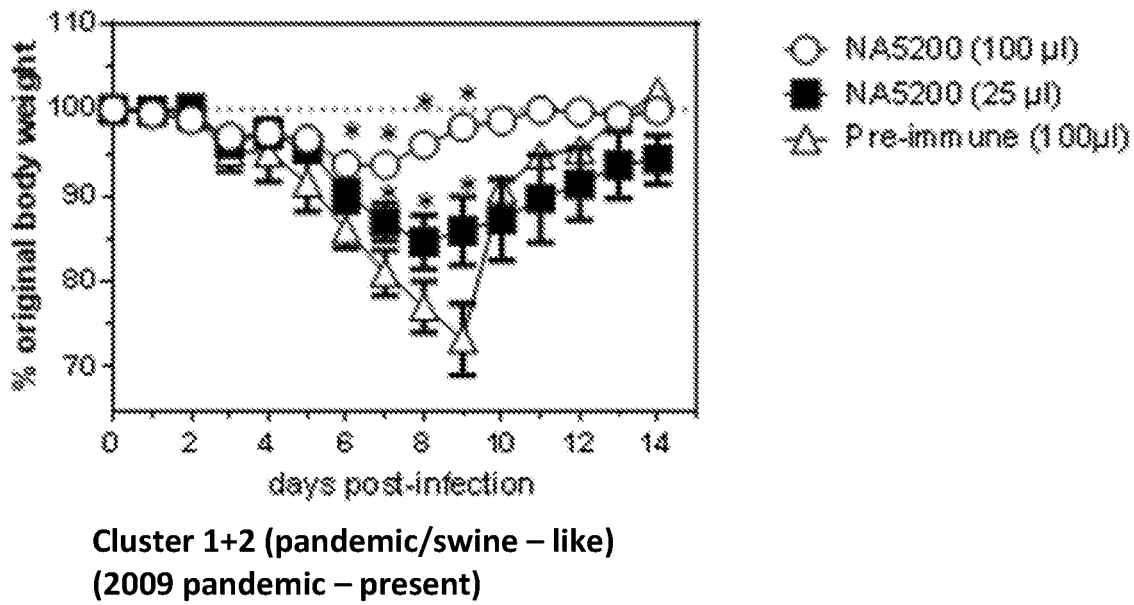
Figure 13B:
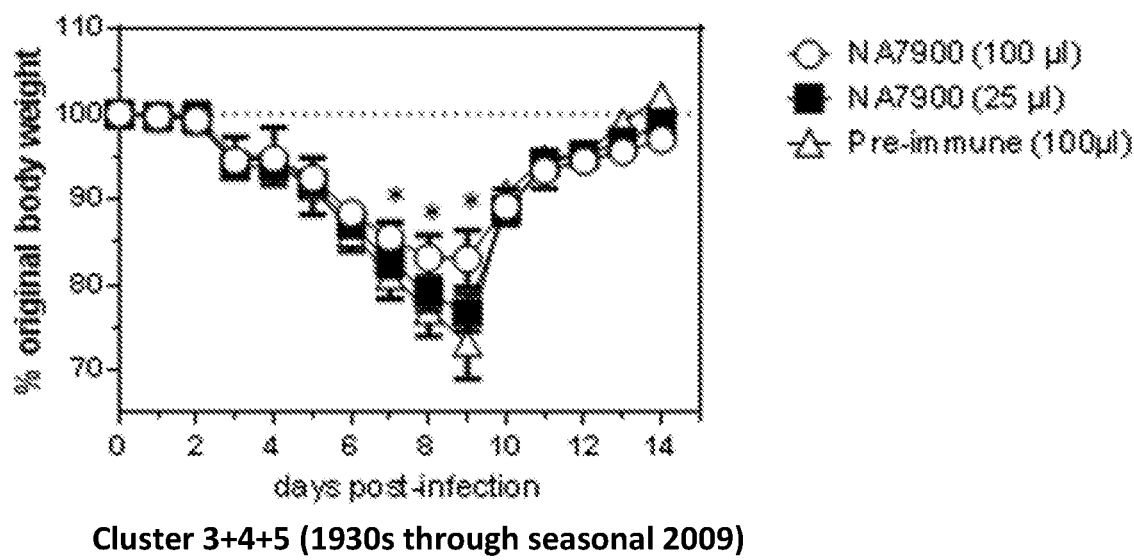
Figure 13C:
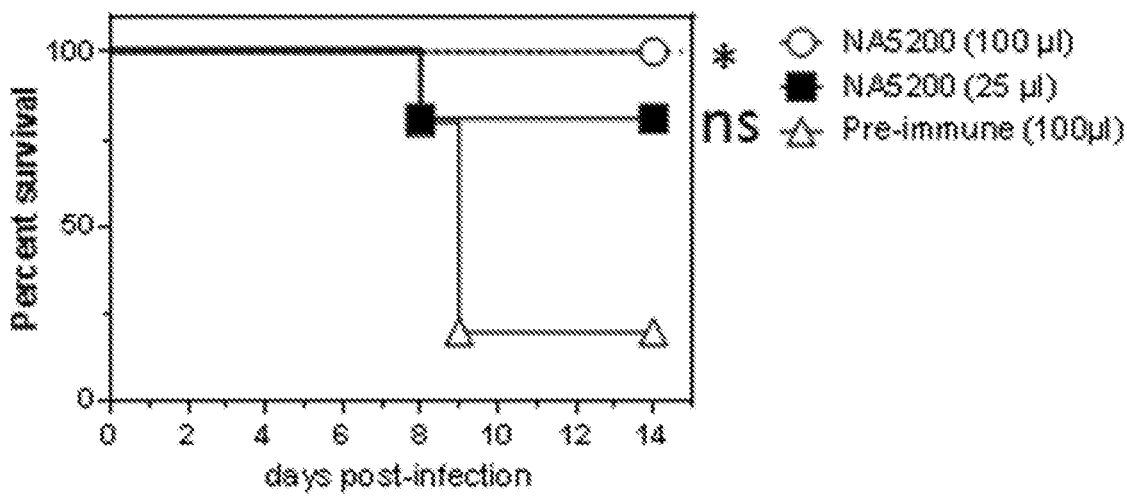
Figure 13D:
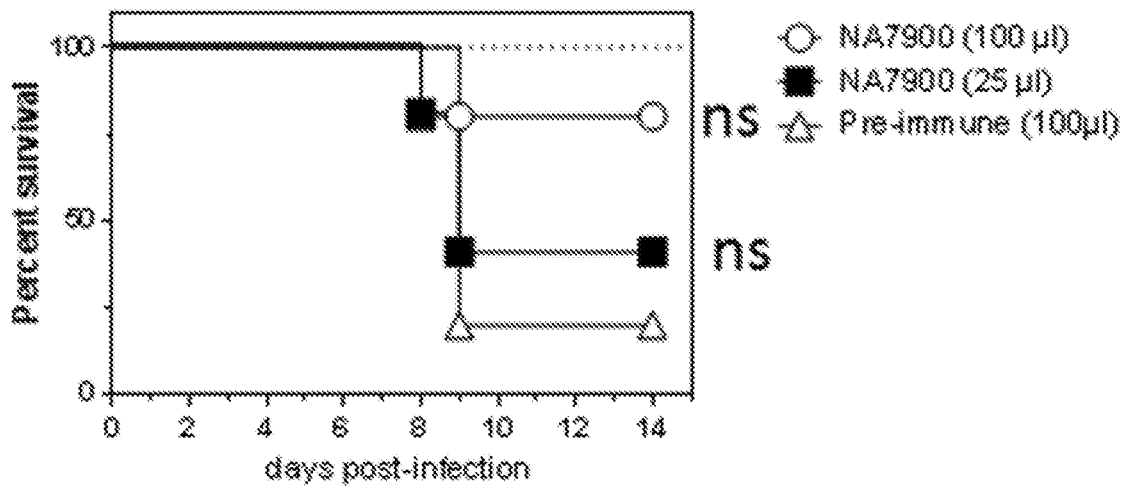
Figure 13E:
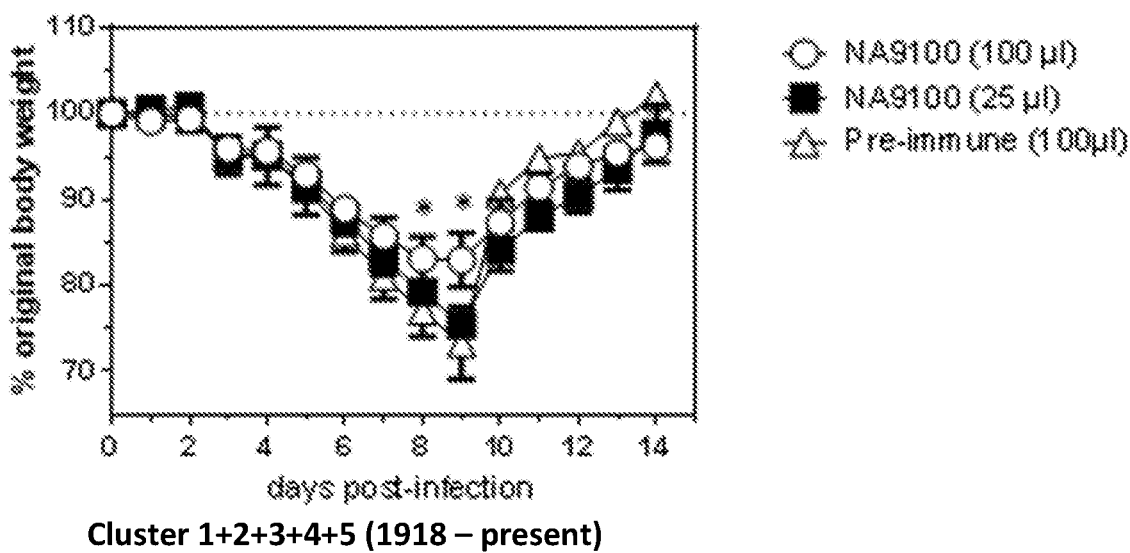
Figure 13F:
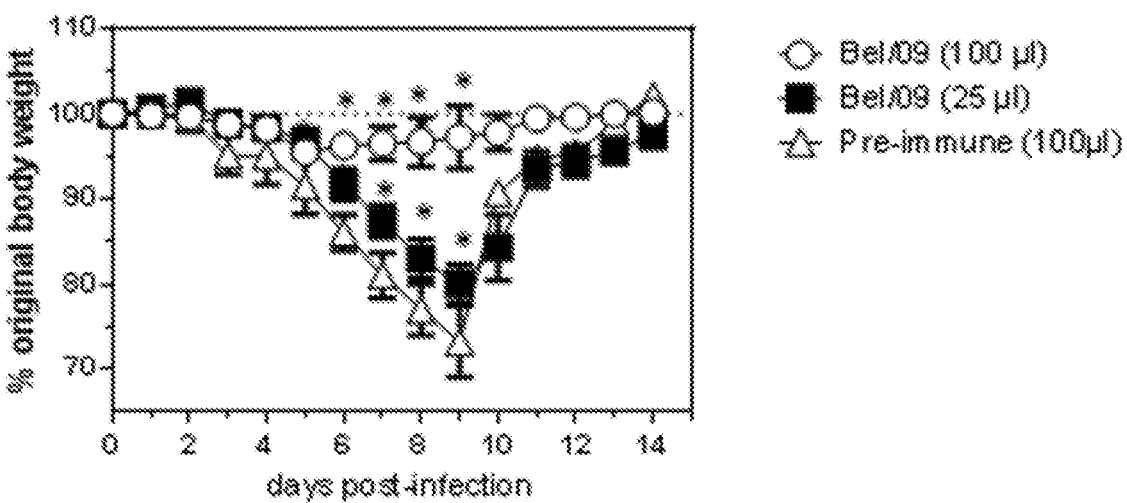

As described previously, a major correlate of protection by vaccination with NA is the ability to induce NA inhibiting antibodies. Thus, passive transfer experiments were conducted to determine if antibodies were the major mediators of protection induced by CBC NA. In such experiments, heat-inactivated anti-sera was prepared from mice immunized with DNA encoding NA5200, NA7900, NA9100, or buffer alone (PBS). As shown in FIGS. 11A-11D, the anti-sera exhibited broad NAI activity after three rounds of immunizations. The anti-sera were then passively transferred intranasally to six-week old mice one day prior to infection with 2 LD50 of either PR8/34, NC/99, or Bel/09. Anti-sera raised to individual wild type rNAs were included as homologous positive controls. Anti-sera were the same sera used previously in Example 4 (FIGS. 8A-8B) to assess the broadening of NAI responses. In all viral challenges, the positive control anti-sera fully protected mice from weight loss and survival following a potentially lethal infection with the homologous virus. An exemplary experimental schedule for the passive transfer experiments are provided in FIG. 12.

Results from the passive experiments are provided in FIGS. 13A-13H, which show weight loss protection and increase of survival provided by the CBC NAs after 1 LD50 Bel09 challenge. FIGS. 14A-14F show weight loss protection and increase of survival provided by the CBC NAs after 1 LD50 Bel09, NC/99 or PR8/34 challenge.

Passive transfer experiments were also performed by immunizing mice with tetrameric CBC NA proteins. As shown in FIGS. 15A-15F, although active vaccination with tetrameric CBC NA comprising NA5200 protected against PR8/34, NC/99, and Bel/09 infection, passive transfer of NA5200 anti-sera only provided significant protection against weight loss and mortality in mice infected with Bel/09 or PR8/34, and not with NC/99 (p<0.01 two-way ANOVA or log rank test). Passive transfer of anti-sera from mice immunized with tetrameric CBC NA comprising NA7900 immune serum significantly protected against morbidity and mortality when infected with PR8/34 and NC/99, in comparison to the negative control group (p<0.01 two-way ANOVA or log rank test). However, passive transfer of NA7900 anti-sera did not significant protect mice from challenge by the Bel/09 virus. Lastly, the passive transfer of NA9100 anti-sera provided significant protection against all three challenge viruses for both weight loss and survival (p<0.01 two-way ANOVA or log rank test).

In all passive transfer experiments, full protection against mortality correlated with the ability of the anti-sera to mediate NAI (see FIG. 8A). As such, it can be concluded that antibodies play a major role in the protection induced by tetrameric CBC NA proteins, although in some cases, for example when no NAI was present but protection is evident, another mechanism may also be contributing to protection.

Example 7. Assessment of Scope of Protection and Combined Approach with Monovalent Vaccine Next, experiments were performed to test if the CBC NAs could (i) offer broader protection in vivo compared to wild type recombinant tetrameric NA proteins (rNAs) and (ii) increase upon the protection provided by a split inactivated vaccine. Specifically, mice were vaccinated with NA5200 and NA9100 or wild type soluble recombinant NAs derived from Bel/09 and NC/99 alone or in combination with a monovalent H1N1 pdm09 vaccine. Subsequently, the mice were challenged with Bel/09 or NC/99.

Figures 16A, 16B, 16C:
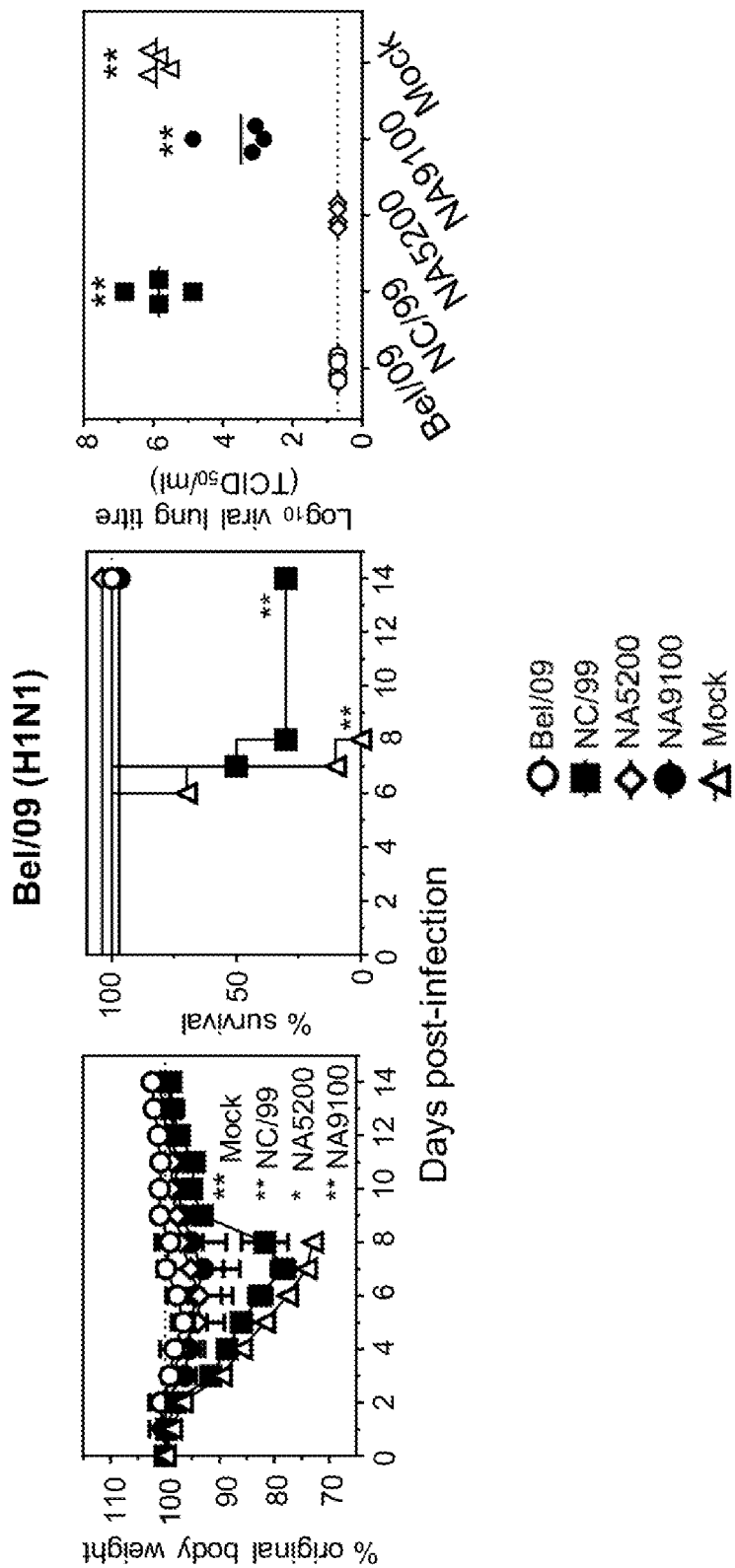

Mice vaccinated with NC/99 rNA were not significantly protected from weight loss and mortality compared to Bel/09 rNA vaccinated mice following Bel/09 challenge. Homologous-vaccinated mice displayed slightly less, but significant, weight loss than both NA5200 and NA9100-vaccinated mice; however, 100% of the mice survived the infection (FIGS. 16A, 16B). Further, viral loads in the lungs on day 7 of NC/99-vaccinated were on average similar to mock-vaccinated mice. Viral titers on day 7 of NA5200 and NA9100-vaccinated mice were significantly reduced compared to mock-vaccinated mice (p<0.01, One-way ANOVA), however, both homologous rNA and NA5200 out-performed NA9100 NA (FIG. 16C). This pattern was also observed for mice challenged with NC/99. Bel/09 rNA-vaccinated mice lost significantly more weight, displayed increased mortality and higher viral loads at day 6 post-infection compared to NC/99-vaccinated mice (FIGS. 16G, 16H, 16I).

Figures 9A, 9B:
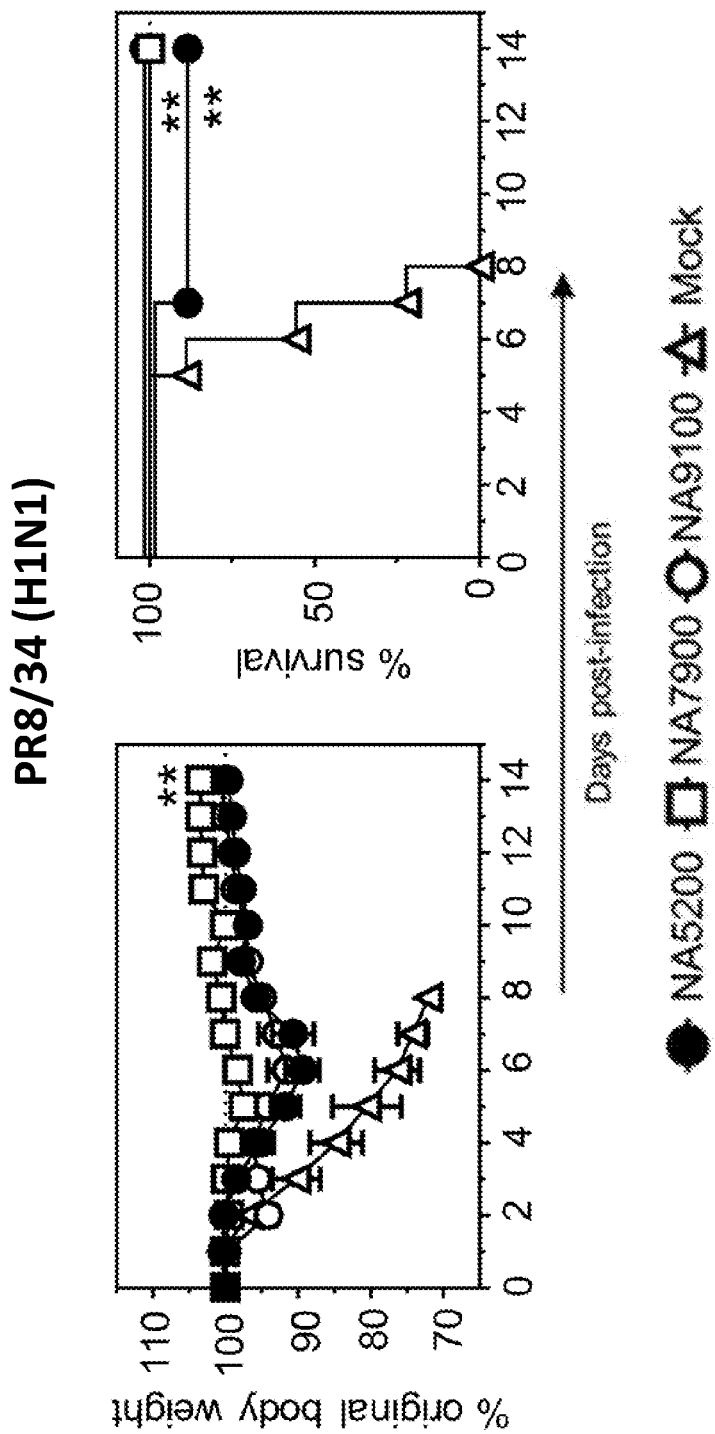
Figures 9C, 9D:
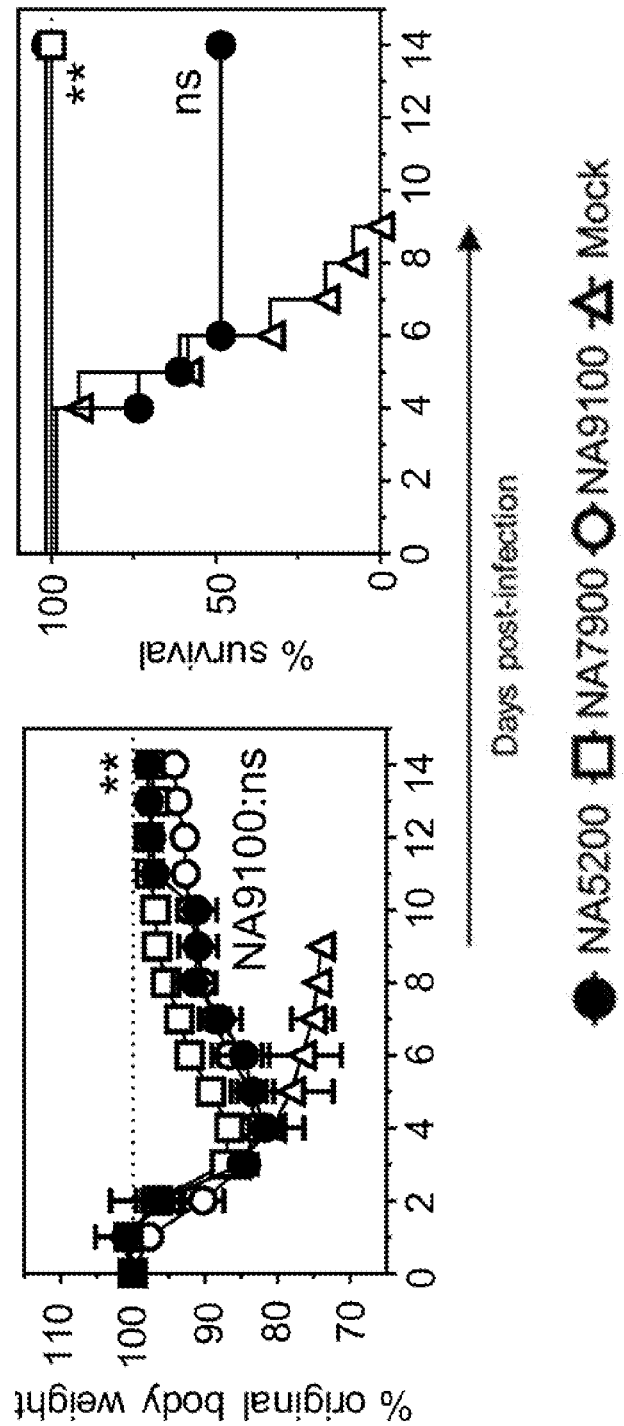
Figures 9G, 9H:
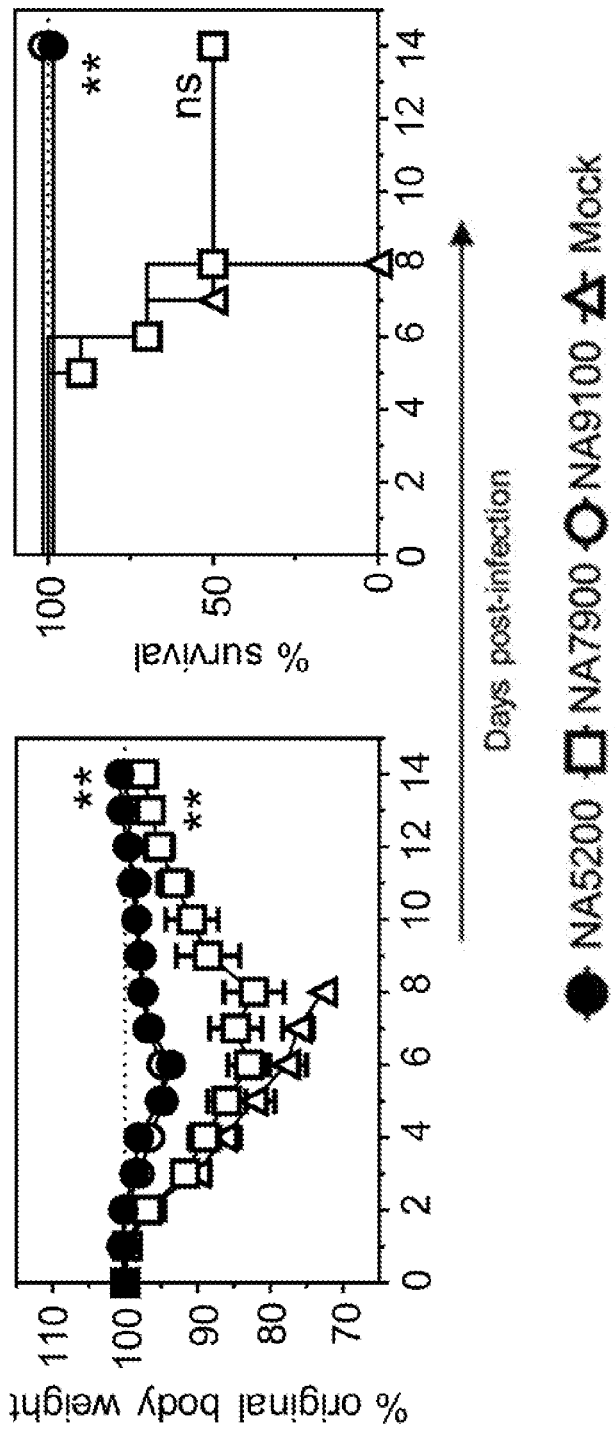
Figures 9I, 9J:
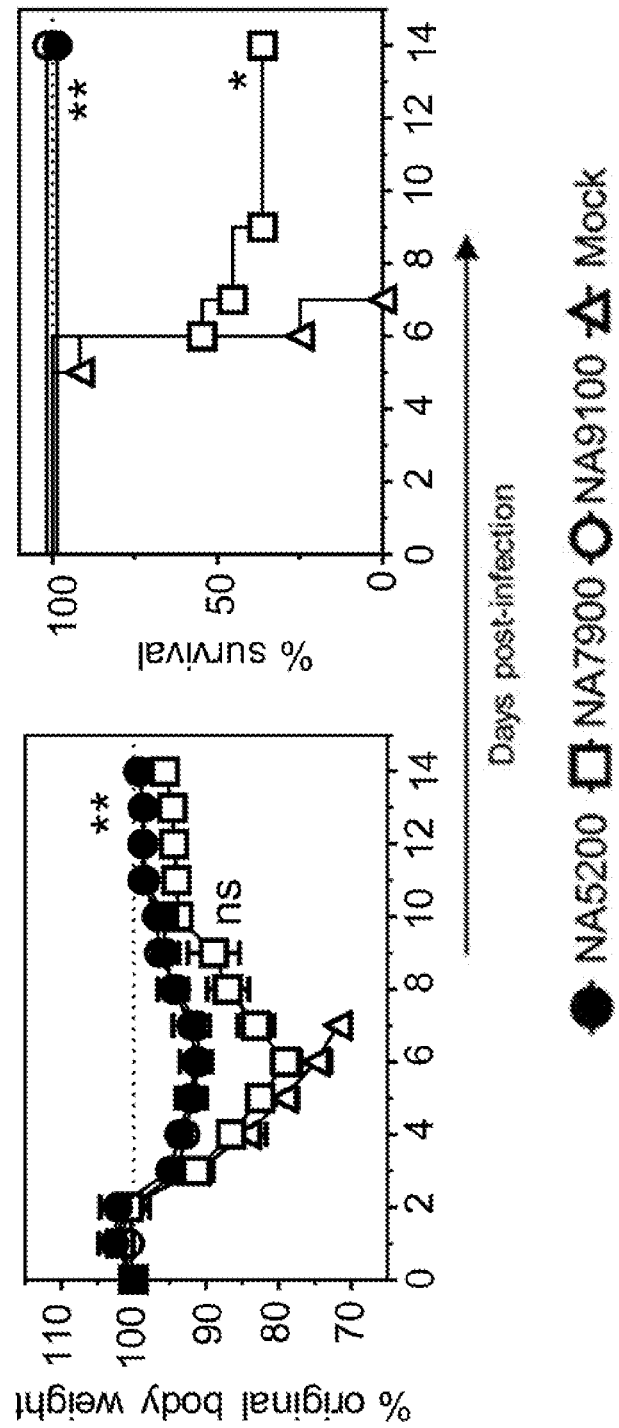
Figures 9K, 9L:
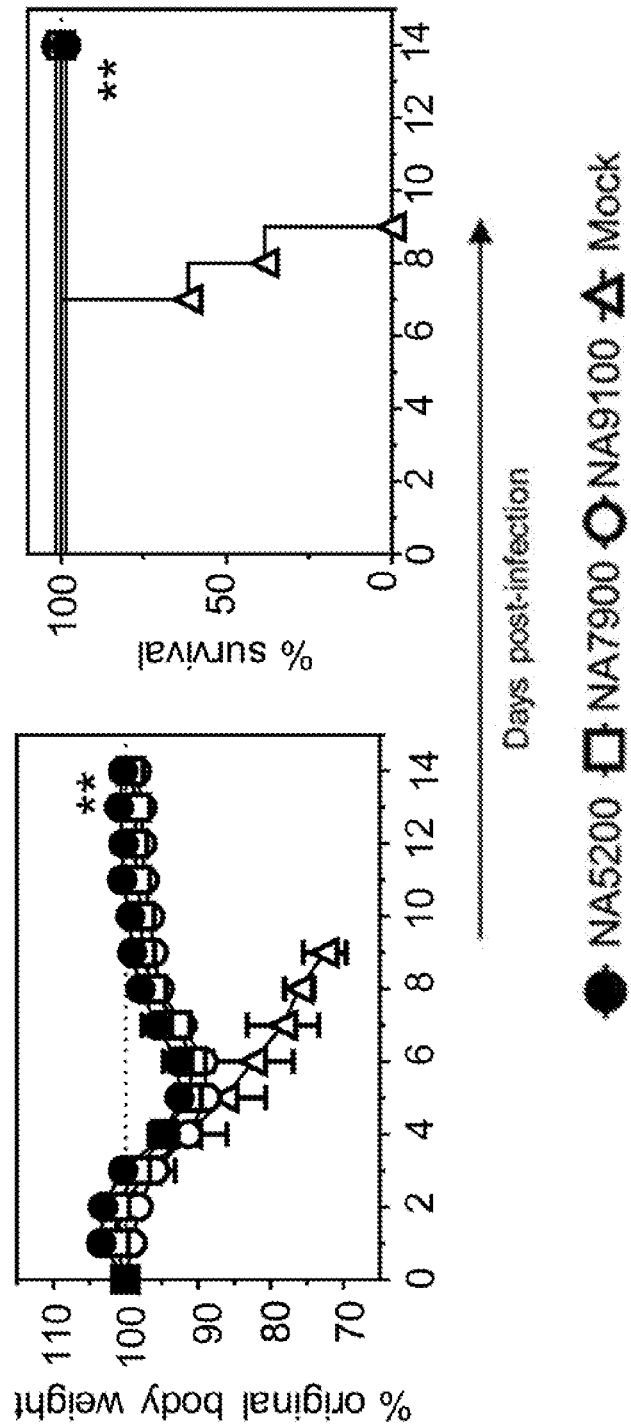
Figures 10C, 10D:
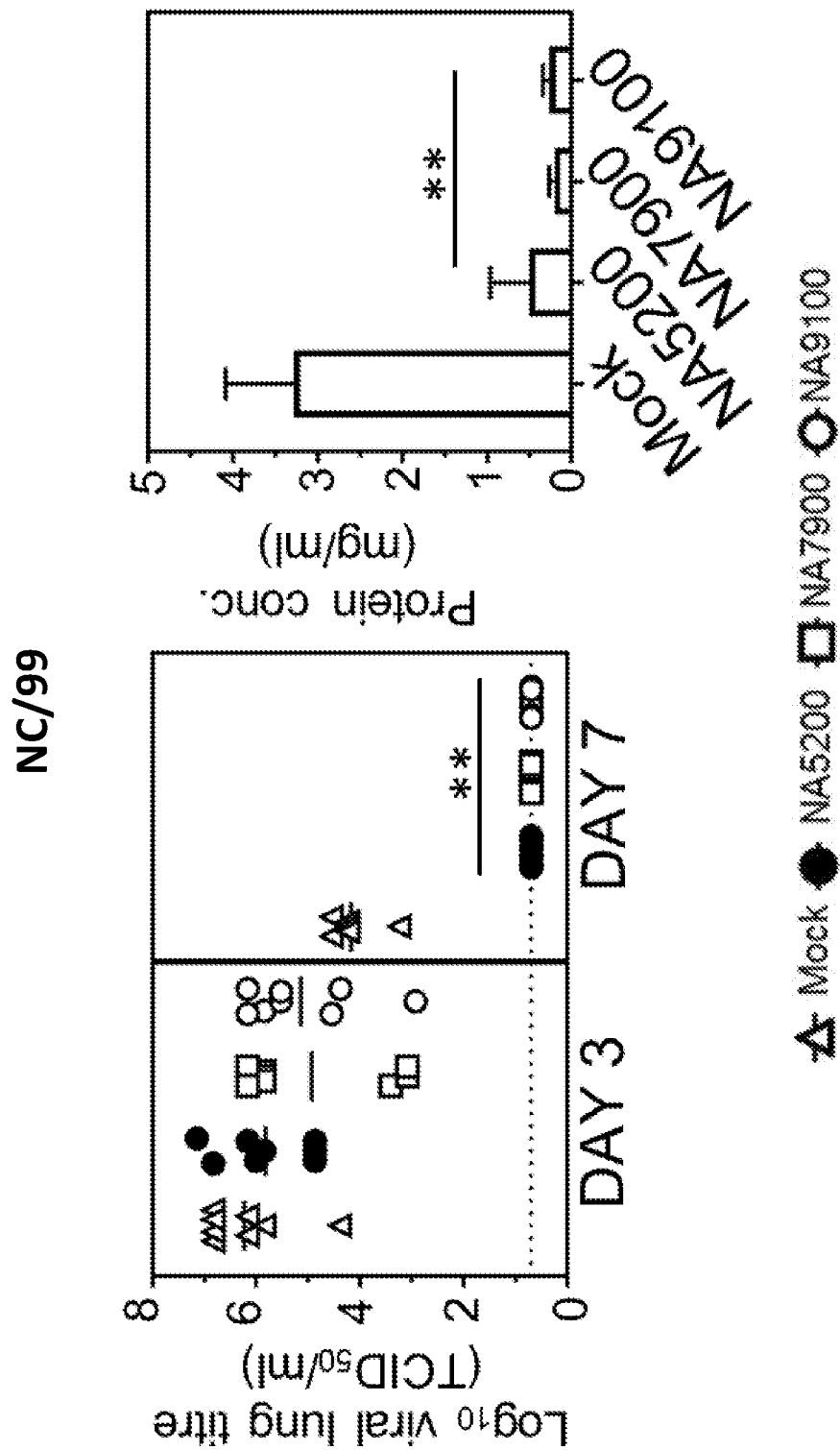
Figures 10E, 10F:
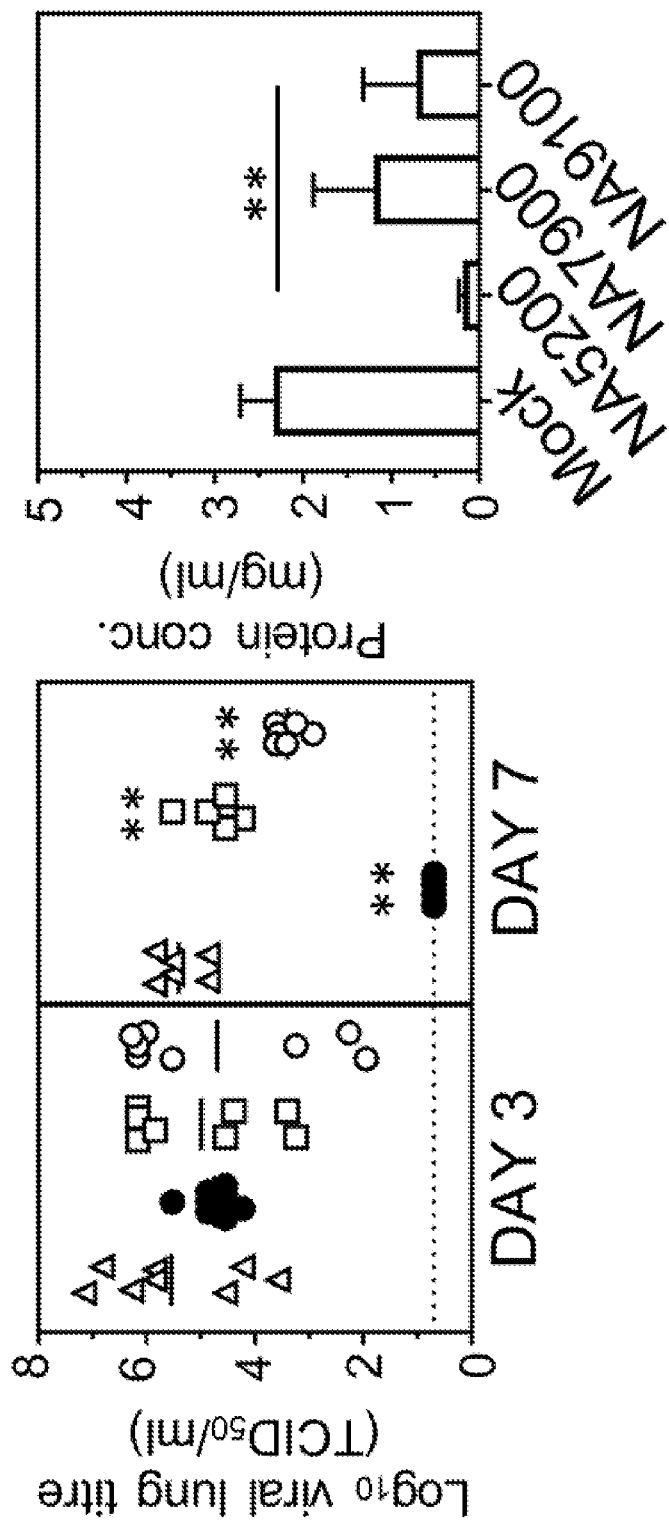
Figure 11A:
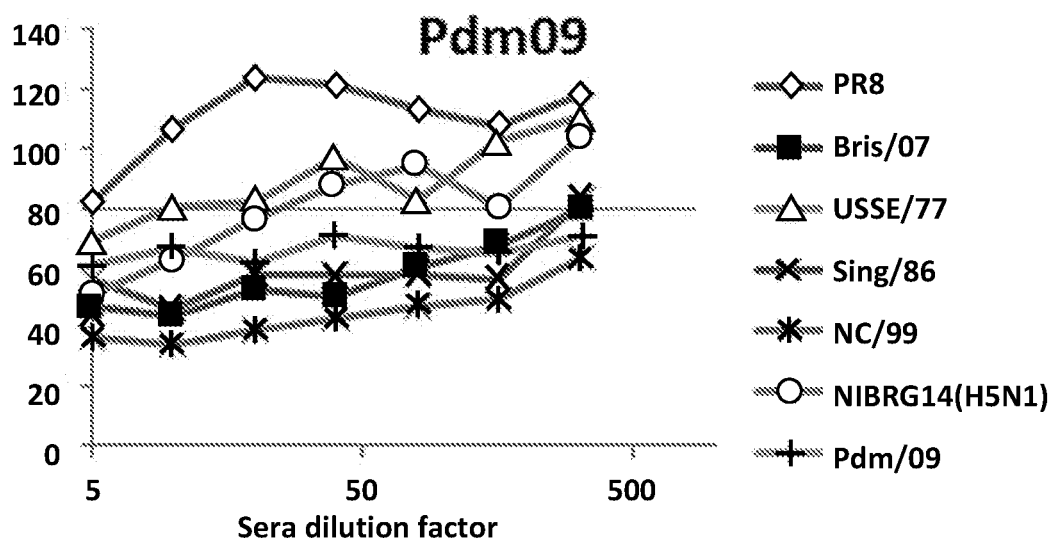
Figure 11B:
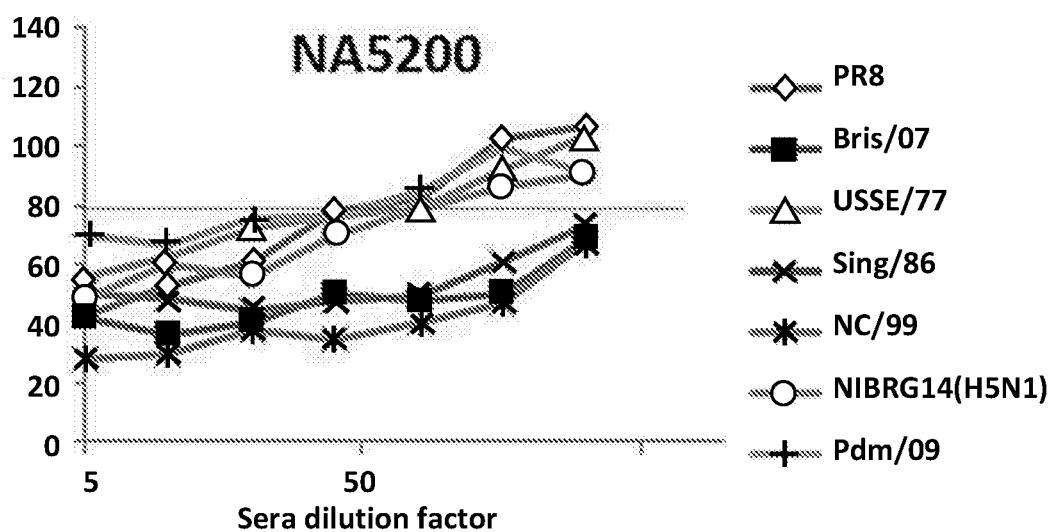
Figure 11C:
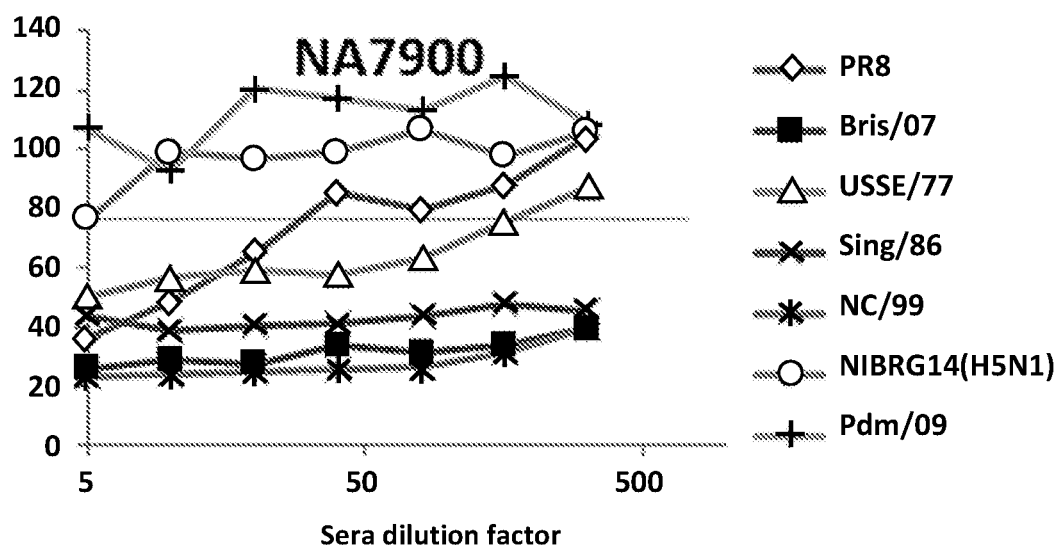
Figure 11D:
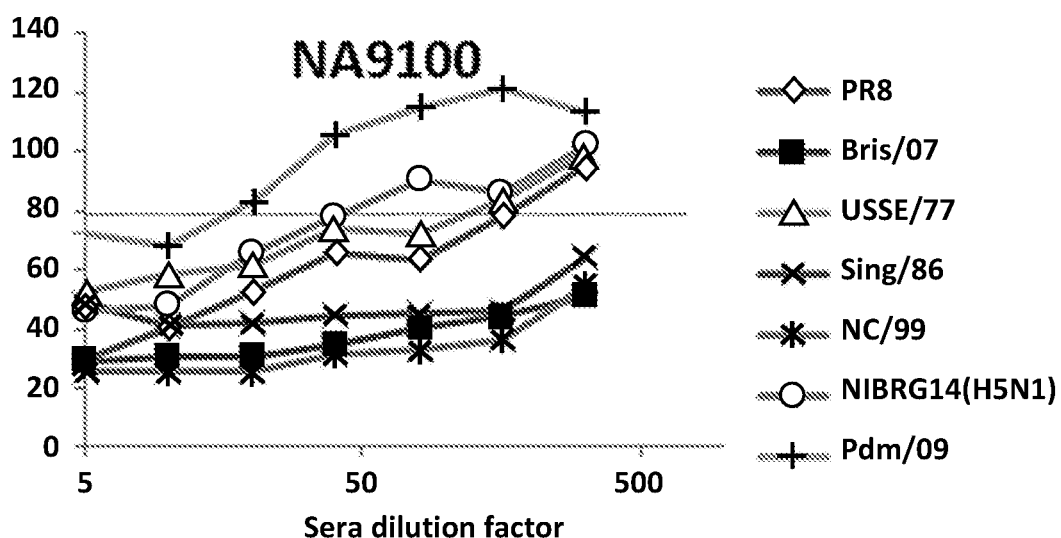

Compared to the data presented in FIGS. 9E and 9F, NA5200 did not protect NC/99 challenged mice to the same degree but NA9100 displayed no significant difference in the ability to protect mice compared to homologous vaccinated mice. In addition, Bel/09 rNA also did not protect mice from morbidity and mortality when infected with PR8/34 virus (data not shown). Taken together, these data show that NA9100 showed broader protection than the wild type NAs tested.

Figures 16D, 16E, 16F:
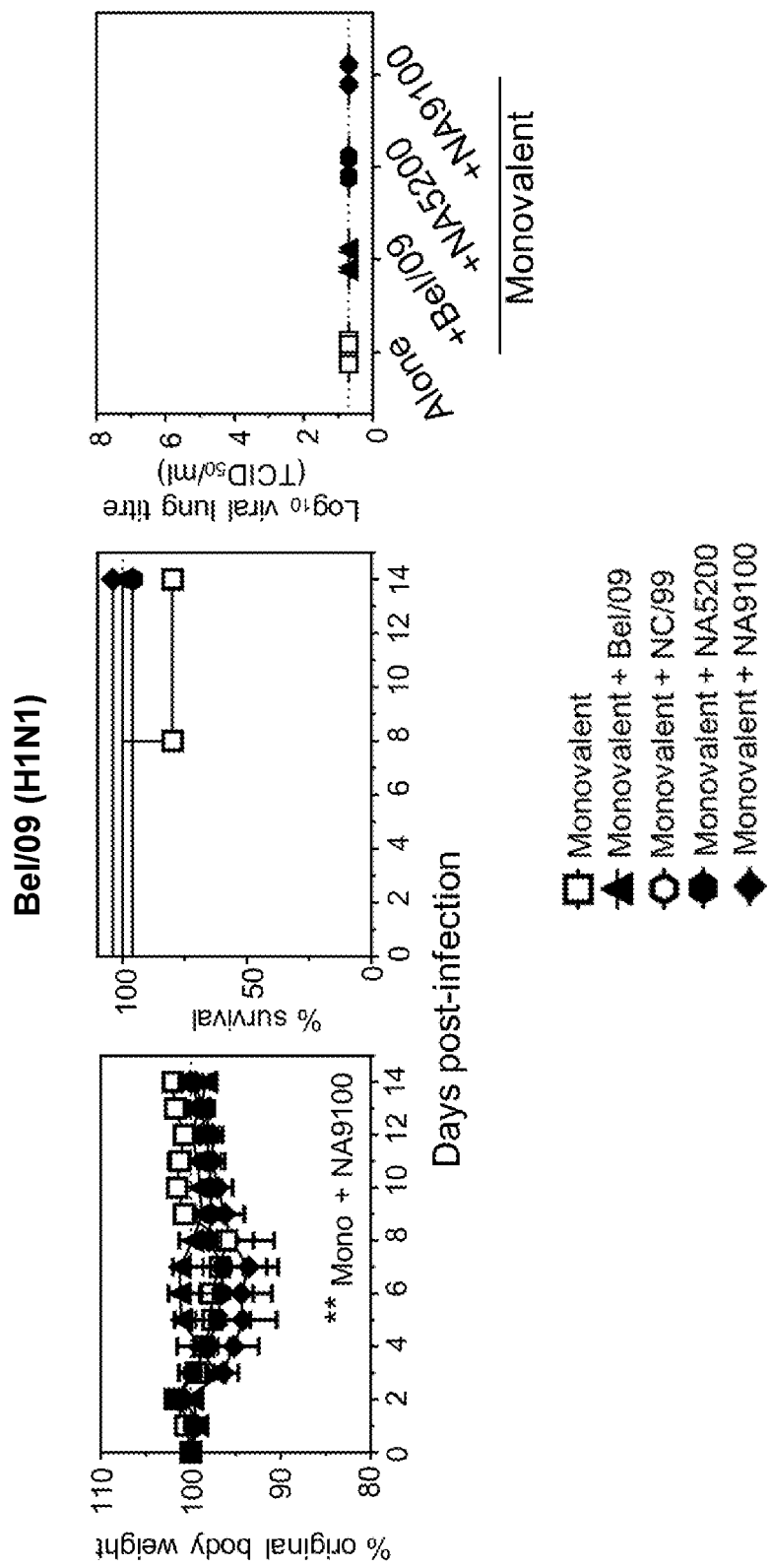
Figures 16G, 16H, 16I:
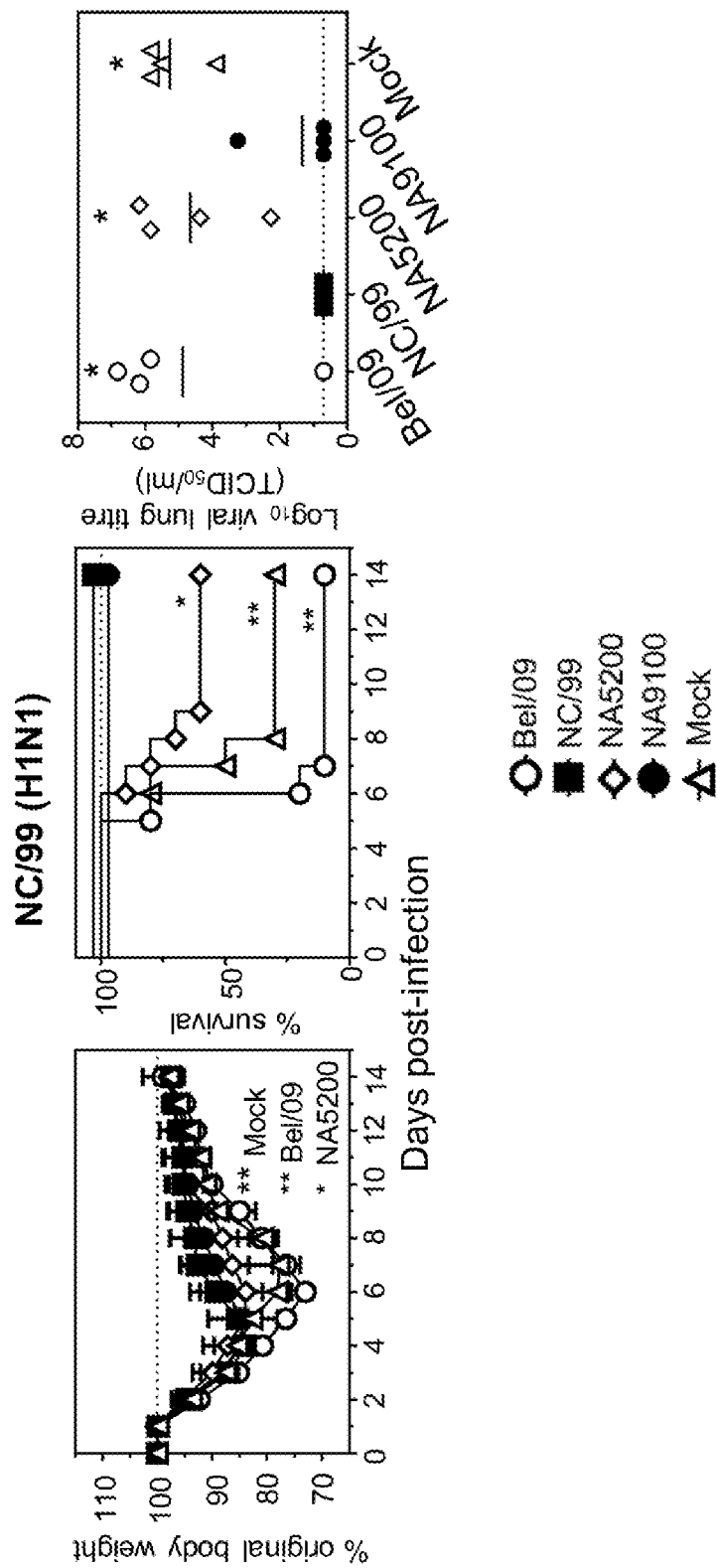

Mice vaccinated with monovalent H1N1 pdm09 vaccine (alone or in combination with recombinant tetrameric NA proteins) and challenged with Bel/09 showed little signs of weight loss and almost no mortality (FIGS. 16D and 16E). Further, there were no signs of virus in the lungs by day 7 post-infection (FIG. 16F). These results confirm that immunization with the monovalent vaccine, especially in combination with an adjuvant, is robust against homologous viruses.

Figures 16J, 16K, 16L:
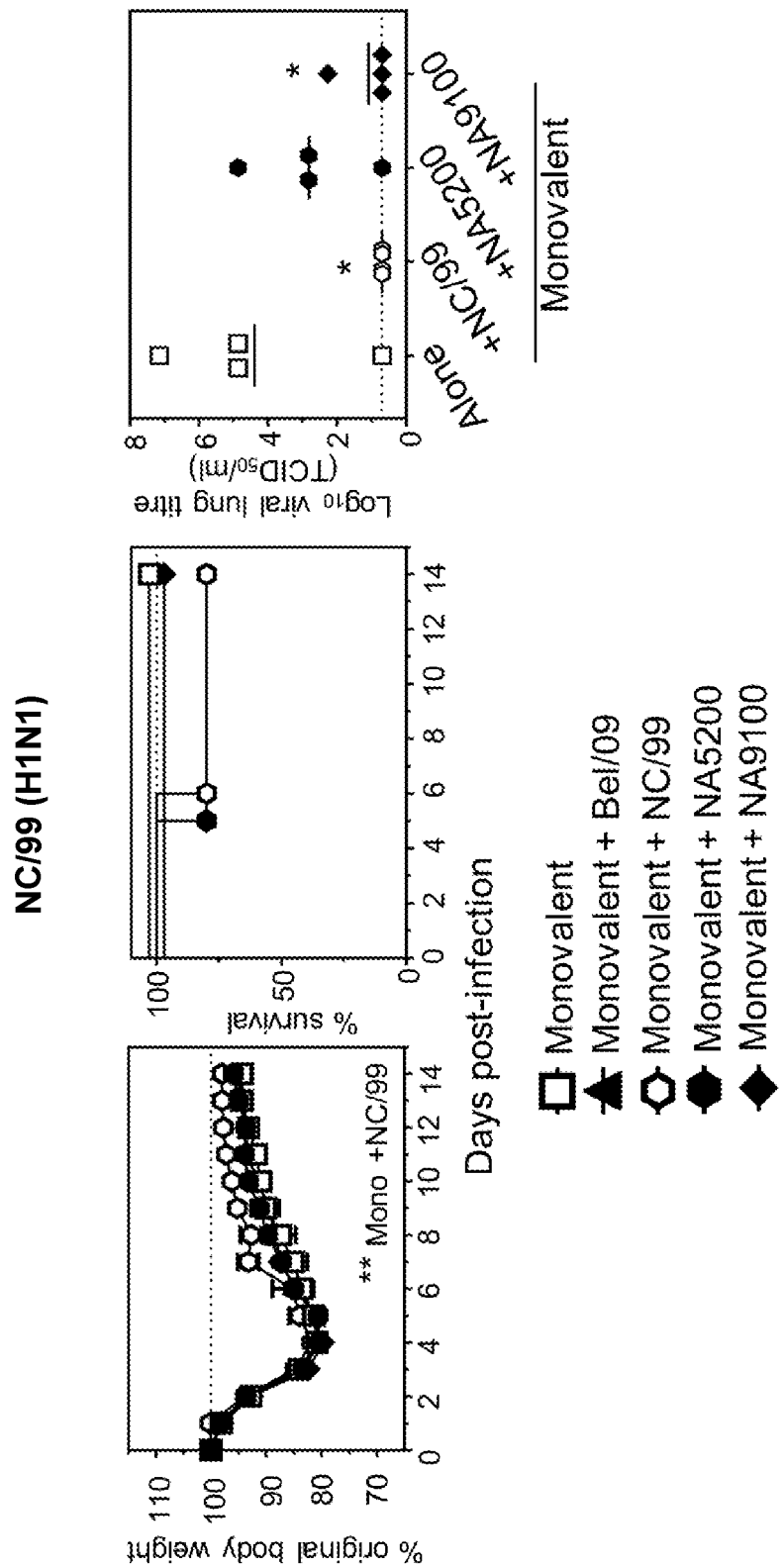

When mice were challenged with NC/99, there was also a degree of protection provided by the adjuvanted vaccine alone compared to mock-vaccinated mice (FIGS. 16G-16L). Both NA5200 and NA9100 showed no additive effect on weight loss and survival in comparison to monovalent only (FIGS. 16J and 16K). However, the addition of NC/99 or NA9100 NAs to the monovalent vaccine significantly reduced viral titres in the lungs compared to monovalent alone (FIG. 16L). As such, these data show the ability of NA to contribute to protection in combination with the traditional vaccine approach.

Example 8. Assessment of Efficacy Against HA Variants

For the 2017 Southern Hemisphere influenza season, the World Health Organization (WHO) recommended to replace the A(H1N1)pdm09-like virus in the seasonal influenza vaccine with a A/Michigan/45/2015-like strain. It was postulated that this influenza variant possessed a change within HA that resulted in increased infection rates in middle aged adults (B. Flannery et al 2018, JID).

Thus, experiments were performed to test if the tetrameric CBC NA proteins could mediate NA inhibition against this variant, as its sequence was not included in the original CBC NA design strategy.

Initially the HA antigenic difference was investigated using hemagglutination inhibition (HAI), between Bel/09 and the A/Michigan/45/2015-like virus A/Singapore/GP1908/2015 (Sing/15). A two-fold difference was observed in the ability of anti-sera raised in mice against the monovalent split A(H1N1)pdm09 vaccine to mediate HAI against Bel/09 and Sing/15 (1280 HAU vs 640 HAU). This result was in agreement with previous studies where ferret reference sera did not indicate evidence of significant antigenic drift.

Next, the ability of anti-sera raised against the tetrameric CBC NA proteins or tetrameric Bel/09 NA to mediate NA inhibition against Bel/09 and Sing/15 was tested (FIGS. 17A-17C). Whereas Bel/09 anti-sera had a significantly lower NAI titer against the drift variant Sing/15 as compared to Bel/09 ($p<0.05$, one-way ANOVA), anti-sera raised against tetrameric CBC NAs comprising NA5200 or NA9100 mediated NAI against both Sing/15 and Bel/09 equally well albeit at lower levels than wild type Bel/09 anti-sera (FIGS. 17A-17B). When considering amino acid identity, from amino acid 75 onwards, Sing/15 shared 91%, 87%, 89% and 97% identity to NA5200, NA7900, NA9100 and Bel/09, respectively (FIG. 17C). Thus, these data show that the CBC NAs displayed the same level of inhibition against a strain that was not included in the initial design of the proteins.

Accordingly, it is believed that the cluster-based consensus approach could provide NA polypeptides capable of generating anti-NA responses that bridge across to strains where HA antigenic drift is occurring. Thus, the present methods can be utilized to broaden immune responses and provide long-term (i.e., multi-seasonal) protection against various influenza strains, types, and subtypes.

We claim:

1. A method for producing a recombinant influenza neuraminidase (NA) polypeptide comprising consensus amino acids, wherein the method comprises:
   a. selecting more than one influenza NA polypeptide sequence and aligning the sequences;
   b. calculating pairwise similarity/dissimilarity matrices;
   c. identifying and creating clusters of similar sequences from the pairwise similarity/dissimilarity matrices;
   d. within each cluster, determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid;

e. generating a first sequence comprising consensus amino acids and variable amino acids for each cluster;

f. within the first sequence generated in step (e), determining a consensus amino acid for each variable amino acid position, by:
   i. generating a set of test sequences based on the first sequence, wherein test amino acids are placed at the variable amino acid positions;
   ii. performing molecular modeling for each of the test sequences; and
   iii. determining a consensus amino acid for each variable amino acid position by selecting amino acid(s) that result in a polypeptide having a negative total energy value and generating a candidate sequence comprising the selected consensus amino acid(s);

g. producing the recombinant influenza NA polypeptide comprising the candidate sequence, wherein the candidate sequence differs from the more than one influenza NA polypeptide sequences of step (a); and h. isolating the produced recombinant influenza NA polypeptide.

2. The method of claim 1, wherein aligning the sequences comprises using MAFFT, MUSCLE, CLUSTAL OMEGA, FASTA, a combination thereof, or any other multiple sequence alignment software packages.

3. The method of claim 1, wherein calculating the pairwise similarity/dissimilarity matrices comprises using BLOSUM, PAM, IDENTITY substitution matrices, or a combination thereof.

4. The method of claim 1, wherein identifying and creating clusters of similar sequences from the pairwise similarity/dissimilarity matrices comprise using K-means clustering, minimax clustering, principle component analysis (PCA), multidimensional scaling (MDS), or a combination thereof.

5. The method of claim 1, wherein molecular modeling comprises comparing to a crystal structure of an influenza NA polypeptide or protein.

6. The method of claim 1, wherein molecular modeling comprises use of Rosetta or any other molecular modeling software.

7. The method of claim 1, wherein the test amino acids comprise any natural or non-natural amino acid found in proteins.

8. The method of claim 1, further comprising after step (e) if a plurality of clusters is analyzed:
   i. aligning the sequences generated in step (e) for each cluster;
   ii. determining whether there is a consensus amino acid for each position in the sequence alignment using a pairwise alignment method, wherein if the frequency of the amino acid at a given position is 50% or greater, that amino acid is designated a consensus amino acid, and if the frequency of the amino acid at a given position is less than 50%, that amino acid is designated as a variable amino acid; and
   iii. generating a second sequence comprising consensus amino acids and variable amino acids,
   wherein the consensus amino acid for each variable amino acid position is determined in step (f) within said second sequence generated.

9. The method of claim 8, wherein in step (f) (i) the set of test sequences is generated based on the second sequence.

* * * * *

SEQUENCE LISTING

```
<160> NUMBER OF SEQ ID NOS: 35

<210> SEQ ID NO 1
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1
```

Met Asn Pro Asn Gln Lys Ile Ile Thr Ile Gly Ser Val Cys Met Thr
1               5                   10                  15

Ile Gly Met Ala Asn Leu Ile Leu Gln Ile Gly Asn Ile Ile Ser Ile
            20                  25                  30

Trp Ile Ser His Ser Ile Gln Leu Gly Asn Gln Asn Gln Ile Glu Thr
        35                  40                  45

Cys Asn Gln Ser Val Ile Thr Tyr Glu Asn Asn Thr Trp Val Asn Gln
    50                  55                  60

Thr Tyr Val Asn Ile Ser Asn Thr Asn Phe Ala Ala Gly Gln Ser Val
65                  70                  75                  80

Val Ser Ile Lys Leu Ala Gly Asn Ser Ser Leu Cys Pro Ile Ser Gly
            85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Thr Leu Met Ser
145                 150                 155                 160

Cys Pro Ile Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Asp Thr Ile Lys Ser Trp Arg Asn Lys Ile Leu
    210                 215                 220

Arg Thr Gln Glu Ser Glu Cys Ala Cys Val Asn Gly Ser Cys Phe Thr
225                 230                 235                 240

Val Met Thr Asp Gly Pro Ser Asp Gly Gln Ala Ser Tyr Lys Ile Phe
                245                 250                 255

Lys Ile Glu Lys Gly Lys Ile Val Lys Ser Val Glu Met Asp Ala Pro
            260                 265                 270

Asn Tyr His Tyr Glu Glu Cys Ser Cys Tyr Pro Asp Ser Gly Lys Val
        275                 280                 285

Met Cys Val Cys Arg Asp Asn Trp His Gly Ser Asn Arg Pro Trp Val
    290                 295                 300

Ser Phe Asp Gln Asn Leu Asp Tyr Gln Ile Gly Tyr Ile Cys Ser Gly
305                 310                 315                 320

Ile Phe Gly Asp Asn Pro Arg Ser Asn Asp Gly Thr Gly Ser Cys Gly
                325                 330                 335

Pro Val Ser Ser Asn Gly Ala Asn Gly Val Lys Gly Phe Ser Phe Arg
            340                 345                 350

Tyr Gly Asn Gly Val Trp Ile Gly Arg Thr Lys Ser Ile Ser Ser Arg
        355                 360                 365

Lys Gly Phe Glu Met Ile Trp Asp Pro Asn Gly Trp Thr Glu Thr Asp
    370                 375                 380

Asn Ser Phe Ser Ile Lys Gln Asp Ile Val Ala Ile Thr Glu Trp Ser
385                 390                 395                 400

Gly Tyr Ser Gly Ser Phe Val Gln His Pro Glu Leu Thr Gly Met Asn
                405                 410                 415

Cys Ile Arg Pro Cys Phe Trp Val Glu Leu Ile Arg Gly Gln Pro Lys
            420                 425                 430

Glu Asn Thr Ile Trp Thr Ser Gly Ser Ser Ile Ser Phe Cys Gly Val
        435                 440                 445

Asn Ser Asp Thr Val Gly Trp Ser Trp Pro Asp Gly Ala Asp Leu Pro
    450                 455                 460

Phe Thr Ile Asp Lys
465

<210> SEQ ID NO 2
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
        35                  40                  45

-continued

Cys Asn Gln Arg Ile Ile Thr Tyr Glu Asn Ser Thr Trp Val Asn Gln
         50                  55                  60

Thr Tyr Val Asn Ile Asn Asn Thr Asn Val Val Ala Gly Lys Asp Thr
 65                  70                  75                  80

Thr Ser Val Ile Leu Ala Gly Asn Ser Ser Leu Cys Pro Ile Arg Gly
                     85                  90                  95

Trp Ala Ile Tyr Ser Lys Asp Asn Ser Ile Arg Ile Gly Ser Lys Gly
                100                 105                 110

Asp Val Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Lys His
        130                 135                 140

Ser Asn Gly Thr Val Lys Asp Arg Ser Pro Tyr Arg Ala Leu Met Ser
145                 150                 155                 160

Cys Pro Val Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Glu Thr Ile Lys Ser Trp Arg Lys Asn Ile Leu
210                 215                 220

Arg Thr Gln Glu Ser Glu Cys Val Cys Val Asn Gly Ser Cys Phe Thr
225                 230                 235                 240

Ile Met Thr Asp Gly Pro Ser Asp Gly Leu Ala Ser Tyr Lys Ile Phe
                245                 250                 255

Lys Ile Glu Lys Gly Lys Val Thr Lys Ser Ile Glu Leu Asp Ala Pro
            260                 265                 270

Asn Ser His Tyr Glu Glu Cys Ser Cys Tyr Pro Asp Thr Gly Lys Val
        275                 280                 285

Met Cys Val Cys Arg Asp Asn Trp His Gly Ser Asn Arg Pro Trp Val
290                 295                 300

Ser Phe Asn Gln Asn Leu Asp Tyr Gln Ile Gly Tyr Ile Cys Ser Gly
305                 310                 315                 320

Val Phe Gly Asp Asn Pro Arg Pro Lys Asp Gly Thr Gly Ser Cys Gly
                325                 330                 335

Pro Val Thr Val Asp Gly Ala Asn Gly Val Lys Gly Phe Ser Tyr Arg
            340                 345                 350

Tyr Gly Asn Gly Val Trp Ile Gly Arg Thr Lys Ser Asn Ser Ser Arg
        355                 360                 365

Lys Gly Phe Glu Met Ile Trp Asp Pro Asn Gly Trp Thr Glu Thr Asp
370                 375                 380

Ser Ser Phe Leu Val Lys Gln Asp Val Val Ala Ile Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Leu Pro Arg
            420                 425                 430

Glu Asp Thr Ile Trp Thr Ser Gly Ser Ile Ser Phe Cys Gly Val
        435                 440                 445

Asn Ser Asp Thr Val Asn Trp Ser Trp Pro Asp Gly Ala Glu Leu Pro
450                 455                 460

Phe Thr Ile Asp Lys
465

<210> SEQ ID NO 3
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
        35                  40                  45

Cys Asn Gln Arg Ile Ile Thr Tyr Glu Asn Ser Thr Trp Val Asn Gln
    50                  55                  60

Thr Tyr Val Asn Ile Asn Asn Thr Asn Val Val Ala Gly Lys Asp Thr
65                  70                  75                  80

Thr Ser Val Ile Leu Ala Gly Asn Ser Ser Leu Cys Pro Ile Arg Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Thr Leu Met Ser
145                 150                 155                 160

Cys Pro Val Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Asp Thr Ile Lys Ser Trp Arg Asn Asn Ile Leu
    210                 215                 220

Arg Thr Gln Glu Ser Glu Cys Val Cys Ile Asn Gly Ser Cys Phe Thr
225                 230                 235                 240

Ile Met Thr Asp Gly Pro Ser Asp Gly Gln Ala Ser Tyr Lys Ile Phe
                245                 250                 255

Lys Ile Glu Lys Gly Lys Val Thr Lys Ser Ile Glu Leu Asp Ala Pro
            260                 265                 270

Asn Ser His Tyr Glu Glu Cys Ser Cys Tyr Pro Asp Thr Gly Lys Val
        275                 280                 285

Val Cys Val Cys Arg Asp Asn Trp His Gly Ser Asn Arg Pro Trp Val
    290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Pro Asn Asp Gly Thr Gly Ser Cys Gly
                325                 330                 335

Pro Val Thr Ser Asn Gly Ala Asn Gly Val Lys Gly Phe Ser Phe Arg
            340                 345                 350

```
Tyr Gly Asn Gly Val Trp Ile Gly Arg Thr Lys Ser Asn Ser Ser Arg
        355                 360                 365

Lys Gly Phe Glu Met Ile Trp Asp Pro Asn Gly Trp Thr Glu Thr Asp
    370                 375                 380

Ser Ser Phe Ser Val Lys Gln Asp Ile Val Ala Ile Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Leu Pro Lys
            420                 425                 430

Glu Asn Thr Ile Trp Thr Ser Gly Ser Ser Ile Ser Phe Cys Gly Val
        435                 440                 445

Asn Ser Asp Thr Val Gly Trp Ser Trp Pro Asp Gly Ala Glu Leu Pro
    450                 455                 460

Phe Thr Ile Asp Lys
465

<210> SEQ ID NO 4
<211> LENGTH: 50
<212> TYPE: PRT
<213> ORGANISM: Unknown
<220> FEATURE:
<223> OTHER INFORMATION: Description of Unknown: Tetrabrachion
      polypeptide

<400> SEQUENCE: 4

Ile Ile Asn Glu Thr Ala Asp Asp Ile Val Tyr Arg Leu Thr Val Ile
1               5                   10                  15

Ile Asp Asp Arg Tyr Glu Ser Leu Lys Asn Leu Ile Thr Leu Arg Ala
            20                  25                  30

Asp Arg Leu Glu Met Ile Ile Asn Asp Asn Val Ser Thr Ile Leu Ala
        35                  40                  45

Ser Ile
    50

<210> SEQ ID NO 5
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Met Pro Met Gly Ser Leu Gln Pro Leu Ala Thr Leu Tyr Leu Leu Gly
1               5                   10                  15

Met Leu Val Ala Ser Val Leu
            20

<210> SEQ ID NO 6
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Trp Ser His Pro Gln Phe Glu Lys
1               5
```

<210> SEQ ID NO 7
<211> LENGTH: 469
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 7

```
Met Asn Pro Asn Gln Lys Ile Ile Thr Ile Gly Ser Val Cys Met Thr
1               5                   10                  15

Ile Gly Met Ala Asn Leu Ile Leu Gln Ile Gly Asn Ile Ile Ser Ile
            20                  25                  30

Trp Ile Ser His Ser Ile Gln Leu Gly Asn Gln Asn Gln Ile Glu Thr
        35                  40                  45

Cys Asn Gln Ser Val Ile Thr Tyr Glu Asn Asn Thr Trp Val Asn Gln
50                  55                  60

Thr Tyr Val Asn Ile Ser Asn Thr Asn Phe Ala Ala Gly Gln Ser Val
65                  70                  75                  80

Val Ser Val Lys Leu Ala Gly Asn Ser Ser Leu Cys Pro Val Ser Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser Pro Leu Glu
        115                 120                 125

Cys Arg Thr Phe Phe Leu Thr Gln Gly Ala Leu Leu Asn Asp Lys His
130                 135                 140

Ser Asn Gly Thr Ile Lys Asp Arg Ser Pro Tyr Arg Thr Leu Met Ser
145                 150                 155                 160

Cys Pro Ile Gly Glu Val Pro Ser Pro Tyr Asn Ser Arg Phe Glu Ser
                165                 170                 175

Val Ala Trp Ser Ala Ser Ala Cys His Asp Gly Ile Asn Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Asp Thr Ile Lys Ser Trp Arg Asn Asn Ile Leu
210                 215                 220

Arg Thr Gln Glu Ser Glu Cys Ala Cys Val Asn Gly Ser Cys Phe Thr
225                 230                 235                 240

Val Met Thr Asp Gly Pro Ser Asp Gly Gln Ala Ser Tyr Lys Ile Phe
                245                 250                 255

Arg Ile Glu Lys Gly Lys Ile Val Lys Ser Val Glu Met Asn Ala Pro
            260                 265                 270

Asn Tyr His Tyr Glu Glu Cys Ser Cys Tyr Pro Asp Ser Ser Glu Ile
        275                 280                 285

Thr Cys Val Cys Arg Asp Asn Trp His Gly Ser Asn Arg Pro Trp Val
290                 295                 300

Ser Phe Asn Gln Asn Leu Glu Tyr Gln Ile Gly Tyr Ile Cys Ser Gly
305                 310                 315                 320

Ile Phe Gly Asp Asn Pro Arg Pro Asn Asp Lys Thr Gly Ser Cys Gly
                325                 330                 335

Pro Val Ser Ser Asn Gly Ala Asn Gly Val Lys Gly Phe Ser Phe Lys
            340                 345                 350

Tyr Gly Asn Gly Val Trp Ile Gly Arg Thr Lys Ser Ile Ser Ser Arg
        355                 360                 365
```

```
Asn Gly Phe Glu Met Ile Trp Asp Pro Asn Gly Trp Thr Gly Thr Asp
            370                 375                 380

Asn Asn Phe Ser Ile Lys Gln Asp Ile Val Gly Ile Asn Glu Trp Ser
385                 390                 395                 400

Gly Tyr Ser Gly Ser Phe Val Gln His Pro Glu Leu Thr Gly Leu Asp
                405                 410                 415

Cys Ile Arg Pro Cys Phe Trp Val Glu Leu Ile Arg Gly Arg Pro Lys
            420                 425                 430

Glu Asn Thr Ile Trp Thr Ser Gly Ser Ser Ile Ser Phe Cys Gly Val
            435                 440                 445

Asn Ser Asp Thr Val Gly Trp Ser Trp Pro Asp Gly Ala Glu Leu Pro
450                 455                 460

Phe Thr Ile Asp Lys
465

<210> SEQ ID NO 8
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 8

Met Asn Thr Asn Gln Arg Ile Ile Thr Ile Gly Thr Val Cys Leu Ile
1               5                   10                  15

Val Gly Ile Ile Ser Leu Leu Leu Gln Ile Gly Asn Ile Val Ser Leu
            20                  25                  30

Trp Ile Ser His Ser Ile Gln Thr Gly Glu Lys Asn His Pro Glu Ile
            35                  40                  45

Cys Asn Gln Ser Val Ile Thr Tyr Glu Asn Asn Thr Trp Val Asn Gln
            50                  55                  60

Thr Tyr Val Asn Ile Ser Asn Thr Asn Ile Ala Ala Gly Gln Gly Val
65                  70                  75                  80

Thr Ser Ile Ile Leu Ala Gly Asn Ser Ser Leu Cys Pro Ile Ser Gly
            85                  90                  95

Trp Ala Ile Tyr Ser Lys Asp Asn Ser Ile Arg Ile Gly Ser Lys Gly
            100                 105                 110

Asp Ile Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Arg His
            130                 135                 140

Ser Asn Gly Thr Val Lys Asp Arg Ser Pro Tyr Arg Thr Leu Met Ser
145                 150                 155                 160

Cys Pro Ile Gly Glu Ala Pro Ser Pro Tyr Asn Ser Arg Phe Glu Ser
            165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
            195                 200                 205

Asn Gly Ile Ile Thr Asp Thr Ile Lys Ser Trp Arg Asn Lys Ile Leu
            210                 215                 220

Arg Thr Gln Glu Ser Glu Cys Val Cys Ile Asn Gly Ser Cys Phe Thr
225                 230                 235                 240

Ile Met Thr Asp Gly Pro Ser Asn Gly Gln Ala Ser Tyr Lys Ile Phe
```

```
                    245                 250                 255
Lys Met Glu Lys Gly Lys Ile Ile Lys Ser Ile Glu Leu Asp Ala Pro
                260                 265                 270

Asn Tyr His Tyr Glu Glu Cys Ser Cys Tyr Pro Asp Thr Gly Lys Val
            275                 280                 285

Val Cys Val Cys Arg Asp Asn Trp His Ala Ser Asn Arg Pro Trp Val
        290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Ser Asn Asp Gly Lys Gly Asn Cys Gly
                325                 330                 335

Pro Val Leu Ser Asn Gly Ala Asn Gly Val Lys Gly Phe Ser Phe Arg
            340                 345                 350

Tyr Gly Asn Gly Val Trp Ile Gly Arg Thr Lys Ser Ile Ser Ser Arg
        355                 360                 365

Ser Gly Phe Glu Met Ile Trp Asp Pro Asn Gly Trp Thr Glu Thr Asp
370                 375                 380

Ser Ser Phe Ser Met Lys Gln Asp Ile Ile Ala Leu Thr Asp Trp Ser
385                 390                 395                 400

Gly Tyr Ser Gly Ser Phe Val Gln His Pro Glu Leu Thr Gly Met Asn
                405                 410                 415

Cys Ile Arg Pro Cys Phe Trp Val Glu Leu Ile Arg Gly Gln Pro Lys
            420                 425                 430

Glu Ser Thr Ile Trp Thr Ser Gly Ser Ser Ile Ser Phe Cys Gly Val
        435                 440                 445

Asp Ser Glu Thr Ala Ser Trp Ser Trp Pro Asp Gly Ala Asp Leu Pro
    450                 455                 460

Phe Thr Ile Asp Lys
465

<210> SEQ ID NO 9
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Met Asn Pro Asn Gln Lys Ile Ile Thr Ile Gly Ser Ile Ser Ile Ala
1               5                   10                  15

Ile Gly Ile Ile Ser Leu Met Leu Gln Ile Gly Asn Ile Ile Ser Ile
            20                  25                  30

Trp Ala Ser His Ser Ile Gln Thr Gly Ser Gln Asn His Thr Gly Ile
        35                  40                  45

Cys Asn Gln Arg Ile Ile Thr Tyr Glu Asn Ser Thr Trp Val Asn His
    50                  55                  60

Thr Tyr Val Asn Ile Asn Asn Thr Asn Val Val Ala Gly Lys Asp Lys
65                  70                  75                  80

Thr Ser Val Thr Leu Ala Gly Asn Ser Ser Leu Cys Ser Ile Ser Gly
                85                  90                  95

Trp Ala Ile Tyr Thr Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125
```

```
Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Ala Leu Met Ser
145                 150                 155                 160

Cys Pro Leu Gly Glu Ala Pro Ser Pro Tyr Asn Ser Lys Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Gly Thr Ile Lys Ser Trp Lys Lys Gln Ile Leu
    210                 215                 220

Arg Thr Gln Glu Ser Glu Cys Val Cys Met Asn Gly Ser Cys Phe Thr
225                 230                 235                 240

Ile Met Thr Asp Gly Pro Ser Asn Gly Ala Ala Ser Tyr Lys Ile Phe
                245                 250                 255

Lys Ile Glu Lys Gly Lys Val Thr Lys Ser Ile Glu Leu Asn Ala Pro
                260                 265                 270

Asn Phe His Tyr Glu Glu Cys Ser Cys Tyr Pro Asp Thr Gly Lys Val
            275                 280                 285

Met Cys Val Cys Arg Asp Asn Trp His Gly Ser Asn Arg Pro Trp Val
    290                 295                 300

Ser Phe Asn Gln Asn Leu Asp Tyr Gln Ile Gly Tyr Ile Cys Ser Gly
305                 310                 315                 320

Val Phe Gly Asp Asn Pro Arg Pro Glu Asp Gly Glu Gly Ser Cys Asn
                325                 330                 335

Pro Val Thr Val Asp Gly Ala Asn Gly Val Lys Gly Phe Ser Tyr Lys
                340                 345                 350

Tyr Gly Asn Gly Val Trp Ile Gly Arg Thr Lys Ser Asn Arg Leu Arg
            355                 360                 365

Lys Gly Phe Glu Met Ile Trp Asp Pro Asn Gly Trp Thr Asn Thr Asp
        370                 375                 380

Ser Asp Phe Ser Val Lys Gln Asp Val Val Ala Ile Thr Asp Trp Ser
385                 390                 395                 400

Gly Tyr Ser Gly Ser Phe Val Gln His Pro Glu Leu Thr Gly Leu Asp
                405                 410                 415

Cys Ile Arg Pro Cys Phe Trp Val Glu Leu Val Arg Gly Leu Pro Arg
                420                 425                 430

Glu Asn Thr Ile Trp Thr Ser Gly Ser Ser Ile Ser Phe Cys Gly Val
            435                 440                 445

Asn Ser Asp Thr Ala Asn Trp Ser Trp Pro Asp Gly Ala Glu Leu Pro
    450                 455                 460

Phe Thr Ile Asp Lys
465

<210> SEQ ID NO 10
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Asn Pro Asn Gln Lys Ile Ile Thr Ile Gly Ser Ile Cys Met Ala
1               5                   10                  15
```

```
Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
            35                  40                  45

Cys Asn Gln Arg Ile Ile Thr Tyr Glu Asn Ser Thr Trp Val Asn Gln
50                  55                  60

Thr Tyr Val Asn Ile Asn Asn Thr Asn Val Val Ala Gly Lys Asp Thr
65                  70                  75                  80

Thr Ser Met Thr Leu Ala Gly Asn Ser Ser Leu Cys Pro Ile Arg Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Lys His
130                 135                 140

Ser Asn Gly Thr Val Lys Asp Arg Ser Pro Tyr Arg Ala Leu Met Ser
145                 150                 155                 160

Cys Pro Ile Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asp Gly Ala Val Ala Val Leu Lys Tyr
            195                 200                 205

Asn Gly Ile Ile Thr Glu Thr Ile Lys Ser Trp Arg Lys Arg Ile Leu
            210                 215                 220

Arg Thr Gln Glu Ser Glu Cys Val Cys Val Asn Gly Ser Cys Phe Thr
225                 230                 235                 240

Ile Met Thr Asp Gly Pro Ser Asp Gly Pro Ala Ser Tyr Arg Ile Phe
                245                 250                 255

Lys Ile Glu Lys Gly Lys Ile Thr Lys Ser Ile Glu Leu Asp Ala Pro
            260                 265                 270

Asn Ser His Tyr Glu Glu Cys Ser Cys Tyr Pro Asp Thr Gly Thr Val
            275                 280                 285

Met Cys Val Cys Arg Asp Asn Trp His Gly Ser Asn Arg Pro Trp Val
290                 295                 300

Ser Phe Asn Gln Asn Leu Asp Tyr Gln Ile Gly Tyr Ile Cys Ser Gly
305                 310                 315                 320

Val Phe Gly Asp Asn Pro Arg Pro Lys Asp Gly Lys Gly Ser Cys Asp
                325                 330                 335

Pro Val Thr Val Asp Gly Ala Asp Gly Val Lys Gly Phe Ser Tyr Arg
            340                 345                 350

Tyr Gly Asn Gly Val Trp Ile Gly Arg Thr Lys Ser Asn Ser Ser Arg
            355                 360                 365

Lys Gly Phe Glu Met Ile Trp Asp Pro Asn Gly Trp Thr Asp Thr Asp
            370                 375                 380

Ser Asn Phe Leu Val Lys Gln Asp Val Val Ala Met Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Arg Pro Arg
            420                 425                 430
```

```
Glu Lys Thr Ile Trp Thr Ser Gly Ser Ser Ile Ser Phe Cys Gly Val
            435                 440                 445

Asn Ser Asp Thr Val Asn Trp Ser Trp Pro Asp Gly Ala Glu Leu Pro
450                 455                 460

Phe Thr Ile Asp Lys
465

<210> SEQ ID NO 11
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Met Asn Pro Asn Gln Lys Ile Ile Thr Ile Gly Ser Ile Cys Met Val
1               5                   10                  15

Val Gly Ile Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
        35                  40                  45

Cys Asn Gln Ser Ile Ile Thr Tyr Lys Asn Ser Thr Trp Val Asn Gln
    50                  55                  60

Thr Tyr Val Asn Ile Ser Asn Thr Asn Val Val Ala Gly Lys Asp Thr
65                  70                  75                  80

Thr Ser Val Ile Leu Thr Gly Asn Ser Ser Leu Cys Pro Ile Arg Gly
                85                  90                  95

Trp Ala Ile Tyr Ser Lys Asp Asn Gly Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Ala Leu Met Ser
145                 150                 155                 160

Cys Pro Val Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asp Gly Ala Val Ala Val Leu Lys Tyr
        195                 200                 205

Asn Gly Ile Ile Thr Glu Thr Ile Lys Ser Trp Arg Lys Asn Ile Leu
    210                 215                 220

Arg Thr Gln Glu Ser Glu Cys Ala Cys Val Asn Gly Ser Cys Phe Thr
225                 230                 235                 240

Ile Met Thr Asp Gly Pro Ser Asp Gly Leu Ala Ser Tyr Lys Ile Phe
                245                 250                 255

Lys Ile Glu Lys Gly Lys Val Thr Lys Ser Ile Glu Leu Asp Ala Pro
            260                 265                 270

Asn Ser His Tyr Glu Glu Cys Ser Cys Tyr Pro Asp Thr Gly Lys Val
        275                 280                 285

Met Cys Val Cys Arg Asp Asn Trp His Gly Ser Asn Arg Pro Trp Val
    290                 295                 300

Ser Phe Asp Gln Asn Leu Asp Tyr Gln Ile Gly Tyr Ile Cys Ser Gly
305                 310                 315                 320
```

-continued

Val Phe Gly Asp Asn Pro Arg Pro Lys Asp Gly Thr Gly Ser Cys Gly
            325                 330                 335

Pro Val Tyr Val Asp Gly Ala Asn Gly Val Lys Gly Phe Ser Tyr Arg
            340                 345                 350

Tyr Gly Asn Gly Val Trp Ile Gly Arg Thr Lys Ser Gln Ser Ser Arg
            355                 360                 365

Lys Gly Phe Glu Met Ile Trp Asp Pro Asn Gly Trp Thr Glu Thr Asp
            370                 375                 380

Ser Ser Phe Ser Val Lys Gln Asp Val Val Ala Met Thr Asp Trp Ser
385                 390                 395                 400

Gly Tyr Ser Gly Ser Phe Val Gln His Pro Glu Leu Thr Gly Leu Asp
            405                 410                 415

Cys Met Arg Pro Cys Phe Trp Val Glu Leu Ile Arg Gly Arg Pro Lys
            420                 425                 430

Glu Asp Thr Ile Trp Thr Ser Gly Ser Ser Ile Ser Phe Cys Gly Val
            435                 440                 445

Asn Ser Asp Thr Val Asp Trp Ser Trp Pro Asp Gly Ala Glu Leu Pro
            450                 455                 460

Phe Thr Ile Asp Lys
465

<210> SEQ ID NO 12
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Met Asn Pro Asn Gln Lys Ile Ile Thr Ile Gly Ser Ile Cys Met Val
1               5                   10                  15

Val Gly Ile Ile Ser Leu Ile Leu Gln Ile Gly Asn Ile Ile Ser Ile
            20                  25                  30

Trp Ile Ser His Ser Ile Gln Thr Gly Ser Gln Asn His Thr Gly Ile
            35                  40                  45

Cys Asn Gln Ser Ile Ile Thr Tyr Lys Asn Ser Thr Trp Val Asn Gln
            50                  55                  60

Thr Tyr Val Asn Ile Ser Asn Thr Asn Val Val Ala Gly Lys Asp Thr
65                  70                  75                  80

Thr Ser Val Ile Leu Thr Gly Asn Ser Ser Leu Cys Pro Ile Arg Gly
            85                  90                  95

Trp Ala Ile Tyr Ser Lys Asp Asn Gly Ile Arg Ile Gly Ser Lys Gly
            100                 105                 110

Asp Val Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Lys His
            130                 135                 140

Ser Asn Gly Thr Val Lys Asp Arg Ser Pro Tyr Arg Ala Leu Met Ser
145                 150                 155                 160

Cys Pro Val Gly Glu Ala Pro Ser Pro Tyr Asn Ser Arg Phe Glu Ser
            165                 170                 175

Val Ala Trp Ser Ala Ser Ala Cys His Asp Gly Met Gly Trp Leu Thr
            180                 185                 190

Ile Gly Ile Ser Gly Pro Asp Asp Gly Ala Val Ala Val Leu Lys Tyr

```
                195                 200                 205
Asn Gly Ile Ile Thr Glu Thr Ile Lys Ser Trp Arg Lys Lys Ile Leu
    210                 215                 220

Arg Thr Gln Glu Ser Glu Cys Ala Cys Val Asn Gly Ser Cys Phe Thr
225                 230                 235                 240

Ile Met Thr Asp Gly Pro Ser Asp Gly Leu Ala Ser Tyr Lys Ile Phe
                245                 250                 255

Lys Ile Glu Lys Gly Lys Val Thr Lys Ser Ile Glu Leu Asp Ala Pro
            260                 265                 270

Asn Ser His Tyr Glu Glu Cys Ser Cys Tyr Pro Asp Thr Gly Lys Val
        275                 280                 285

Met Cys Val Cys Arg Asp Asn Trp His Gly Ser Asn Arg Pro Trp Val
    290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Pro Lys Asp Gly Thr Gly Ser Cys Gly
                325                 330                 335

Pro Val Tyr Val Asp Gly Ala Asn Gly Val Lys Gly Phe Ser Tyr Arg
            340                 345                 350

Tyr Gly Asn Gly Val Trp Ile Gly Arg Thr Lys Ser Asp Ser Ser Arg
        355                 360                 365

Lys Gly Phe Glu Met Ile Trp Asp Pro Asn Gly Trp Thr Glu Thr Asp
    370                 375                 380

Ser Ser Phe Leu Val Lys Gln Asp Val Val Ala Met Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Arg Pro Lys
            420                 425                 430

Glu Asp Thr Ile Trp Thr Ser Gly Ser Ser Ile Ser Phe Cys Gly Val
        435                 440                 445

Asn Ser Asp Thr Val Asp Trp Ser Trp Pro Asp Gly Ala Glu Leu Pro
    450                 455                 460

Phe Thr Ile Asp Lys
465

<210> SEQ ID NO 13
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Met Asn Pro Asn Gln Lys Ile Ile Thr Ile Gly Ser Val Cys Met Thr
1               5                   10                  15

Ile Gly Met Ala Asn Leu Ile Leu Gln Ile Gly Asn Ile Ile Ser Ile
            20                  25                  30

Trp Ile Ser His Ser Ile Gln Leu Gly Asn Gln Asn Gln Ile Glu Thr
        35                  40                  45

Cys Asn Gln Ser Val Ile Thr Tyr Glu Asn Asn Thr Trp Val Asn Gln
    50                  55                  60

Thr Tyr Val Asn Ile Ser Asn Thr Asn Phe Ala Ala Gly Gln Ser Val
65                  70                  75                  80
```

-continued

```
Val Ser Val Ile Leu Ala Gly Asn Ser Ser Leu Cys Pro Ile Ser Gly
             85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Lys His
            130                 135                 140

Ser Asn Gly Thr Val Lys Asp Arg Ser Pro Tyr Arg Thr Leu Met Ser
145                 150                 155                 160

Cys Pro Ile Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
            195                 200                 205

Asn Gly Ile Ile Thr Asp Thr Ile Lys Ser Trp Arg Asn Asn Ile Leu
210                 215                 220

Arg Thr Gln Glu Ser Glu Cys Ala Cys Val Asn Gly Ser Cys Phe Thr
225                 230                 235                 240

Val Met Thr Asp Gly Pro Ser Asp Gly Gln Ala Ser Tyr Lys Ile Phe
                245                 250                 255

Lys Ile Glu Lys Gly Lys Ile Val Lys Ser Val Glu Met Asp Ala Pro
            260                 265                 270

Asn Tyr His Tyr Glu Glu Cys Ser Cys Tyr Pro Asp Ser Gly Lys Val
            275                 280                 285

Val Cys Val Cys Arg Asp Asn Trp His Gly Ser Asn Arg Pro Trp Val
290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Ser Asn Asp Gly Thr Gly Ser Cys Gly
                325                 330                 335

Pro Val Ser Ser Asn Gly Ala Asn Gly Val Lys Gly Phe Ser Phe Arg
            340                 345                 350

Tyr Gly Asn Gly Val Trp Ile Gly Arg Thr Lys Ser Ile Ser Ser Arg
            355                 360                 365

Lys Gly Phe Glu Met Ile Trp Asp Pro Asn Gly Trp Thr Glu Thr Asp
            370                 375                 380

Asn Ser Phe Ser Ile Lys Gln Asp Ile Val Ala Ile Asn Glu Trp Ser
385                 390                 395                 400

Gly Tyr Ser Gly Ser Phe Val Gln His Pro Glu Leu Thr Gly Met Asn
                405                 410                 415

Cys Ile Arg Pro Cys Phe Trp Val Glu Leu Ile Arg Gly Arg Pro Lys
            420                 425                 430

Glu Asn Thr Ile Trp Thr Ser Gly Ser Ser Ile Ser Phe Cys Gly Val
            435                 440                 445

Asn Ser Asp Thr Val Gly Trp Ser Trp Pro Asp Gly Ala Asp Leu Pro
450                 455                 460

Phe Thr Ile Asp Lys
465
```

<210> SEQ ID NO 14
<211> LENGTH: 469
<212> TYPE: PRT

<213> ORGANISM: Artificial Sequence
<220> FEATURE:
<223> OTHER INFORMATION: Description of Artificial Sequence: Synthetic polypeptide

<400> SEQUENCE: 14

```
Met Asn Pro Asn Gln Lys Ile Ile Thr Ile Gly Ser Val Cys Met Thr
1               5                   10                  15

Ile Gly Met Ala Asn Leu Ile Leu Gln Ile Gly Asn Ile Ile Ser Ile
            20                  25                  30

Trp Ile Ser His Ser Ile Gln Leu Gly Asn Gln Asn Gln Ile Glu Thr
        35                  40                  45

Cys Asn Gln Ser Val Ile Thr Tyr Glu Asn Asn Thr Trp Val Asn Gln
50                  55                  60

Thr Tyr Val Asn Ile Ser Asn Thr Asn Phe Ala Ala Gly Gln Ser Val
65                  70                  75                  80

Val Ser Ile Ile Leu Ala Gly Asn Ser Ser Leu Cys Pro Ile Ser Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
130                 135                 140

Ser Asn Gly Thr Val Lys Asp Arg Ser Pro Tyr Arg Thr Leu Met Ser
145                 150                 155                 160

Cys Pro Ile Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Asp Thr Ile Lys Ser Trp Arg Asn Asn Ile Leu
210                 215                 220

Arg Thr Gln Glu Ser Glu Cys Ala Cys Ile Asn Gly Ser Cys Phe Thr
225                 230                 235                 240

Val Met Thr Asp Gly Pro Ser Asp Gly Gln Ala Ser Tyr Lys Ile Phe
                245                 250                 255

Lys Ile Glu Lys Gly Lys Ile Val Lys Ser Val Glu Met Asp Ala Pro
            260                 265                 270

Asn Tyr His Tyr Glu Glu Cys Ser Cys Tyr Pro Asp Ser Gly Lys Val
        275                 280                 285

Val Cys Val Cys Arg Asp Asn Trp His Gly Ser Asn Arg Pro Trp Val
290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Ser Asn Asp Gly Thr Gly Ser Cys Gly
                325                 330                 335

Pro Val Ser Ser Asn Gly Ala Asn Gly Val Lys Gly Phe Ser Phe Arg
            340                 345                 350

Tyr Gly Asn Gly Val Trp Ile Gly Arg Thr Lys Ser Ile Ser Ser Arg
        355                 360                 365

Arg Gly Phe Glu Met Ile Trp Asp Pro Asn Gly Trp Thr Glu Thr Asp
370                 375                 380
```

```
Asn Ser Phe Ser Ile Lys Gln Asp Ile Val Ala Ile Thr Glu Trp Ser
385                 390                 395                 400

Gly Tyr Ser Gly Ser Phe Val Gln His Pro Glu Leu Thr Gly Met Asn
            405                 410                 415

Cys Ile Arg Pro Cys Phe Trp Val Glu Leu Ile Arg Gly Gln Pro Lys
            420                 425                 430

Glu Asn Thr Ile Trp Thr Ser Gly Ser Ile Ser Phe Cys Gly Val
            435                 440                 445

Asn Ser Asp Thr Val Gly Trp Ser Trp Pro Asp Gly Ala Asp Leu Pro
450                 455                 460

Phe Thr Ile Asp Lys
465

<210> SEQ ID NO 15
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
            35                  40                  45

Cys Asn Gln Arg Ile Ile Thr Tyr Glu Asn Ser Thr Trp Val Asn Gln
50                  55                  60

Thr Tyr Val Asn Ile Asn Asn Thr Asn Val Val Ala Gly Lys Asp Thr
65                  70                  75                  80

Thr Ser Val Ile Leu Ala Gly Asn Ser Ser Leu Cys Pro Ile Arg Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
            115                 120                 125

Cys Arg Thr Phe Phe Leu Thr Gln Gly Ala Leu Leu Asn Asp Lys His
130                 135                 140

Ser Asn Gly Thr Val Lys Asp Arg Ser Pro Tyr Arg Ala Leu Met Ser
145                 150                 155                 160

Cys Pro Val Gly Glu Ala Pro Ser Pro Tyr Asn Ser Arg Phe Glu Ser
            165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
            195                 200                 205

Asn Gly Ile Ile Thr Glu Thr Ile Lys Ser Trp Arg Lys Asn Ile Leu
210                 215                 220

Arg Thr Gln Glu Ser Glu Cys Val Cys Val Asn Gly Ser Cys Phe Thr
225                 230                 235                 240

Ile Met Thr Asp Gly Pro Ser Asp Gly Leu Ala Ser Tyr Lys Ile Phe
            245                 250                 255

Lys Ile Glu Lys Gly Lys Val Thr Lys Ser Ile Glu Leu Asp Ala Pro
            260                 265                 270
```

```
Asn Ser His Tyr Glu Glu Cys Ser Cys Tyr Pro Asp Thr Gly Lys Val
            275                 280                 285

Met Cys Val Cys Arg Asp Asn Trp His Gly Ser Asn Arg Pro Trp Val
        290                 295                 300

Ser Phe Asn Gln Asn Leu Asp Tyr Gln Ile Gly Tyr Ile Cys Ser Gly
305                 310                 315                 320

Val Phe Gly Asp Asn Pro Arg Pro Lys Asp Gly Thr Gly Ser Cys Gly
                325                 330                 335

Pro Val Thr Val Asp Gly Ala Asn Gly Val Lys Gly Phe Ser Tyr Arg
            340                 345                 350

Tyr Gly Asn Gly Val Trp Ile Gly Arg Thr Lys Ser Asn Ser Ser Arg
        355                 360                 365

Lys Gly Phe Glu Met Ile Trp Asp Pro Asn Gly Trp Thr Glu Thr Asp
    370                 375                 380

Ser Ser Phe Ser Val Lys Gln Asp Val Val Ala Ile Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Leu Pro Arg
            420                 425                 430

Glu Asn Thr Ile Trp Thr Ser Gly Ser Ser Ile Ser Phe Cys Gly Val
        435                 440                 445

Asn Ser Asp Thr Val Asn Trp Ser Trp Pro Asp Gly Ala Glu Leu Pro
    450                 455                 460

Phe Thr Ile Asp Lys
465

<210> SEQ ID NO 16
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 16

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
        35                  40                  45

Cys Asn Gln Arg Ile Ile Thr Tyr Glu Asn Ser Thr Trp Val Asn Gln
    50                  55                  60

Thr Tyr Val Asn Ile Asn Asn Thr Asn Val Val Ala Gly Lys Asp Thr
65                  70                  75                  80

Thr Ser Val Thr Leu Ala Gly Asn Ser Ser Leu Cys Pro Ile Arg Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Ala Leu Met Ser
```

```
                145                 150                 155                 160
        Cys Pro Val Gly Glu Ala Pro Ser Pro Tyr Asn Ser Arg Phe Glu Ser
                        165                 170                 175

Val Ala Trp Ser Ala Ser Ala Cys His Asp Gly Met Gly Trp Leu Thr
                        180                 185                 190

Ile Gly Ile Ser Gly Pro Asp Asn Gly Ala Val Ala Val Leu Lys Tyr
                        195                 200                 205

Asn Gly Ile Ile Thr Glu Thr Ile Lys Ser Trp Arg Lys Arg Ile Leu
                        210                 215                 220

Arg Thr Gln Glu Ser Glu Cys Val Cys Val Asn Gly Ser Cys Phe Thr
        225                 230                 235                 240

Ile Met Thr Asp Gly Pro Ser Asp Gly Leu Ala Ser Tyr Lys Ile Phe
                        245                 250                 255

Lys Ile Glu Lys Gly Lys Val Thr Lys Ser Ile Glu Leu Asp Ala Pro
                        260                 265                 270

Asn Ser His Tyr Glu Glu Cys Ser Cys Tyr Pro Asp Thr Gly Lys Val
                        275                 280                 285

Met Cys Val Cys Arg Asp Asn Trp His Gly Ser Asn Arg Pro Trp Val
        290                 295                 300

Ser Phe Asn Gln Asn Leu Asp Tyr Gln Ile Gly Tyr Ile Cys Ser Gly
        305                 310                 315                 320

Val Phe Gly Asp Asn Pro Arg Pro Lys Asp Gly Thr Gly Ser Cys Gly
                        325                 330                 335

Pro Val Thr Val Asp Gly Ala Asn Gly Val Lys Gly Phe Ser Tyr Arg
                        340                 345                 350

Tyr Gly Asn Gly Val Trp Ile Gly Arg Thr Lys Ser Asn Ser Ser Arg
                        355                 360                 365

Lys Gly Phe Glu Met Ile Trp Asp Pro Asn Gly Trp Thr Glu Thr Asp
                        370                 375                 380

Ser Ser Phe Leu Val Lys Gln Asp Val Val Ala Ile Thr Asp Trp Ser
        385                 390                 395                 400

Gly Tyr Ser Gly Ser Phe Val Gln His Pro Glu Leu Thr Gly Leu Asp
                        405                 410                 415

Cys Met Arg Pro Cys Phe Trp Val Glu Leu Ile Arg Gly Leu Pro Arg
                        420                 425                 430

Glu Asp Thr Ile Trp Thr Ser Gly Ser Ser Ile Ser Phe Cys Gly Val
                        435                 440                 445

Asn Ser Asp Thr Val Asn Trp Ser Trp Pro Asp Gly Ala Glu Leu Pro
                        450                 455                 460

Phe Thr Ile Asp Lys
        465

<210> SEQ ID NO 17
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
                20                  25                  30
```

-continued

```
Trp Val Ser His Ser Ile Gln Thr Gly Ser Gln Asn His Thr Gly Ile
         35                  40                  45
Cys Asn Gln Arg Ile Ile Thr Tyr Glu Asn Ser Thr Trp Val Asn Gln
 50                  55                  60
Thr Tyr Val Asn Ile Asn Asn Thr Asn Val Val Ala Gly Lys Asp Thr
 65                  70                  75                  80
Thr Ser Val Ile Leu Ala Gly Asn Ser Ser Leu Cys Pro Ile Arg Gly
                 85                  90                  95
Trp Ala Ile Tyr Ser Lys Asp Asn Ser Ile Arg Ile Gly Ser Lys Gly
             100                 105                 110
Asp Val Phe Val Ile Arg Glu Pro Phe Ile Ser Cys Ser His Leu Glu
             115                 120                 125
Cys Arg Thr Phe Phe Leu Thr Gln Gly Ala Leu Leu Asn Asp Lys His
130                 135                 140
Ser Asn Gly Thr Val Lys Asp Arg Ser Pro Tyr Arg Thr Leu Met Ser
145                 150                 155                 160
Cys Pro Val Gly Glu Ala Pro Ser Pro Tyr Asn Ser Arg Phe Glu Ser
                165                 170                 175
Val Ala Trp Ser Ala Ser Ala Cys His Asp Gly Met Gly Trp Leu Thr
            180                 185                 190
Ile Gly Ile Ser Gly Pro Asp Asn Gly Ala Val Ala Val Leu Lys Tyr
            195                 200                 205
Asn Gly Ile Ile Thr Asp Thr Ile Lys Ser Trp Arg Asn Asn Ile Leu
            210                 215                 220
Arg Thr Gln Glu Ser Glu Cys Val Cys Val Asn Gly Ser Cys Phe Thr
225                 230                 235                 240
Ile Met Thr Asp Gly Pro Ser Asp Gly Gln Ala Ser Tyr Lys Ile Phe
                245                 250                 255
Lys Ile Glu Lys Gly Lys Val Thr Lys Ser Ile Glu Leu Asp Ala Pro
            260                 265                 270
Asn Ser His Tyr Glu Glu Cys Ser Cys Tyr Pro Asp Thr Gly Lys Val
            275                 280                 285
Val Cys Val Cys Arg Asp Asn Trp His Gly Ser Asn Arg Pro Trp Val
290                 295                 300
Ser Phe Asp Gln Asn Leu Asp Tyr Gln Ile Gly Tyr Ile Cys Ser Gly
305                 310                 315                 320
Val Phe Gly Asp Asn Pro Arg Pro Asn Asp Gly Thr Gly Ser Cys Gly
                325                 330                 335
Pro Val Thr Ser Asn Gly Ala Asn Gly Val Lys Gly Phe Ser Phe Arg
            340                 345                 350
Tyr Gly Asn Gly Val Trp Ile Gly Arg Thr Lys Ser Asp Ser Ser Arg
            355                 360                 365
Lys Gly Phe Glu Met Ile Trp Asp Pro Asn Gly Trp Thr Glu Thr Asp
            370                 375                 380
Ser Ser Phe Ser Val Lys Gln Asp Ile Val Ala Ile Thr Asp Trp Ser
385                 390                 395                 400
Gly Tyr Ser Gly Ser Phe Val Gln His Pro Glu Leu Thr Gly Leu Asp
                405                 410                 415
Cys Met Arg Pro Cys Phe Trp Val Glu Leu Ile Arg Gly Leu Pro Lys
            420                 425                 430
Glu Asn Thr Ile Trp Thr Ser Gly Ser Ser Ile Ser Phe Cys Gly Val
            435                 440                 445
Asn Ser Asp Thr Val Gly Trp Ser Trp Pro Asp Gly Ala Glu Leu Pro
```

```
                    450                 455                 460
Phe Thr Ile Asp Lys
465

<210> SEQ ID NO 18
<211> LENGTH: 469
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Met Asn Pro Asn Gln Lys Ile Ile Thr Ile Gly Ser Ile Cys Met Ala
1               5                   10                  15

Ile Gly Ile Ile Ser Leu Ile Leu Gln Ile Gly Asn Ile Ile Ser Ile
            20                  25                  30

Trp Val Ser His Ser Ile Gln Thr Gly Ser Gln Asn His Thr Gly Ile
        35                  40                  45

Cys Asn Gln Arg Ile Ile Thr Tyr Glu Asn Ser Thr Trp Val Asn Gln
    50                  55                  60

Thr Tyr Val Asn Ile Asn Asn Thr Asn Val Val Ala Gly Lys Asp Thr
65                  70                  75                  80

Thr Ser Val Thr Leu Ala Gly Asn Ser Ser Leu Cys Pro Ile Arg Gly
                85                  90                  95

Trp Ala Ile Tyr Ser Lys Asp Asn Ser Ile Arg Ile Gly Ser Lys Gly
            100                 105                 110

Asp Val Phe Val Ile Arg Glu Pro Phe Ile Ser Cys Ser His Leu Glu
        115                 120                 125

Cys Arg Thr Phe Phe Leu Thr Gln Gly Ala Leu Leu Asn Asp Lys His
    130                 135                 140

Ser Asn Gly Thr Val Lys Asp Arg Ser Pro Tyr Arg Ala Leu Met Ser
145                 150                 155                 160

Cys Pro Val Gly Glu Ala Pro Ser Pro Tyr Asn Ser Arg Phe Glu Ser
                165                 170                 175

Val Ala Trp Ser Ala Ser Ala Cys His Asp Gly Met Gly Trp Leu Thr
            180                 185                 190

Ile Gly Ile Ser Gly Pro Asp Asn Gly Ala Val Ala Val Leu Lys Tyr
        195                 200                 205

Asn Gly Ile Ile Thr Asp Thr Ile Lys Ser Trp Arg Asn Arg Ile Leu
    210                 215                 220

Arg Thr Gln Glu Ser Glu Cys Val Cys Val Asn Gly Ser Cys Phe Thr
225                 230                 235                 240

Ile Met Thr Asp Gly Pro Ser Asp Gly Gln Ala Ser Tyr Lys Ile Phe
                245                 250                 255

Lys Ile Glu Lys Gly Lys Val Thr Lys Ser Ile Glu Leu Asp Ala Pro
            260                 265                 270

Asn Ser His Tyr Glu Glu Cys Ser Cys Tyr Pro Asp Thr Gly Lys Val
        275                 280                 285

Met Cys Val Cys Arg Asp Asn Trp His Gly Ser Asn Arg Pro Trp Val
    290                 295                 300

Ser Phe Asp Gln Asn Leu Asp Tyr Gln Ile Gly Tyr Ile Cys Ser Gly
305                 310                 315                 320

Val Phe Gly Asp Asn Pro Arg Pro Asn Asp Gly Thr Gly Ser Cys Gly
                325                 330                 335
```

```
Pro Val Thr Ser Asn Gly Ala Asn Gly Val Lys Gly Phe Ser Phe Arg
            340                 345                 350

Tyr Gly Asn Gly Val Trp Ile Gly Arg Thr Lys Ser Asp Ser Ser Arg
        355                 360                 365

Lys Gly Phe Glu Met Ile Trp Asp Pro Asn Gly Trp Thr Glu Thr Asp
    370                 375                 380

Ser Ser Phe Ser Val Lys Gln Asp Ile Val Ala Ile Thr Asp Trp Ser
385                 390                 395                 400

Gly Tyr Ser Gly Ser Phe Val Gln His Pro Glu Leu Thr Gly Leu Asp
                405                 410                 415

Cys Met Arg Pro Cys Phe Trp Val Glu Leu Ile Arg Gly Leu Pro Lys
            420                 425                 430

Glu Asn Thr Ile Trp Thr Ser Gly Ser Ser Ile Ser Phe Cys Gly Val
        435                 440                 445

Asn Ser Asp Thr Val Gly Trp Ser Trp Pro Asp Gly Ala Glu Leu Pro
    450                 455                 460

Phe Thr Ile Asp Lys
465

<210> SEQ ID NO 19
<211> LENGTH: 2
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ser Ala
1

<210> SEQ ID NO 20
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Gly Ser Gly Ser Leu Val Pro Arg Gly Ser Pro Ser Arg Ser
1               5                   10

<210> SEQ ID NO 21
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (1)..(40)
<223> OTHER INFORMATION: This sequence may encompass 1-8 'Gly Gly Gly
      Gly Ser' repeating units

<400> SEQUENCE: 21

Gly Gly Gly Gly Ser Gly Gly Gly Gly Ser Gly Gly Gly Gly Ser Gly
1               5                   10                  15

Gly Gly Ser Gly Gly Gly Ser Gly Gly Gly Ser Gly Gly
            20                  25                  30

Gly Gly Ser Gly Gly Gly Gly Ser
        35                  40
```

<210> SEQ ID NO 22
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Gly Gly Ser Gly Gly Ser Gly Gly Gly Gly Ser Gly Gly Gly Gly Ser
1               5                   10                  15

<210> SEQ ID NO 23
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Gly Gly Gly Gly Ser
1               5

<210> SEQ ID NO 24
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (1)..(20)
<223> OTHER INFORMATION: This sequence may encompass 1-4 'Gly Gly Gly
      Gly Ser' repeating units

<400> SEQUENCE: 24

Gly Gly Gly Gly Ser Gly Gly Gly Gly Ser Gly Gly Gly Gly Ser Gly
1               5                   10                  15

Gly Gly Gly Ser
            20

<210> SEQ ID NO 25
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Gly Gly Gly Gly Gly Gly Gly Gly
1               5

<210> SEQ ID NO 26
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Gly Gly Gly Gly Gly Gly
1               5

```
<210> SEQ ID NO 27
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (1)..(15)
<223> OTHER INFORMATION: This sequence may encompass 1-3 'Glu Ala Ala
      Ala Lys' repeating units

<400> SEQUENCE: 27

Glu Ala Ala Ala Lys Glu Ala Ala Ala Lys Glu Ala Ala Ala Lys
1               5                   10                  15

<210> SEQ ID NO 28
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (2)..(26)
<223> OTHER INFORMATION: This region may encompass 2-5 'Glu Ala Ala Ala
      Lys' repeating units

<400> SEQUENCE: 28

Ala Glu Ala Ala Ala Lys Glu Ala Ala Ala Lys Glu Ala Ala Ala Lys
1               5                   10                  15

Glu Ala Ala Ala Lys Glu Ala Ala Ala Lys Ala
            20                  25

<210> SEQ ID NO 29
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Ala Glu Ala Ala Ala Lys Glu Ala Ala Ala Lys Ala
1               5                   10

<210> SEQ ID NO 30
<211> LENGTH: 46
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Ala Glu Ala Ala Ala Lys Glu Ala Ala Ala Lys Glu Ala Ala Ala Lys
1               5                   10                  15

Glu Ala Ala Ala Lys Ala Leu Glu Ala Glu Ala Ala Lys Glu Ala
            20                  25                  30

Ala Ala Lys Glu Ala Ala Ala Lys Glu Ala Ala Ala Lys Ala
        35                  40                  45

<210> SEQ ID NO 31
<211> LENGTH: 5
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 31

Pro Ala Pro Ala Pro
1               5

<210> SEQ ID NO 32
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Lys Glu Ser Gly Ser Val Ser Ser Glu Gln Leu Ala Gln Phe Arg Ser
1               5                   10                  15

Leu Asp

<210> SEQ ID NO 33
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Glu Gly Lys Ser Ser Gly Ser Gly Ser Glu Ser Lys Ser Thr
1               5                   10

<210> SEQ ID NO 34
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Gly Ser Ala Gly Ser Ala Ala Gly Ser Gly Glu Phe
1               5                   10

<210> SEQ ID NO 35
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 35

His His His His His His
1               5
```